United States Patent
Erspamer et al.

(10) Patent No.: US 12,017,702 B2
(45) Date of Patent: *Jun. 25, 2024

(54) UTILITY VEHICLE

(71) Applicant: Polaris Industries Inc., Medina, MN (US)

(72) Inventors: Brent A. Erspamer, Blaine, MN (US); Brian J. Seidel, Osceola, WI (US); Richard D. Ripley, Rush City, MN (US); Dennis J. Lutz, Lino Lakes, MN (US)

(73) Assignee: Polaris Industries Inc., Medina, MN (US)

( * ) Notice: Subject to any disclaimer, the term of this patent is extended or adjusted under 35 U.S.C. 154(b) by 91 days.

This patent is subject to a terminal disclaimer.

(21) Appl. No.: 17/323,742

(22) Filed: May 18, 2021

(65) Prior Publication Data

US 2021/0269096 A1    Sep. 2, 2021

Related U.S. Application Data

(63) Continuation of application No. 15/722,535, filed on Oct. 2, 2017, now Pat. No. 11,066,105, which is a (Continued)

(51) Int. Cl.
  *B62D 23/00*    (2006.01)
  *B60J 5/04*    (2006.01)
  (Continued)

(52) U.S. Cl.
  CPC .......... *B62D 23/005* (2013.01); *B60J 5/0487* (2013.01); *B60J 10/86* (2016.02); *B60N 2/012* (2013.01);
  (Continued)

(58) Field of Classification Search
  CPC ...... B62D 23/005; B62D 21/183; B60J 10/86; B60J 5/0487; B60N 2/986; B60N 2/012;
  (Continued)

(56) References Cited

U.S. PATENT DOCUMENTS 3,422,918 A    1/1969  Musser et al.
4,046,403 A    9/1977  Yoshida
(Continued)

FOREIGN PATENT DOCUMENTS

CA    2416802 A1    10/2003
CA    2825896 A1    8/2012
(Continued)

OTHER PUBLICATIONS

"FIAT 500 Owner Handbook", Jul. 2001 (Jul. 2001), Fiat Group Automobiles S.p.A, Turin (IT).
(Continued)

*Primary Examiner* — Toan C To
(74) *Attorney, Agent, or Firm* — Faegre Drinker Biddle & Reath LLP

(57) ABSTRACT

A utility vehicle includes a plurality of ground engaging members and a frame supported by the plurality of ground engaging members. Additionally, the utility vehicle includes an operator area having a front seating section and a rear seating section.

23 Claims, 56 Drawing Sheets

Related U.S. Application Data continuation of application No. 14/212,092, filed on Mar. 14, 2014, now Pat. No. 9,789,909.

(60) Provisional application No. 61/788,874, filed on Mar. 15, 2013.

(51) Int. Cl.

| | | |
|---|---|---|
| *B60J 10/86* | (2016.01) | |
| *B60N 2/01* | (2006.01) | |
| *B60N 2/60* | (2006.01) | |
| *B60N 2/68* | (2006.01) | |
| *B60N 2/90* | (2018.01) | |
| *B60R 7/04* | (2006.01) | |
| *B62D 21/18* | (2006.01) | |
| *B60K 5/00* | (2006.01) | |
| *B60K 13/02* | (2006.01) | |
| *B60K 13/04* | (2006.01) | |

(52) U.S. Cl.
CPC .............. *B60N 2/6009* (2013.01); *B60N 2/68* (2013.01); *B60N 2/986* (2018.02); *B60R 7/04* (2013.01); *B62D 21/183* (2013.01); *B60K 2005/003* (2013.01); *B60K 13/02* (2013.01); *B60K 13/04* (2013.01); *B60Y 2200/20* (2013.01)

(58) Field of Classification Search
CPC .......... B60N 2/6009; B60N 2/68; B60R 7/04; B60K 13/02; B60K 13/04; B60K 2005/003; B60Y 2200/20
See application file for complete search history.

(56) References Cited

U.S. PATENT DOCUMENTS

| | | | |
|---|---|---|---|
| 4,133,574 A | 1/1979 | Martin | |
| 4,344,718 A | 8/1982 | Taylor | |
| 4,650,210 A | 3/1987 | Hirose et al. | |
| 4,660,345 A | 4/1987 | Browning | |
| 4,691,818 A | 9/1987 | Weber | |
| 4,772,065 A | 9/1988 | Nakata et al. | |
| 4,817,985 A | 4/1989 | Enokimoto et al. | |
| 5,203,135 A * | 4/1993 | Bastian ................. | F16B 7/0413 |
| | | | 403/292 |
| 5,203,601 A | 4/1993 | Guillot | |
| 5,327,989 A | 7/1994 | Furuhashi et al. | |
| 5,465,929 A | 11/1995 | Dooley | |
| 5,642,957 A | 7/1997 | Lange | |
| 5,738,471 A | 4/1998 | Zentner et al. | |
| 5,752,791 A | 5/1998 | Ehrlich | |
| 5,816,650 A | 10/1998 | Lucas, Jr. | |
| 5,895,063 A | 4/1999 | Hasshi et al. | |
| 5,947,519 A | 9/1999 | Aloe et al. | |
| 5,975,624 A | 11/1999 | Rasidescu et al. | |
| 6,010,182 A * | 1/2000 | Townsend ................. | B64C 1/08 |
| | | | 296/29 |
| 6,113,328 A | 9/2000 | Claucherty | |
| 6,134,841 A | 10/2000 | Schneider | |
| 6,257,797 B1 | 7/2001 | Lange | |
| 6,293,617 B1 | 9/2001 | Sukegawa | |
| 6,334,364 B1 | 1/2002 | Suzuki | |
| D467,200 S | 12/2002 | Luo et al. | |
| 6,530,730 B2 | 3/2003 | Swensen | |
| 6,533,348 B1 | 3/2003 | Jaekel et al. | |
| 6,582,004 B1 | 6/2003 | Hamm | |
| 6,652,020 B2 | 11/2003 | Few | |
| D497,324 S | 10/2004 | Chestnut et al. | |
| 6,805,217 B2 | 10/2004 | Kinouchi et al. | |
| D498,435 S | 11/2004 | Saito et al. | |
| 6,871,895 B2 | 3/2005 | Kiester et al. | |
| D503,657 S | 4/2005 | Katoh | |
| D503,905 S | 4/2005 | Saito et al. | |
| D504,638 S | 5/2005 | Tanaka et al. | |
| 6,892,847 B2 | 5/2005 | Seiki | |
| 6,926,350 B2 | 8/2005 | Gabbianelli et al. | |
| D511,317 S | 11/2005 | Tanaka et al. | |
| 7,014,241 B2 | 3/2006 | Toyota et al. | |
| 7,249,798 B2 * | 7/2007 | Saito ........................ | B60N 2/36 |
| | | | 296/210 |
| 7,281,753 B2 | 10/2007 | Curtis et al. | |
| D555,036 S | 11/2007 | Eck | |
| 7,322,106 B2 | 1/2008 | Marando et al. | |
| D578,433 S | 10/2008 | Kawaguchi et al. | |
| D578,934 S | 10/2008 | Tanaka et al. | |
| 7,431,024 B2 | 10/2008 | Buchwitz et al. | |
| 7,488,022 B2 | 2/2009 | Belwafa et al. | |
| 7,503,737 B2 | 3/2009 | Sherman | |
| 7,510,199 B2 | 3/2009 | Nash et al. | |
| D592,998 S | 5/2009 | Woodard et al. | |
| D595,613 S | 7/2009 | LAl et al. | |
| 7,578,544 B1 | 8/2009 | Shimamura et al. | |
| 7,581,780 B2 | 9/2009 | Shimamura et al. | |
| D604,201 S | 11/2009 | Kawaguchi et al. | |
| D605,555 S | 12/2009 | Tanaka et al. | |
| D606,900 S | 12/2009 | Flores | |
| D607,377 S | 1/2010 | Shimomura et al. | |
| 7,677,343 B2 | 3/2010 | Kitai et al. | |
| 7,677,646 B2 | 3/2010 | Nakamura | |
| 7,717,495 B2 | 5/2010 | Leonard et al. | |
| D621,423 S | 8/2010 | Nakanishi et al. | |
| D622,631 S | 8/2010 | Lai et al. | |
| 7,775,311 B1 | 8/2010 | Hardy et al. | |
| 7,795,602 B2 | 9/2010 | Leonard et al. | |
| D624,848 S | 10/2010 | Shimomura | |
| D625,662 S | 10/2010 | Li | |
| 7,815,246 B2 | 10/2010 | Nakamura et al. | |
| 7,819,220 B2 | 10/2010 | Sunsdahl et al. | |
| D631,395 S | 1/2011 | Tandrup et al. | |
| 7,874,606 B2 | 1/2011 | Yamamura et al. | |
| D633,006 S | 2/2011 | Sanschagrin et al. | |
| 7,913,505 B2 | 3/2011 | Nakamura | |
| D636,704 S | 4/2011 | Yoo et al. | |
| D640,598 S | 6/2011 | Zhang | |
| D641,288 S | 7/2011 | Sun | |
| D642,493 S | 8/2011 | Goebert et al. | |
| 7,988,210 B2 * | 8/2011 | Shibata ................... | E05C 17/04 |
| | | | 49/394 |
| 8,016,339 B2 | 9/2011 | Hamaguchi et al. | |
| 8,052,202 B2 | 11/2011 | Nakamura | |
| 8,100,434 B2 | 1/2012 | Miura | |
| 8,136,857 B2 | 3/2012 | Shimizu et al. | |
| 8,136,859 B2 | 3/2012 | Morita et al. | |
| 8,235,443 B2 | 8/2012 | Kokawa et al. | |
| 8,328,235 B2 | 12/2012 | Schneider et al. | |
| 8,376,441 B2 * | 2/2013 | Nakamura ............ | B62D 23/005 |
| | | | 296/65.09 |
| 8,499,882 B2 * | 8/2013 | Tsumiyama ............. | B60K 5/02 |
| | | | 280/798 |
| 8,511,732 B2 | 8/2013 | Inoue et al. | |
| D689,396 S | 9/2013 | Wang | |
| 8,556,324 B1 | 10/2013 | Yamamoto et al. | |
| 8,585,088 B1 | 11/2013 | Kaku et al. | |
| 8,596,405 B2 | 12/2013 | Sunsdahl et al. | |
| 8,613,337 B2 | 12/2013 | Kinsman et al. | |
| 8,640,814 B2 * | 2/2014 | Deckard .................. | B60N 2/38 |
| | | | 296/205 |
| 8,668,236 B1 | 3/2014 | Yamamoto et al. | |
| 8,672,387 B1 | 3/2014 | Kaku et al. | |
| D711,778 S | 8/2014 | Chun et al. | |
| 8,827,357 B2 * | 9/2014 | Kaku ...................... | B60R 21/13 |
| | | | 296/190.03 |
| 8,869,929 B2 * | 10/2014 | Yamamoto ........... | B62D 23/005 |
| | | | 180/311 |
| D716,693 S | 11/2014 | Higashikawa | |
| D716,694 S | 11/2014 | Higashikawa | |
| D717,695 S | 11/2014 | Matsumura | |
| 8,905,168 B2 | 12/2014 | Kaku et al. | |
| 8,960,805 B2 * | 2/2015 | Nakamura ............. | B62D 33/02 |
| | | | 298/17 R |
| D724,997 S | 3/2015 | Brew et al. | |

(56) References Cited

U.S. PATENT DOCUMENTS

| | | |
|---|---|---|
| 8,973,691 B2 | 3/2015 | Morgan et al. |
| 8,973,693 B2 | 3/2015 | Kinsman et al. |
| 8,979,123 B1 | 3/2015 | Takahashi et al. |
| 8,997,908 B2 | 4/2015 | Kinsman et al. |
| 9,004,532 B1 | 4/2015 | Hirooka |
| D730,239 S | 5/2015 | Gonzalez |
| D736,118 S | 8/2015 | Hashimoto et al. |
| 9,150,182 B1 | 10/2015 | Schlangen et al. |
| 9,216,777 B2 | 12/2015 | Nakamura et al. |
| 9,242,680 B2 | 1/2016 | Schwab |
| 9,266,417 B2 | 2/2016 | Nadeau et al. |
| 9,279,234 B1 | 3/2016 | Gielda et al. |
| 9,365,241 B1 | 6/2016 | Taracko et al. |
| 9,393,894 B2 * | 7/2016 | Steinmetz .............. B60N 2/012 |
| D764,972 S | 8/2016 | Gonzalez |
| D767,444 S | 9/2016 | Chun et al. |
| 9,623,912 B2 * | 4/2017 | Schlangen .............. B60G 7/001 |
| 9,650,078 B2 | 5/2017 | Kinsman et al. |
| 9,789,909 B2 | 10/2017 | Erspamer et al. |
| 9,789,922 B2 | 10/2017 | Dosenbach et al. |
| 10,450,006 B2 | 10/2019 | Kinsman et al. |
| 10,843,743 B2 * | 11/2020 | St-Pierre .............. B62D 23/005 |
| 10,967,825 B2 * | 4/2021 | Hisamura ............ B62D 27/065 |
| 11,066,105 B2 * | 7/2021 | Lutz ......................... B60J 10/86 |
| 2001/0031185 A1 | 10/2001 | Swensen |
| 2003/0231926 A1 | 12/2003 | Thach |
| 2005/0077098 A1 | 4/2005 | Takayanagi et al. |
| 2005/0173177 A1 | 8/2005 | Smith et al. |
| 2005/0279330 A1 | 12/2005 | Okazaki et al. |
| 2006/0006696 A1 | 1/2006 | Umemoto et al. |
| 2007/0170683 A1 | 7/2007 | Shimizu et al. |
| 2007/0176386 A1 | 8/2007 | Schlangen et al. |
| 2007/0210617 A1 | 9/2007 | Nakamura |
| 2007/0214818 A1 | 9/2007 | Nakamura |
| 2007/0267837 A1 | 11/2007 | Sanville |
| 2008/0000849 A1 | 1/2008 | Zhang et al. |
| 2008/0023240 A1 | 1/2008 | Sunsdahl et al. |
| 2008/0023249 A1 | 1/2008 | Sunsdahl et al. |
| 2008/0084091 A1 | 4/2008 | Nakamura et al. |
| 2008/0093883 A1 | 4/2008 | Shibata et al. |
| 2008/0179853 A1 | 7/2008 | Kuwabara et al. |
| 2008/0256738 A1 | 10/2008 | Malone |
| 2008/0308334 A1 | 12/2008 | Leonard et al. |
| 2009/0000849 A1 | 1/2009 | Leonard et al. |
| 2009/0071737 A1 | 3/2009 | Leonard et al. |
| 2009/0071739 A1 | 3/2009 | Leonard et al. |
| 2009/0091101 A1 | 4/2009 | Leonard et al. |
| 2009/0108632 A1 | 4/2009 | Wen et al. |
| 2009/0121518 A1 | 5/2009 | Leonard et al. |
| 2009/0183937 A1 | 7/2009 | Yamamura et al. |
| 2009/0183938 A1 | 7/2009 | Cover et al. |
| 2009/0184531 A1 * | 7/2009 | Yamamura ............ B62D 33/02 |
| | | 296/65.01 |
| 2009/0184534 A1 | 7/2009 | Smith et al. |
| 2009/0184536 A1 | 7/2009 | Kubota |
| 2009/0184537 A1 | 7/2009 | Yamamura et al. |
| 2009/0184541 A1 * | 7/2009 | Yamamura ........... B60N 2/3011 |
| | | 296/64 |
| 2009/0200823 A1 | 8/2009 | Vertanen |
| 2009/0301830 A1 | 12/2009 | Kinsman et al. |
| 2009/0302590 A1 | 12/2009 | Van et al. |
| 2010/0012412 A1 | 1/2010 | Deckard et al. |
| 2010/0155170 A1 | 6/2010 | Melvin et al. |
| 2010/0194086 A1 | 8/2010 | Yamamura et al. |
| 2010/0201156 A1 | 8/2010 | Nakamura |
| 2010/0314184 A1 | 12/2010 | Stenberg et al. |
| 2010/0317485 A1 | 12/2010 | Gillingham et al. |
| 2011/0025012 A1 | 2/2011 | Nakamura |
| 2011/0143113 A1 | 6/2011 | Hatta et al. |
| 2011/0155087 A1 | 6/2011 | Wenger et al. |
| 2011/0156438 A1 | 6/2011 | Ichihara et al. |
| 2011/0298189 A1 * | 12/2011 | Schneider ............ B62D 23/005 |
| | | 296/64 |
| 2012/0031693 A1 | 2/2012 | Deckard et al. |
| 2012/0073527 A1 | 3/2012 | Oltmans et al. |
| 2012/0073537 A1 | 3/2012 | Oltmans et al. |
| 2012/0160589 A1 | 6/2012 | Tsumiyama et al. |
| 2012/0212013 A1 | 8/2012 | Ripley et al. |
| 2012/0217078 A1 | 8/2012 | Kinsman et al. |
| 2012/0223500 A1 | 9/2012 | Kinsman et al. |
| 2013/0033070 A1 | 2/2013 | Kinsman et al. |
| 2013/0087397 A1 | 4/2013 | Yamamoto et al. |
| 2013/0087398 A1 | 4/2013 | Kotani et al. |
| 2013/0256050 A1 * | 10/2013 | Novotny ............... B62D 23/005 |
| | | 180/312 |
| 2014/0000174 A1 | 1/2014 | Minagawa et al. |
| 2014/0049067 A1 | 2/2014 | Kasuya et al. |
| 2014/0060954 A1 | 3/2014 | Smith et al. |
| 2014/0062048 A1 | 3/2014 | Schlangen et al. |
| 2014/0065936 A1 | 3/2014 | Smith et al. |
| 2014/0067215 A1 | 3/2014 | Wetterlund et al. |
| 2014/0109627 A1 | 4/2014 | Lee et al. |
| 2014/0124279 A1 * | 5/2014 | Schlangen ............ B60G 15/067 |
| | | 180/311 |
| 2014/0265285 A1 | 9/2014 | Erspamer |
| 2014/0353956 A1 * | 12/2014 | Bjerketvedt .............. B60N 2/24 |
| | | 296/64 |
| 2015/0274212 A1 | 10/2015 | Karube et al. |
| 2015/0274215 A1 | 10/2015 | Karube et al. |
| 2015/0291056 A1 | 10/2015 | Nozaki |
| 2015/0367891 A1 | 12/2015 | Deschamps |
| 2016/0176449 A1 | 6/2016 | Kazakoff et al. |
| 2018/0022391 A1 | 1/2018 | Lutz et al. |
| 2018/0065465 A1 * | 3/2018 | Ward ....................... B62D 5/04 |
| 2018/0326843 A1 | 11/2018 | Danielson et al. |
| 2020/0010120 A1 | 1/2020 | Kinsman et al. |
| 2022/0033004 A1 | 2/2022 | Kinsman et al. |

FOREIGN PATENT DOCUMENTS

| | | |
|---|---|---|
| CA | 2826756 A1 | 8/2012 |
| CA | 2901541 A1 | 9/2014 |
| CA | 2910026 A1 | 12/2014 |
| CA | 2921360 A1 | 2/2015 |
| CA | 2933980 A1 | 6/2015 |
| CN | 201276159 Y | 7/2009 |
| CN | 101511664 A | 8/2009 |
| CN | 101878146 A | 11/2010 |
| CN | 102256825 A | 11/2011 |
| DE | 0037435 | 10/1886 |
| DE | 19949787 A1 | 4/2000 |
| DE | 102008050671 A1 | 4/2010 |
| EP | 0568251 A1 | 11/1993 |
| EP | 1493624 A1 | 1/2005 |
| EP | 1600326 A1 | 11/2005 |
| EP | 1602523 A2 | 12/2005 |
| EP | 2057060 A2 | 5/2009 |
| EP | 2236395 A1 | 10/2010 |
| FR | 2914597 A1 | 10/2008 |
| FR | 2936028 A1 | 3/2010 |
| GB | 2036659 A | 7/1980 |
| GB | 2436091 A | 9/2007 |
| JP | 59-032525 A | 2/1984 |
| JP | 63-025977 | 5/1988 |
| JP | 06-325977 A | 11/1994 |
| JP | 07-040783 | 2/1995 |
| JP | 11-091637 A | 4/1999 |
| JP | 2001-130304 A | 5/2001 |
| JP | 2003-237530 A | 8/2003 |
| JP | 2010-095106 A | 4/2010 |
| WO | 98/30430 A1 | 7/1998 |
| WO | 03/42026 A1 | 5/2003 |
| WO | 03/55716 A1 | 7/2003 |
| WO | 2008/016377 A2 | 2/2008 |
| WO | 2009/137579 A1 | 11/2009 |
| WO | 2010/148014 A1 | 12/2010 |
| WO | 2012/040553 A2 | 3/2012 |
| WO | 2012/109546 A1 | 8/2012 |
| WO | 2012/174793 A1 | 12/2012 |
| WO | 2013/166310 A1 | 11/2013 |
| WO | 2014/039432 A2 | 3/2014 |

(56) References Cited

FOREIGN PATENT DOCUMENTS

| WO | 2014/039433 A2 | 3/2014 |
|----|----|----|
| WO | 2014/059258 A1 | 4/2014 |

OTHER PUBLICATIONS

European Search Report and Search Opinion Received for EP Application No. 17150711.4, dated Jun. 7, 2017, 7 pages.
Examination Report issued by Intellectual Property India, dated Mar. 12, 2019, for Indian Patent Application No. 7003/DELNP/2013; 7 pages.
Examination Report No. 1 issued by the Australian Government IP Australia, dated Nov. 29, 2018, for Australian Patent Application No. 2018204263; 4 pages.
International Preliminary Report on Patentability issued by the European Patent Office, dated Mar. 8, 2013, for International PCT Application No. PCT/US2012/024664; 24 pages.
International Preliminary Report on Patentablility issued by the European Patent Office, dated Nov. 4, 2014, for International PCT Application No. PCT/US2013/039304; 7 pages.
International Search Report and Written Opinion issued by the European Patent Office, dated Jul. 23, 2013, for International PCT Application No. PCT/US2013/039304; 11 pages.
International Search Report and Written Opinion issued by the European Patent Office, dated Jun. 28, 2012, for International PCT Application No. PCT/US2012/024664; 19 pages.
Office Action issued by the Canadian Patent Office, dated Mar. 22, 2018, for related Canadian Patent Application No. 2,870,867, 6 pages.
Office Action dated Sep. 18, 2020, for Mexican Patent Application No. MX/a/2016/000762; 5 pages.
Office Action received for Chinese Patent Application No. 17150711.4, dated Jun. 15, 2018, 4 pages.
Office Action received for European Application No. 13722652.8, dated May 11, 2016, 4 pages.
Polaris Ranger Brochure 2011, (Copyright) 2010, 22 pages.
Yamaha Company Website, 2006 Rhino 450 Auto 4×4, copyright 2006; 4 pages.
2008 Dealer Expo Top UTV Products-Rhino, Ranger and RZRs were everything at the . . . , dated Feb. 18, 2008, 6 pages.
Artic Cat, Company Website, Prowler XT650 H1, undated; 9 pages.
BRP Can-Am Commander photo, undated; 1 page.
Buyer's Guide Supplement, 2006 Kart Guide, Powersports Business Magazine; 6 pages.
Club Car, Company Website, product pages for XRT 1500 SE, undated; 2 pages.
Communication Pursuant to Article 34(3) EPC issued by the European Patent Office, dated Oct. 30, 2018, for European Patent Application 14726795.9; 8 pages.
Honda Hippo 1800 New Competition for Yamaha's Rhino, Dirt Wheels Magazine, Apr. 2006; pp. 91-92.
International Preliminary Report on Patentability issued by the European Patent Office, dated Jul. 6, 2015, for International Patent Application No. PCT/US2014/039824; 12 pages.
International Preliminary Report on Patentability issued by the European Patent Office, dated Sep. 2, 2009, for related International Patent Application No. PCT/US2010/038709, 45 pages.

International Preliminary Report on Patentability issued by the European Patent Office, dated Jun. 11, 2015, for International Patent Application No. PCT/US2014/028152; 35 pages.
International Search Report and Written Opinion issued by the European Patent Office, dated Jul. 25, 2014, for related International Application No. PCT/US2014/028152; 21 pages.
International Search Report and Written Opinion issued by the European Patent Office, dated Sep. 9, 2014, for related International Application No. PCT/US2014/039824; 10 pages.
International Search Report issued by the European Patent Office, dated Sep. 14, 2010, for related International Application No. PCT/2010/038709, 5 pages.
Kawasaki Mule The Off-Road Capable 610 4×4 Brochure 2011, (Copyrights) 2010; 6 pages.
Kawasaki Mule Utility Vehicle Brochure 2009, (Copyrights) 2008; 10 pages.
Kawasaki Teryx 750 FL 4×4 Sport Brochure 2011, (Copyrights) 2010; 6 pages.
Kawasaki Teryx Recreation Utility Vehicle Brochure 2009, (Copyrights) 2008; 8 pages.
Office Action issued by the Canadian Intellectual Property Office, dated Jun. 15, 2020, for Canadian Patent Application No. 2,901,541; 6 pages.
Office Action issued by the Canadian Intellectual Property Office, dated Oct. 16, 2019, for Canadian Patent Application No. 2,901,541; 7 pages.
Office Action received for European Application No. 14726795.9, dated Mar. 9, 2018, 6 pages.
Pictures of Vehicle publicly disclosed in Jul. 2008, 3 pages.
Polaris Industries, Ranger Catalog, 2007, 28 pages.
Polaris Industries, Ranger RZR Catalog, 2008, 12 pages.
Polaris Ranger Brochure 2009, (Copyrights) 2008; 32 pages.
Polaris Ranger Brochure ATVs and Side x Sides Brochure 2010, (Copyrights) 2009; 26 pages.
Polaris Ranger Off-Road Utility Vehicles Brochure 2004, (Copyrights) 2003; 20 pages.
Polaris Ranger RZR Brochure 2011, (Copyrights) 2010; 16 pages.
Polaris Ranger Welcome to Ranger Country Brochure 2006, (Copyrights) 2005; 24 pages.
Polaris Ranger Work/Play Only Brochure 2008, (Copyrights) 2007; 28 pages.
Ray Sedorchuk, New for 2004, Yamaha Rhino 660 4×4, ATV Connection Magazine, (Copyrights) 2006; 3 pages.
Robby Gordon's RZR-S 4 seater-Yamaha Rhino Forum-Rhino Forums.net, dated Nov. 11, 2009, 14 pages.
Side by Side Sports.com, Polaris Ranger Rear Cage Extension and Seat Set, available at www.sidebysidesports.com/porarecaexan. html, last accessed on Mar. 29, 2011.
Tellico 4x4.com, Polaris Ranger Accessories and Ranger Parts for Crew 500, 700, 800, XP, available at www.tellico4x4.com/index.php/cPath/3523, last accessed on Mar. 29, 2011.
Written Opinion of the International Search Authority issued by the European Patent Office, dated Sep. 14, 2009, for related International Application No. PCT/US2010/038709, 6 pages.
Yamaha, Company Website, 2006 Rhino 450 Auto 4×4, (Copyrights) 2005; 3 pages.
Yamaha, Company Website, Rhino 660 Auto 4×4 Exploring Edition Specifications, (Copyrights) 2006; 3 pages.

\* cited by examiner

UTILITY VEHICLE

CROSS-REFERENCE TO RELATED APPLICATIONS

The present application is a continuation of U.S. patent application Ser. No. 15/722,535, filed on Oct. 2, 2017, which is a continuation of U.S. patent application Ser. No. 14/212,092, filed on Mar. 14, 2014, which claims priority to U.S. Provisional Patent Application Ser. No. 61/788,874, filed on Mar. 15, 2013, and entitled "UTILITY VEHICLE," the complete disclosures of which are expressly incorporated by reference herein.

BACKGROUND OF THE PRESENT DISCLOSURE

The present disclosure generally relates to side-by-side all-terrain vehicles, and more particularly, to side-by-side all-terrain vehicles with seating for four passengers.

Generally, all terrain vehicles ("ATVs") and utility vehicles ("UVs") are used to carry one or two passengers and a small amount of cargo over a variety of terrains. Such vehicles may include a bench seat configured to support a driver and up to two passengers. Other vehicles may be configured with an individual seat for the driver and an individual seat for a passenger. A cargo rack may be positioned rearward of the seats. In order to support more than two passengers, a rear seat may be included for supporting one or two additional passengers.

SUMMARY OF THE PRESENT DISCLOSURE

In one illustrative embodiment of the present disclosure, a utility vehicle comprises a plurality of ground engaging members and a frame supported by the plurality of ground engaging members. Additionally, the utility vehicle comprises an operator area having a front seating section and a rear seating section. The front seating section includes an operator seat and a front passenger seat. The rear seating section includes a first rear passenger seat, a second rear passenger seat, and a third rear passenger seat, and the second rear passenger seat is integral with the first and third rear passenger seats.

In a further illustrative embodiment of the present disclosure, a utility vehicle comprises a plurality of ground engaging members and a frame supported by the plurality of ground engaging members. The utility vehicle further comprises an operator area supported by the frame. The operator area includes a first seating section and a second seating section. The utility vehicle also comprises a roll cage extending above the operator area and a roof having a first portion and a second portion. The first portion of the roof is positioned generally above the first seating section and is retained on the second portion and the roll cage. The second portion of the roof is positioned generally above the second seating section and is retained on the roll cage.

In another illustrative embodiment of the present disclosure, a utility vehicle comprises a front frame assembly including a plurality of front frame tubes, and a rear frame assembly coupled to the front frame assembly and including a plurality of rear frame tubes. The utility vehicle further comprising a plurality of coupling members coupled to the front frame assembly and the rear frame assembly. The coupling members are configured to couple with the front and rear frame tubes when the front and rear frame tubes have a plurality of cross-sectional profiles.

In a further illustrative embodiment of the present disclosure, a utility vehicle comprises a lower frame assembly and an upper frame assembly coupled to the lower frame assembly. The upper fame assembly includes a plurality of front upstanding members, a plurality of rear upstanding members, a front longitudinal member, and a rear longitudinal member. The utility vehicle further comprising at least one cast coupling member integral with one of the front and rear longitudinal members.

In another illustrative embodiment of the present disclosure, a utility vehicle comprises a plurality of ground engaging members, a frame supported by the plurality of ground engaging members, and an operator area having a front seating section and a rear seating section. The front seating section comprises an operator seat and a front passenger seat. The utility vehicle further comprises a rear floorboard positioned within the rear seating section and defining a foot space for the rear seating section. The rear floorboard extends forwardly to a position below the front seating section to increase the foot space for the rear seating section.

In a further illustrative embodiment of the present disclosure, a utility vehicle comprises a lower frame assembly and an upper frame assembly coupled to the lower frame assembly to define a cab of the utility vehicle. The upper frame assembly includes front upstanding members, rear upstanding members, and intermediate upstanding members positioned intermediate the front and rear upstanding members. The utility vehicle further comprises a front seating section within the cab of the vehicle. The front seating section is rearward of the front upstanding members and forward of the intermediate upstanding members. Additionally, the utility vehicle includes a rear seating section within the cab of the vehicle and positioned rearward of the front seating section. The rear seating section is rearward of the intermediate upstanding members and forward of the rear upstanding members. The utility vehicle further comprises at least one rear door adjacent to the rear seating section and operably coupled to the upper frame assembly. The at least one rear door is configured to rotate between an open position which allows ingress to the rear seating section and a closed position which allows egress from the rear seating section. The utility vehicle also comprises a sealing member coupled to the intermediate upstanding members and configured to cooperate with the rear door when the rear door is in the closed position.

The above mentioned and other features of the invention, and the manner of attaining them, will become more apparent and the invention itself will be better understood by reference to the following description of embodiments of the invention taken in conjunction with the accompanying drawings.

DETAILED DESCRIPTION OF THE DRAWINGS

Figure 1:
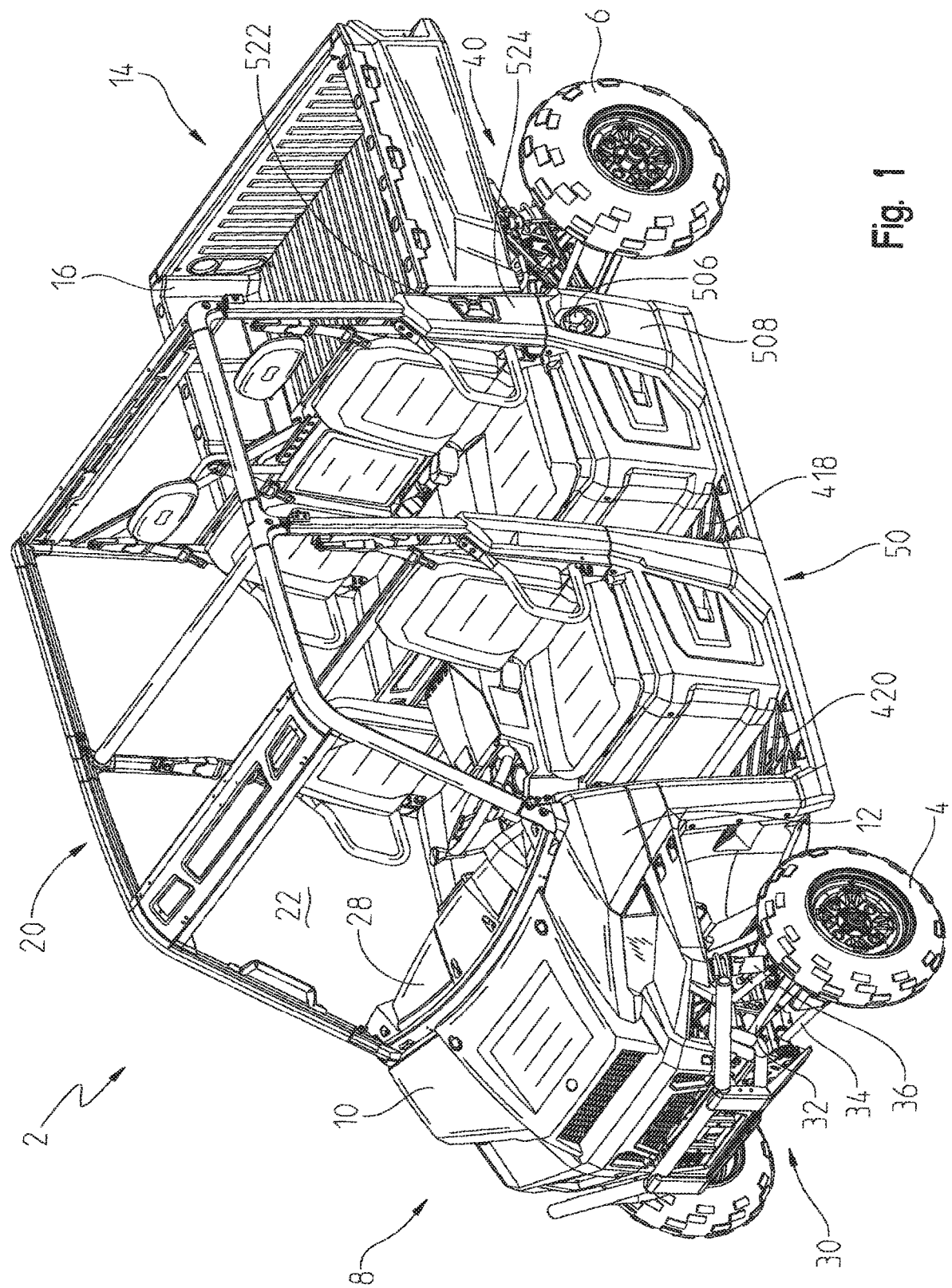
FIG. 1 is a left front perspective view of the vehicle of the present disclosure.

Corresponding reference characters indicate corresponding parts throughout the several views. Unless stated otherwise the drawings are proportional.

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to other types of vehicles such as all-terrain vehicles, motorcycles, watercraft, snowmobiles, people movers, and golf carts.

Figure 2:
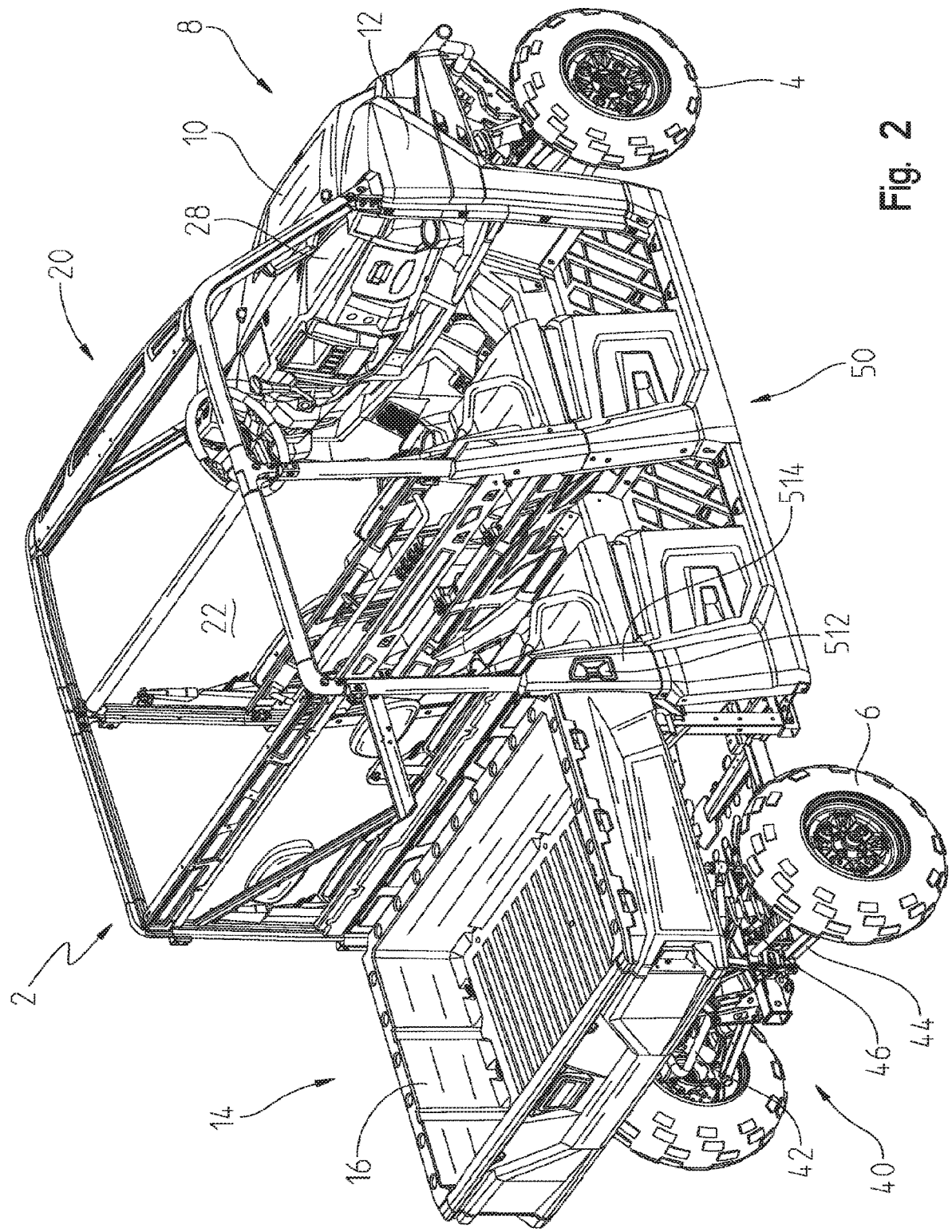
FIG. 2 is a right rear perspective view of the vehicle of FIG. 1.
Figure 3:
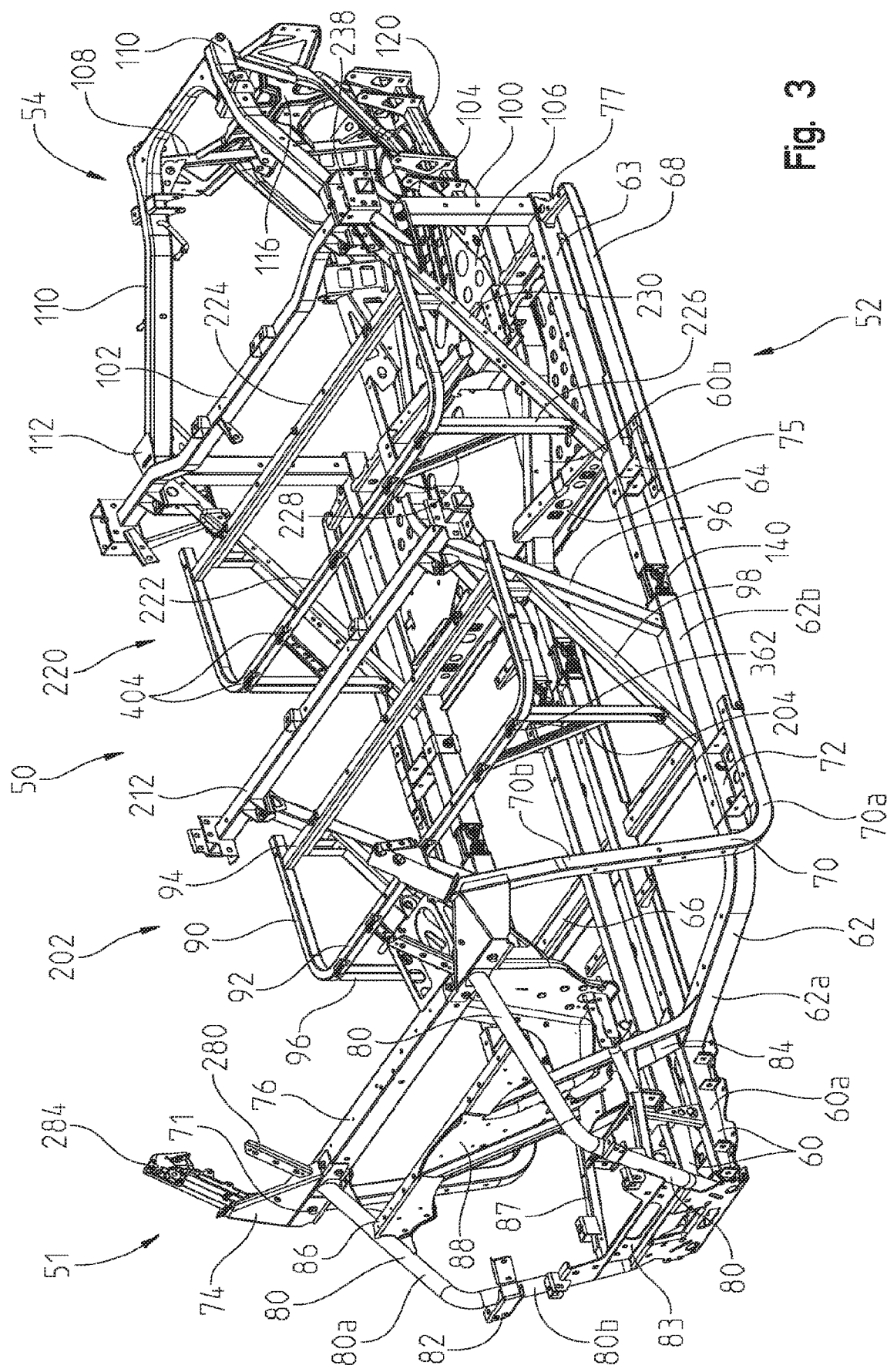
FIG. 3 is a left front perspective view of a frame assembly of the vehicle of FIG. 1.
Figure 4:
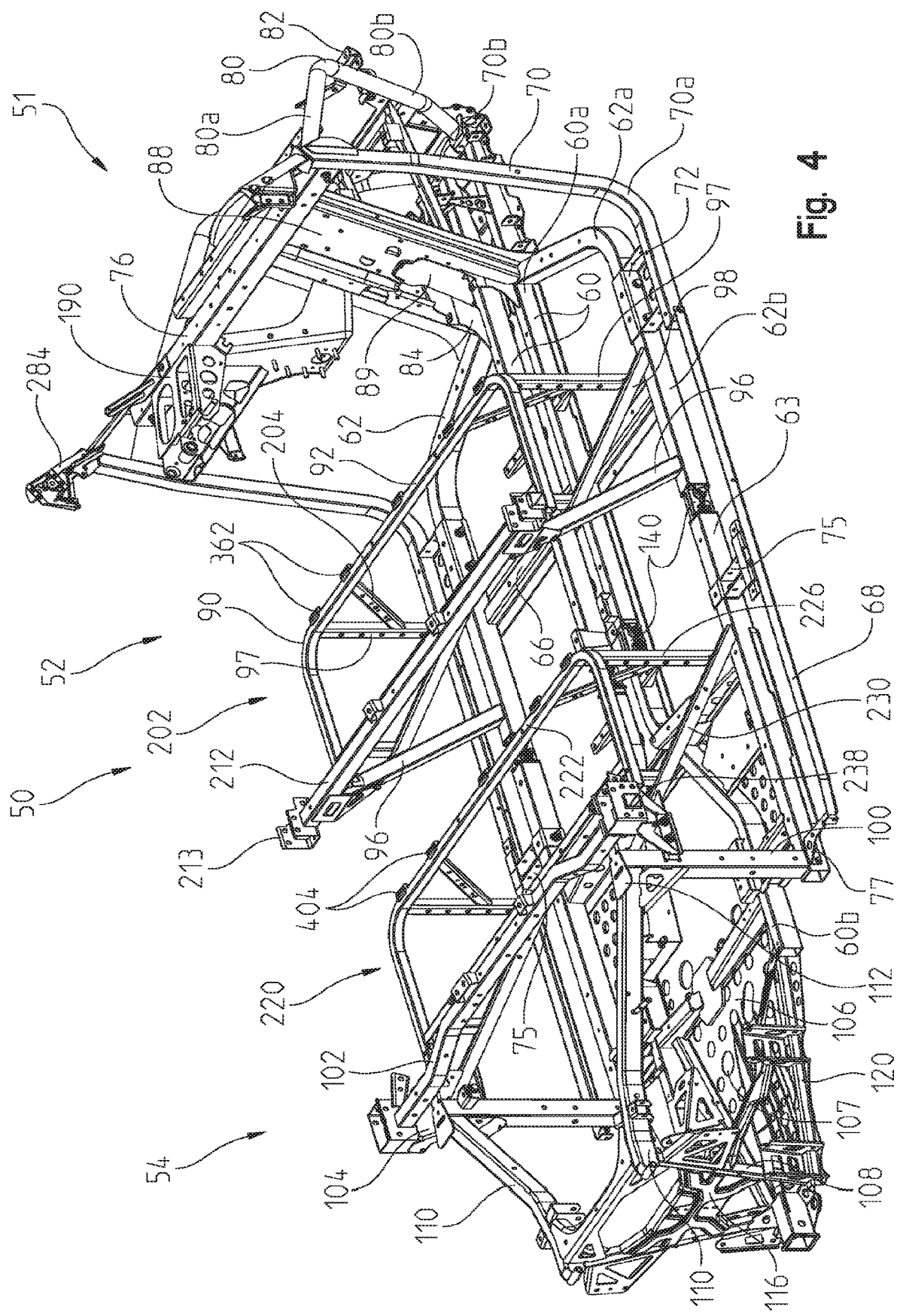
FIG. 4 is a right rear perspective view of the frame assembly of FIG. 3.
Figure 5:
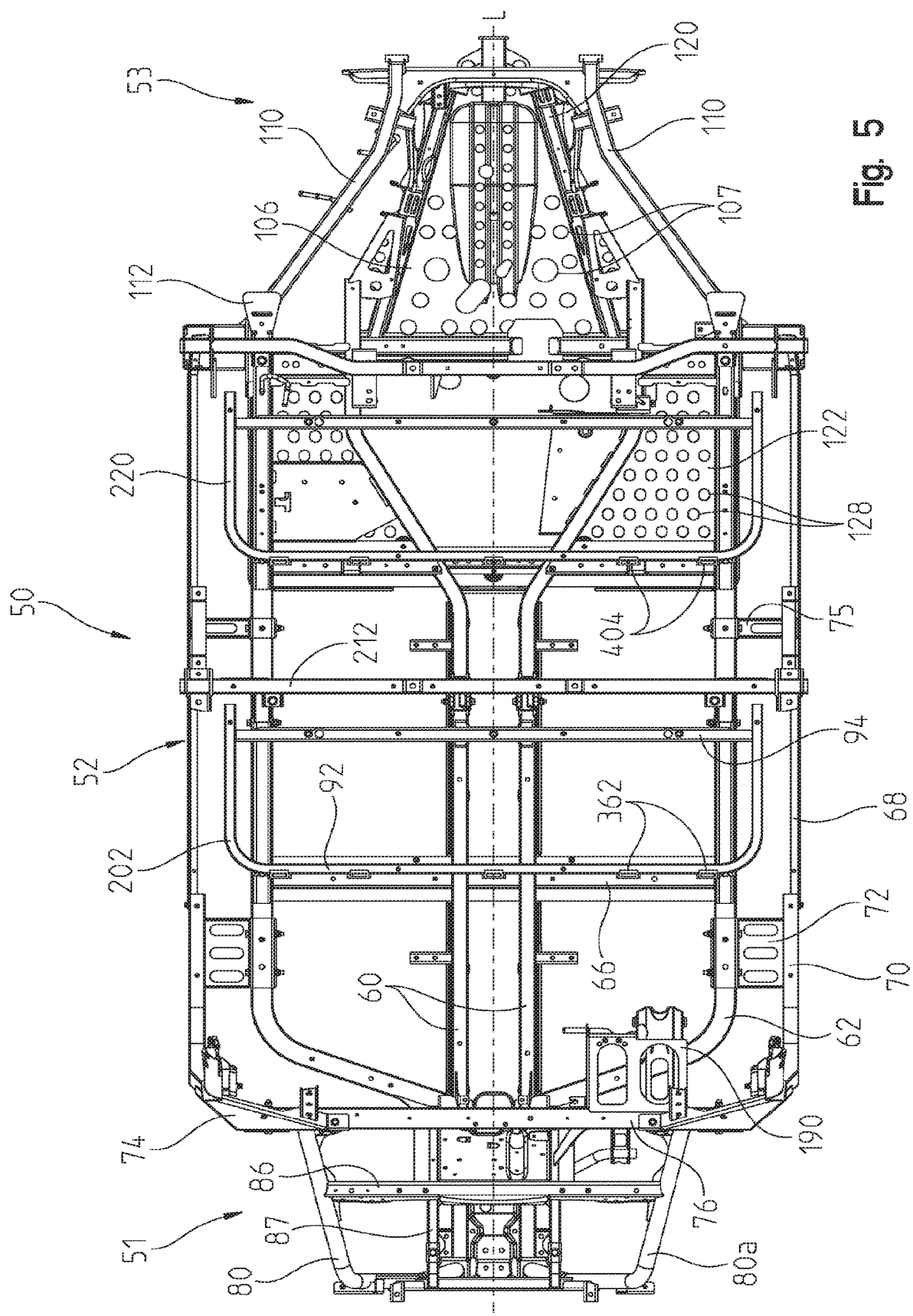
FIG. 5 is a top view of the frame assembly of FIG. 3.
Figure 6:
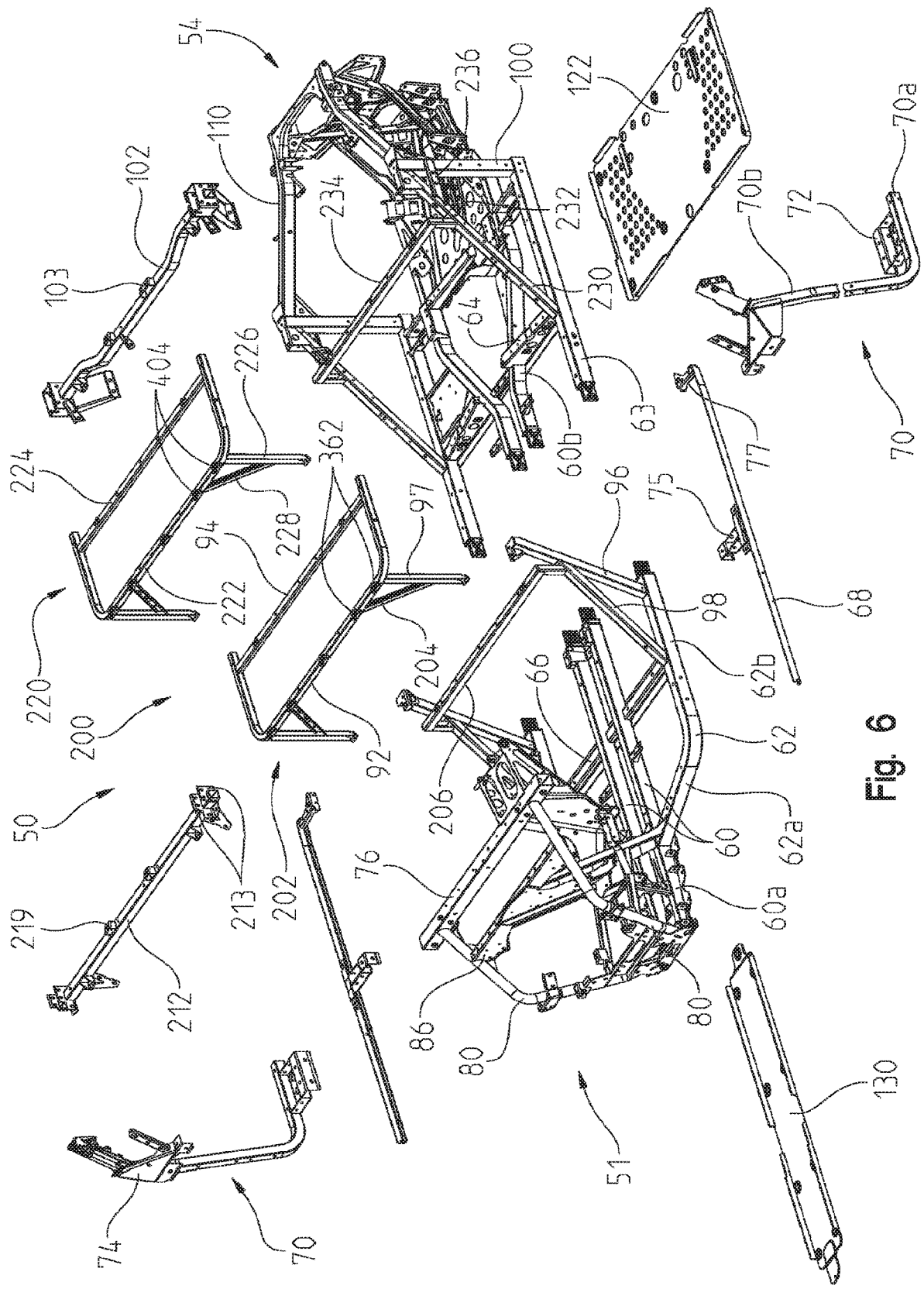
FIG. 6 is a front exploded view of the frame assembly of FIG. 3.
Figure 7:
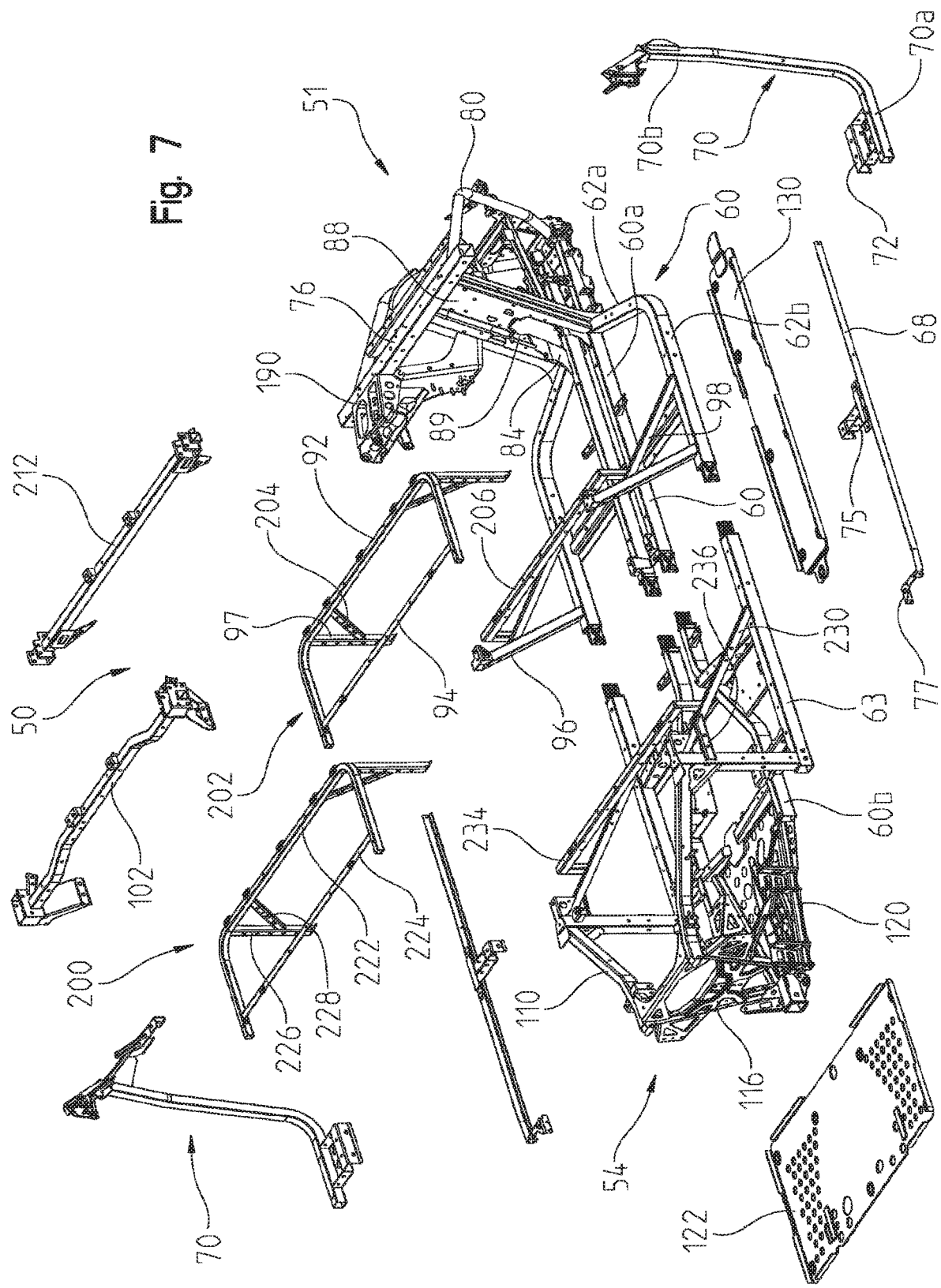
FIG. 7 is a rear exploded view of the frame assembly of FIG. 3.
Figure 8:
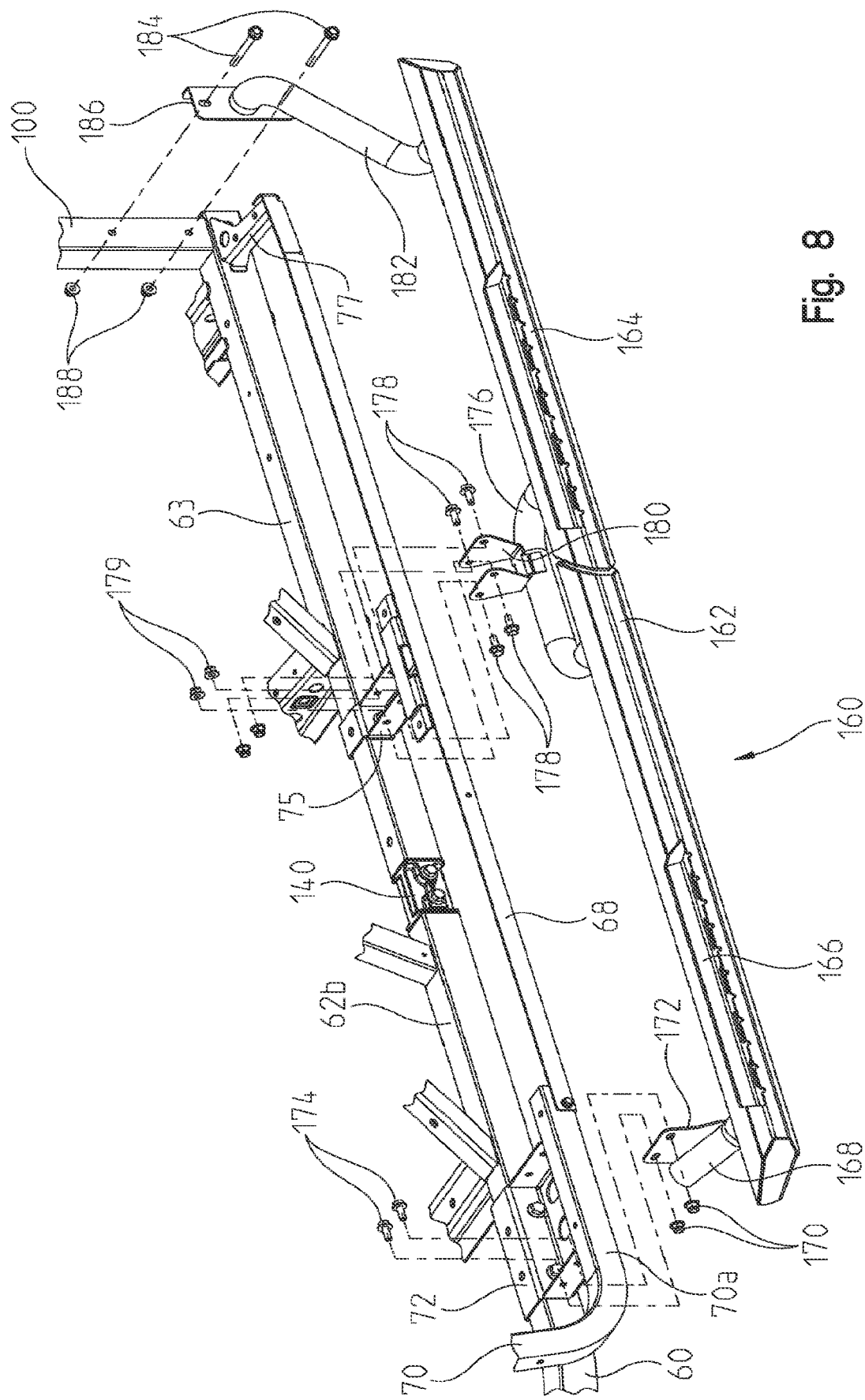
FIG. 8 is a side perspective view of a portion of the frame assembly of FIG. 7.

With reference to FIGS. 1-2, a utility vehicle 2 generally includes a frame assembly 50 supported by a plurality of ground engaging members, for example front wheels 4 and rear wheels 6. The wheel base of illustrative vehicle 2 may be approximately 110-115 inches. In one embodiment, the wheel base of vehicle 2 is approximately 113 inches. Front and rear wheels 4, 6 each may include a dual piston brake caliper, as is described further in U.S. patent application Ser. No. 11/494,891, filed on Jul. 28, 2006, and issued as U.S. Pat. No. 7,819,220 on Oct. 26, 2010, the complete disclosures of which are expressly incorporated by reference herein. Utility vehicle 2 includes a front end 8 having a hood 10 and body panels 12. A rear end 14 of utility vehicle 2 includes a utility cargo box 16.

Figure 44:
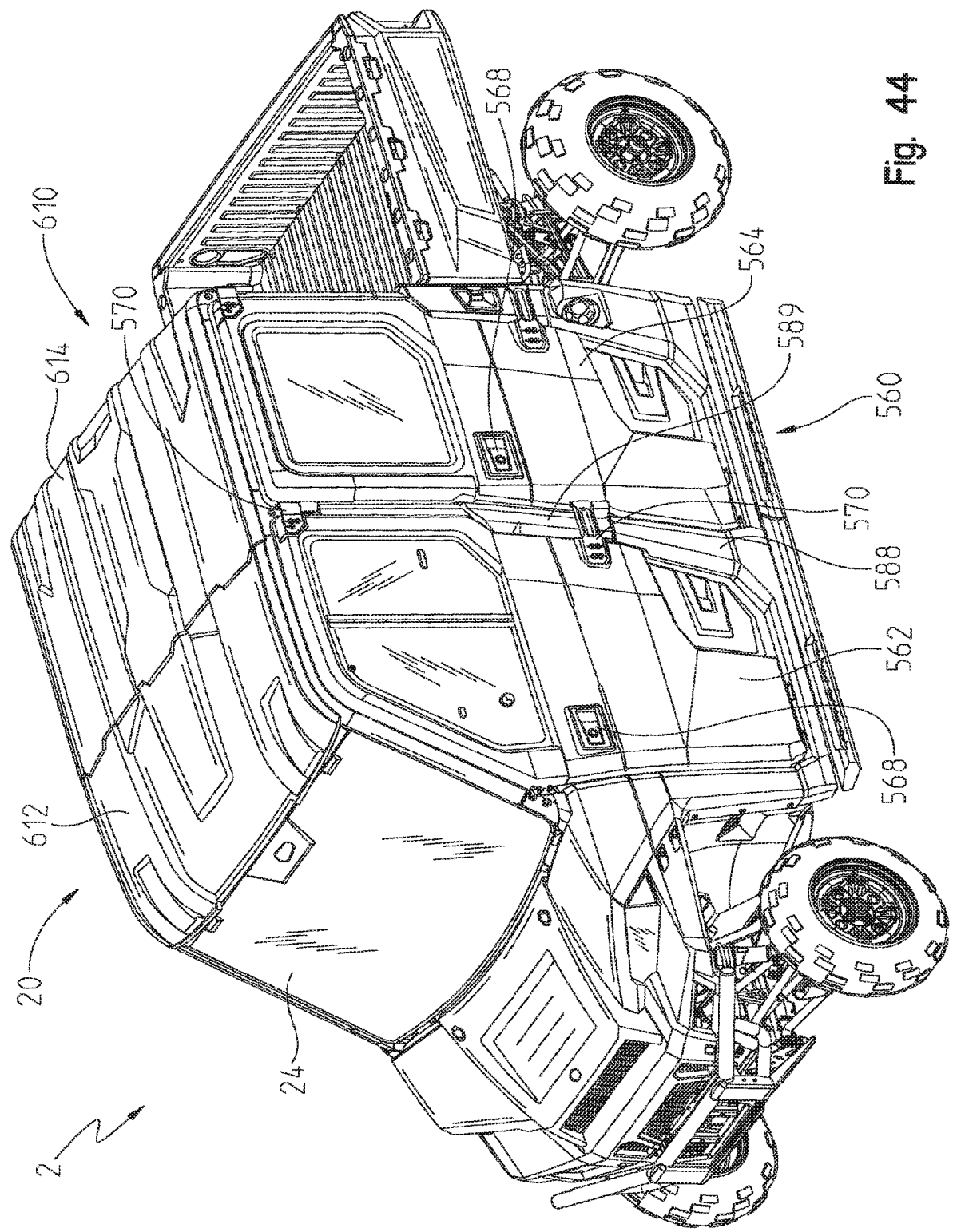
FIG. 44 is a front perspective view of an alternative embodiment of an operator cab of the vehicle of the present disclosure, including a roof assembly, a door assembly, and a front windshield.
Figure 45:
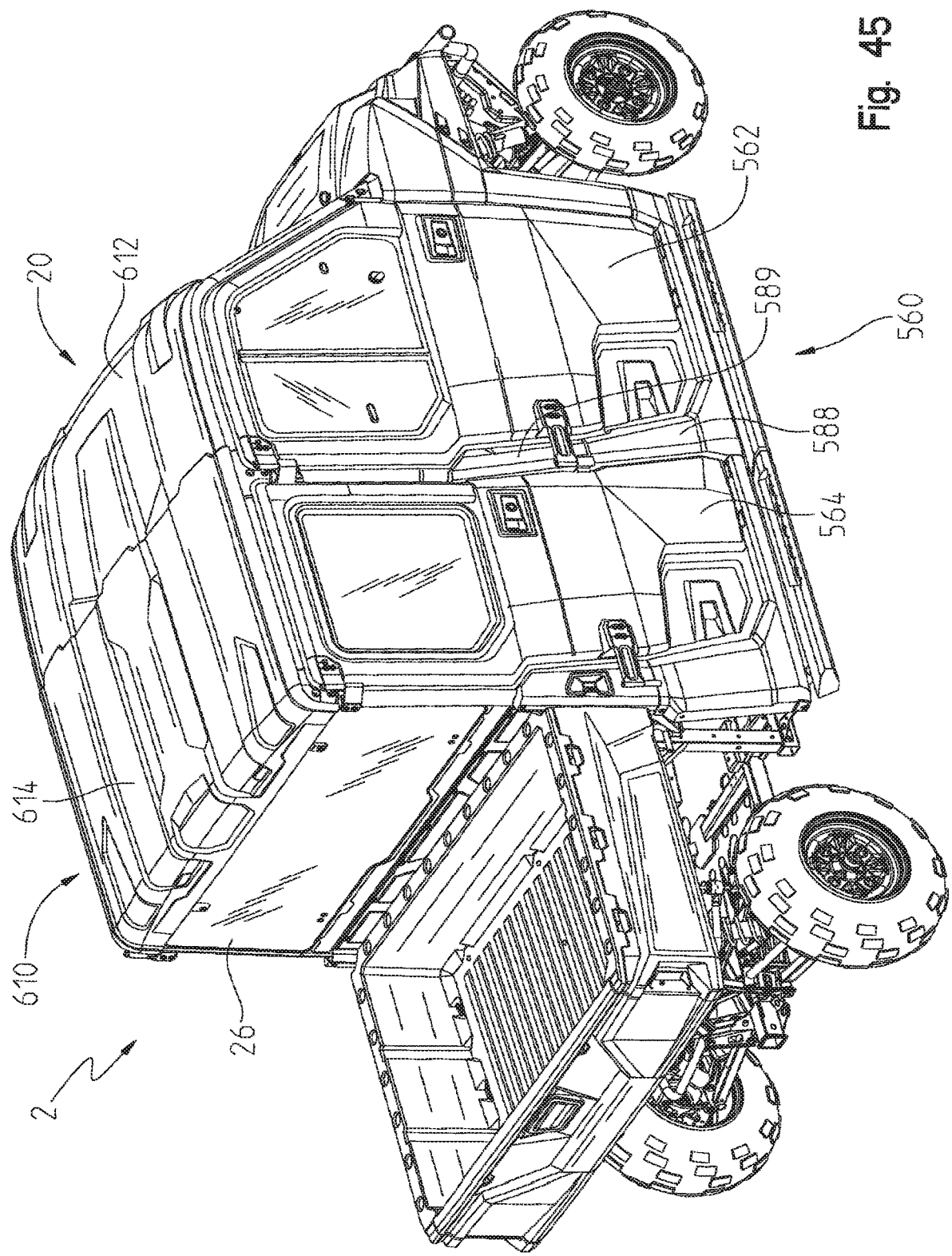
FIG. 45 is a rear perspective view of the operator cab of FIG. 44, including a rear windshield.
Figure 46:
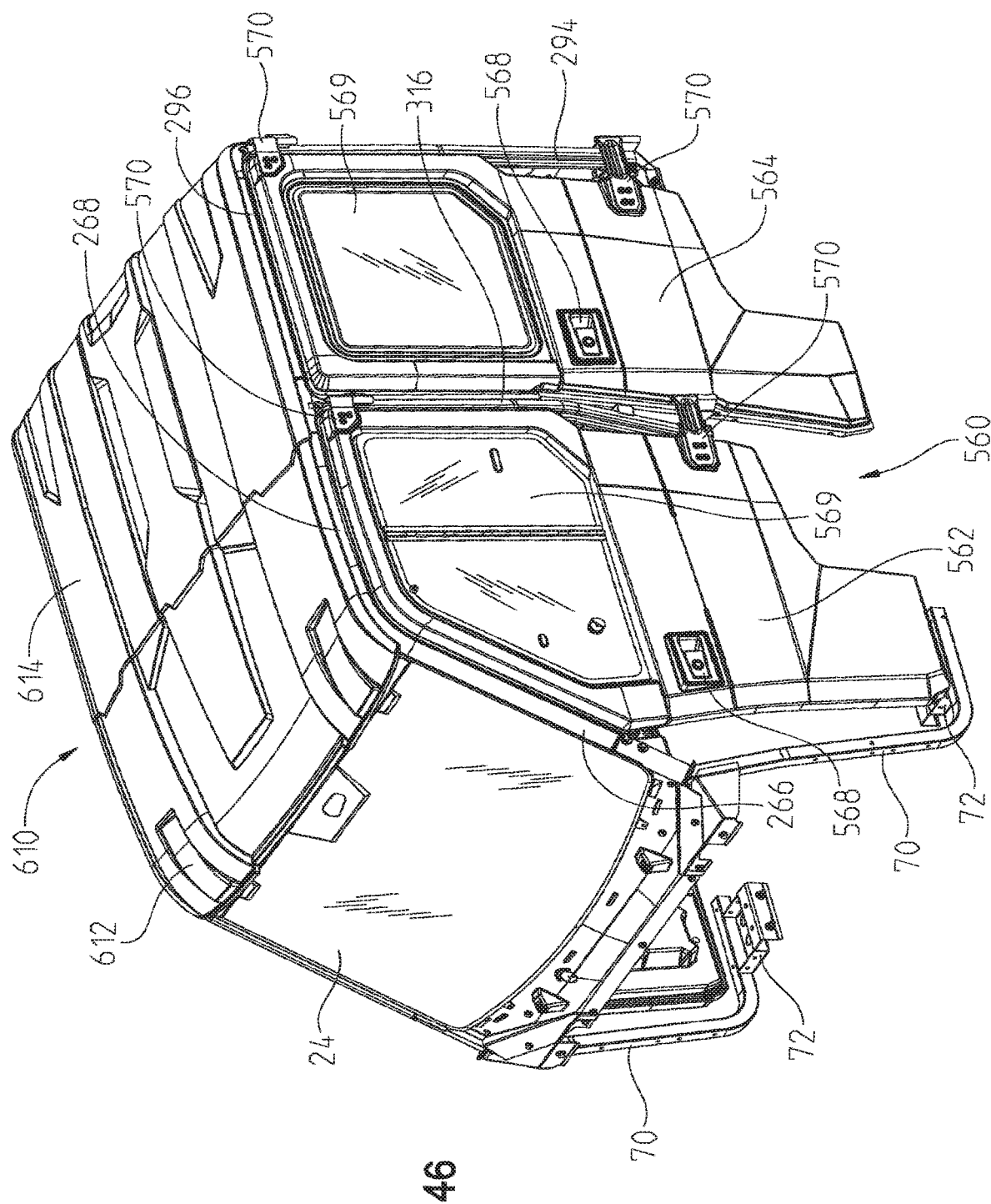
FIG. 46 is a front perspective of the operator cab of FIG. 44.
Figure 47:
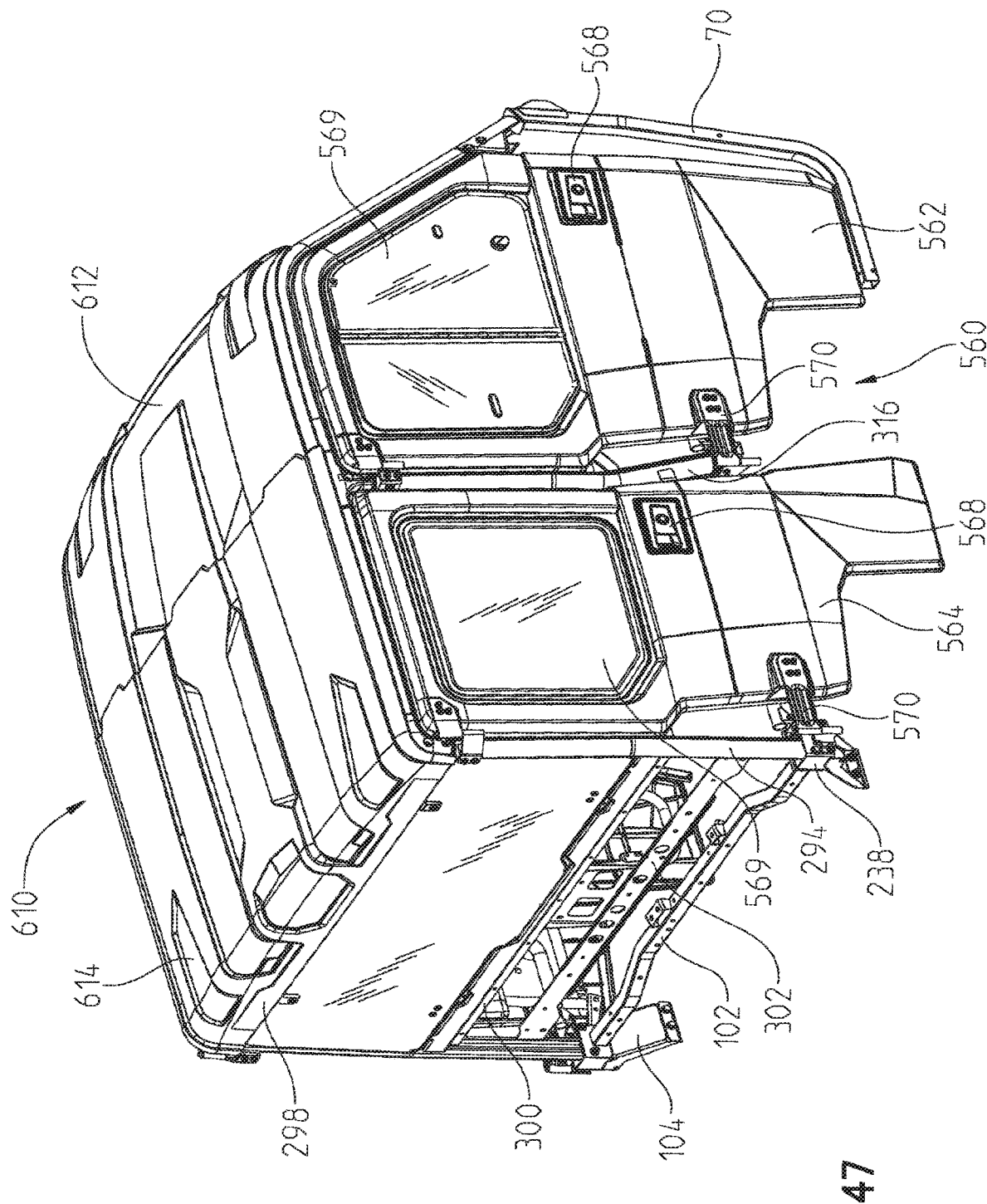
FIG. 47 is a rear perspective view of the operator cab of FIG. 44.
Figure 48:
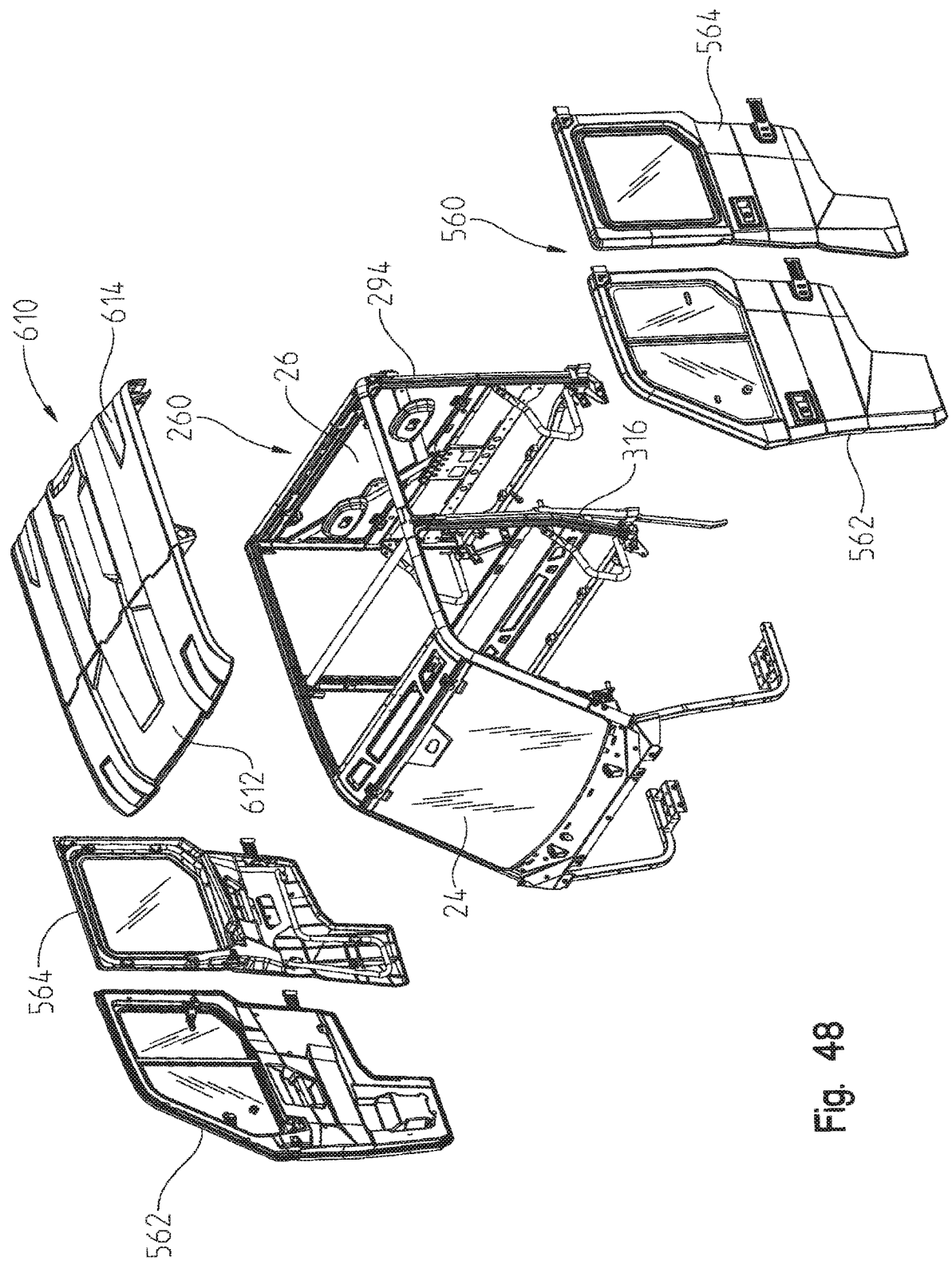
FIG. 48 is a front exploded view of the operator cab of FIG. 46.

An integrated operator cab 20 is supported on frame assembly 50 between front end 8 and rear end 14 and illustratively encloses an operator area 22. An upper frame assembly, illustratively a roll cage assembly 260, surrounds operator cab 20. As shown in FIGS. 44 and 45, roll cage assembly 260 may support a front windshield 24, a door assembly 560, a roof assembly 610, and a rear windshield 26, all of which may be removably coupled from roll cage assembly 260, as further detailed herein. Operator area 22 comprises a seating assembly 200 having at least a front seating section 202 and a rear seating section 220 (shown best in FIG. 25).

Operator controls, such as a steering assembly 430 and throttle controls 460, are supported within cab 20. The operator controls may be positioned on and within a dashboard 28 of operator cab 20. The operator controls are configured to monitor, operate, and control the various systems of utility vehicle 2, such as a powertrain assembly 470 (FIG. 36) and an electrical system. Additionally, operator controls may include controls for an HVAC assembly. Illustratively, vehicle 2 includes at least a heating assembly. Other operator controls may be configured to control accessories such as a winch and certain operator controls may include a wireless remote.

Referring to FIGS. 1 and 2, frame assembly 50 supports a front suspension assembly 30, shown in FIG. 1, which includes an upper alignment arm 32, a lower alignment arm 34, and a shock absorber 36. Shock absorber 36 may include spring coils and/or may be hydraulically operated. Frame assembly 50 further supports a rear suspension assembly 40, which includes an upper alignment arm 42, a lower alignment arm 44, and a shock absorber 46, as shown in FIG. 2. Additional details of front suspension assembly 30 and rear suspension assembly 40 are included in U.S. patent application Ser. No. 11/494,891, filed on Jul. 28, 2006, and issued as U.S. Pat. No. 7,819,220 on Oct. 26, 2010; U.S. Provisional Patent Application Ser. No. 61/442,071, filed on Feb. 11, 2011; U.S. patent application Ser. No. 13/370,139, filed on Feb. 9, 2012; U.S. patent application Ser. No. 13/464,603, filed on May 4, 2012; and U.S. patent application Ser. No. 13/492,589, filed on Jun. 8, 2012, the complete disclosures of which are expressly incorporated by reference herein.

As shown in FIGS. 3-7, frame assembly 50 generally includes a front frame portion 51, a mid-frame portion 52, and a rear frame portion 54. Frame assembly 50 extends along a longitudinal axis L (FIG. 5) between front frame portion 51 and rear frame portion 54. A plurality of lower longitudinal frame tubes 60 extend generally lengthwise between front frame portion 51 and rear frame portion 54. Illustratively, lower longitudinal frame tubes 60 each include a front portion 60a and a rear portion 60b. Rear portion 60b flares outwardly from front portion 60a. As shown best in FIGS. 6 and 7, a skid plate 130 may be coupled to front portion 60a of lower longitudinal frame tubes 60, as detailed further herein. Outer frame members 62 are positioned laterally outward from lower longitudinal frame tubes 60. More particularly, a front portion 62a of outer frame member 62 is adjacent to, and couples with, front portion 60a, and a rear portion 62b of outer frame member 62 is spaced apart from rear portion 60b of lower longitudinal frame tube 60. Rear portion 62b is coupled to a longitudinal member 63 and a cross tube 64 extends between lower longitudinal frame tubes 60 and longitudinal member 63. A frame channel 66 integrally couples each longitudinal frame tube 60 with the adjacent outer frame member 62.

Figure 9:
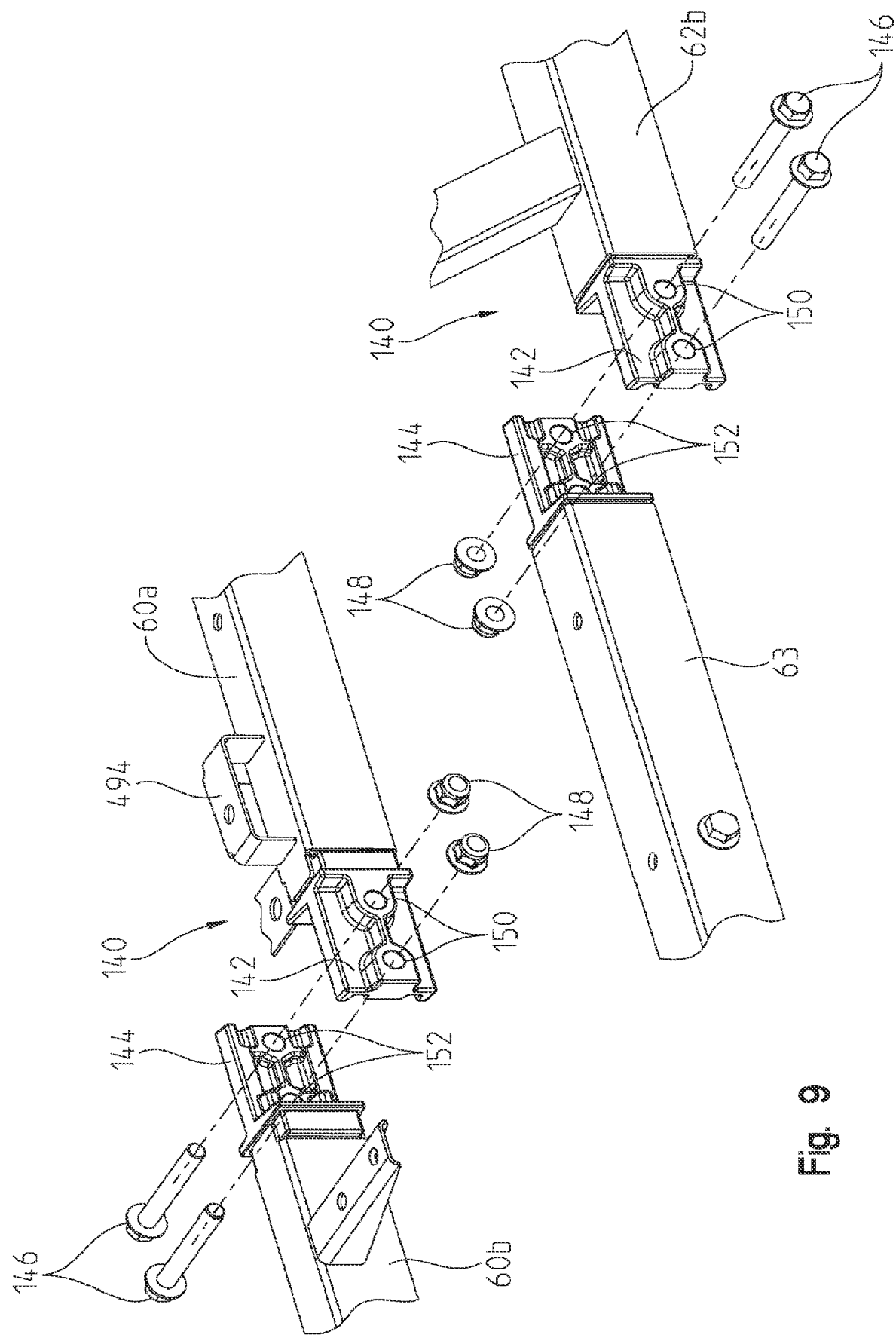
FIG. 9 is an exploded view of a coupler of the frame assembly of FIG. 3.

Referring to FIG. 9, a plurality of couplers 140 join together various components of frame assembly 50. Illustratively, couplers 140 join together front section 60a and rear section 60b of lower longitudinal frame tubes 60. Additionally, couplers 140 join together rear portion 62b of frame members 62 and longitudinal member 63. Couplers 140 include an outer member 142 and an inner member 144. In one embodiment, outer member 142 and inner member 144 may be the same component and arranged in an opposing orientation. A portion of outer member 142 may be received within front section 60a of lower longitudinal frame tubes 60 and/or rear portion 62b of outer frame members 62 and may be coupled thereto with conventional fasteners (e.g., welds, bolts, screws, rivets, adhesive). Similarly, a portion of inner member 144 may be received within rear section 60b of lower longitudinal frame tubes 60 and/or longitudinal members 63 and may be coupled thereto with welds, bolts, rivets, adhesive, or other conventional fasteners. As shown, outer member 142 and inner member 144 may be cast or otherwise formed with complementary surfaces, such that outer member 142 mates with inner member 144 when coupled together with fasteners 146 and 148. Fasteners 146 are received through apertures 150 in outer member 142 and apertures 152 in inner member 144 to couple with fasteners 148. Illustrative couplers 140 may be configured to couple with a plurality of frame tube sizes and/or frame tube profiles (e.g., square, circular). In one embodiment, frame assembly 50 may include eight couplers 140 to connect various components and sections of frame assembly 50. Additional details of couplers 140 may be found in U.S. patent application Ser. No. 12/796,495, filed on Jun. 8, 2010, which issued as U.S. Pat. No. 8,328,235 on Dec. 11, 2012, the complete disclosures of which are expressly incorporated by reference herein.

Referring again to FIGS. 3-7, a removable frame portion 70 is attached to each outer frame member 62 by way of a bracket 72. Rear portion 62b of outer frame member 62 is coupled to bracket 72 with fasteners 194 and 196, as shown best in FIG. 12, such that bracket 72 extends around rear portion 62b. As shown best in FIGS. 6 and 7, removable frame portion 70 has a lower frame portion 70a and a vertically upstanding portion 70b. Removable frame portion 70 further includes gussets 74 and conventional fasteners 71 coupled to upstanding portions 70b and a front transverse brace 76. Gussets 74 may support front windshield 24, as further detailed herein. Additionally, lower rails 68 are coupled to removable frame portions 70. As shown in FIGS. 3-7, lower rails 68 also are coupled to longitudinal member 63 with a bracket 75 and a support member 77. Additional details of removable frame portion 70 and brackets 72 may be included in U.S. Provisional Patent Application Ser. No. 61/442,071, filed on Feb. 11, 2011; U.S. patent application Ser. No. 13/370,139, filed on Feb. 9, 2012; U.S. patent application Ser. No. 13/464,603, filed on May 4, 2012; and U.S. patent application Ser. No. 13/492,589, filed on Jun. 8, 2012, the complete disclosures of which are expressly incorporated by reference herein.

In one embodiment, as shown in FIG. 9, frame assembly 50 may include nerf bars 160. Nerf bars 160 may include a front section 162 and a rear section 164. Front and rear sections 162, 164 may be configured with a traction portion 166 to facilitate ingress into and egress from vehicle 2. Illustratively, front section 162 is coupled to bracket 72 with a rounded tube 168. Tube 168 is coupled to bracket 72 with a plate 172 and fasteners 170 and 174. Plate 172 may be coupled to a forward-facing side of bracket 72. Front and rear sections 162, 164 may be coupled together with a tube 176. Additionally, tube 176 couples front and rear sections 162, 164 to bracket 75 on longitudinal member 63. More particularly, plates 180 of tube 176 couple with forward-facing and rearward-facing sides of bracket 75 and are secured thereto with fasteners 178 and 179. Nerf bars 160 also are coupled to support posts 100 with a tube 182 and a plate 186. Plate 186 and support posts 100 are configured to receive fasteners 184 and 188.

Referring again to FIGS. 3-7 and 10, front transverse brace 76 further supports frame tubes 80 at front frame portion 51. Frame tubes 80 extend in a forward direction from front transverse brace 76 and include a generally horizontal portion 80a and a generally vertical portion 80b. In particular, horizontal portion 80a is coupled to front transverse brace 76 and generally vertical portion 80b extends downwardly and may couple with lower longitudinal frame tubes 60. Frame tubes 80 include gussets 82 for removably mounting various components of vehicle 2 (e.g., a brush guard, a front end attachment, and/or body panels). A front support plate 83 is mounted to frame tubes 80 and lower longitudinal frame tubes 60.

As shown in FIGS. 3-7 and 10, a cross-member 86 extends between frame tubes 80 and illustratively is positioned forward of front transverse brace 76 and rearward of front support plate 83. As shown best in FIGS. 4 and 7, a shear panel 88, having an opening 89, couples with cross-member 86 and is angled rearwardly therefrom, as disclosed in U.S. Provisional Patent Application Ser. No. 61/442,071, filed on Feb. 11, 2011; U.S. patent application Ser. No. 13/370,139, filed on Feb. 9, 2012; U.S. patent application Ser. No. 13/464,603, filed on May 4, 2012; and U.S. patent application Ser. No. 13/492,589, filed on Jun. 8, 2012, the complete disclosures of which are expressly incorporated by reference herein. Opening 89 may allow wires, a plurality of cooling tubes 479, hydraulic hoses, and other conduits to extend between various components of vehicle 2. The lower portion of shear panel 88 couples with lower longitudinal frame tubes 60 and/or outer frame members 62. In one embodiment, shear panel 88 is coupled to longitudinal frame tubes 60 with gussets 84, as shown in FIGS. 3, 4, 7, and 10. Gussets 84 may maintain bending stresses of vehicle 2 and provide increased strength and stiffness to frame assembly 50. Shear panel 88 also is coupled to support plate 83 through a plurality of braces 87 (FIGS. 3-5 and 10).

Figure 10:
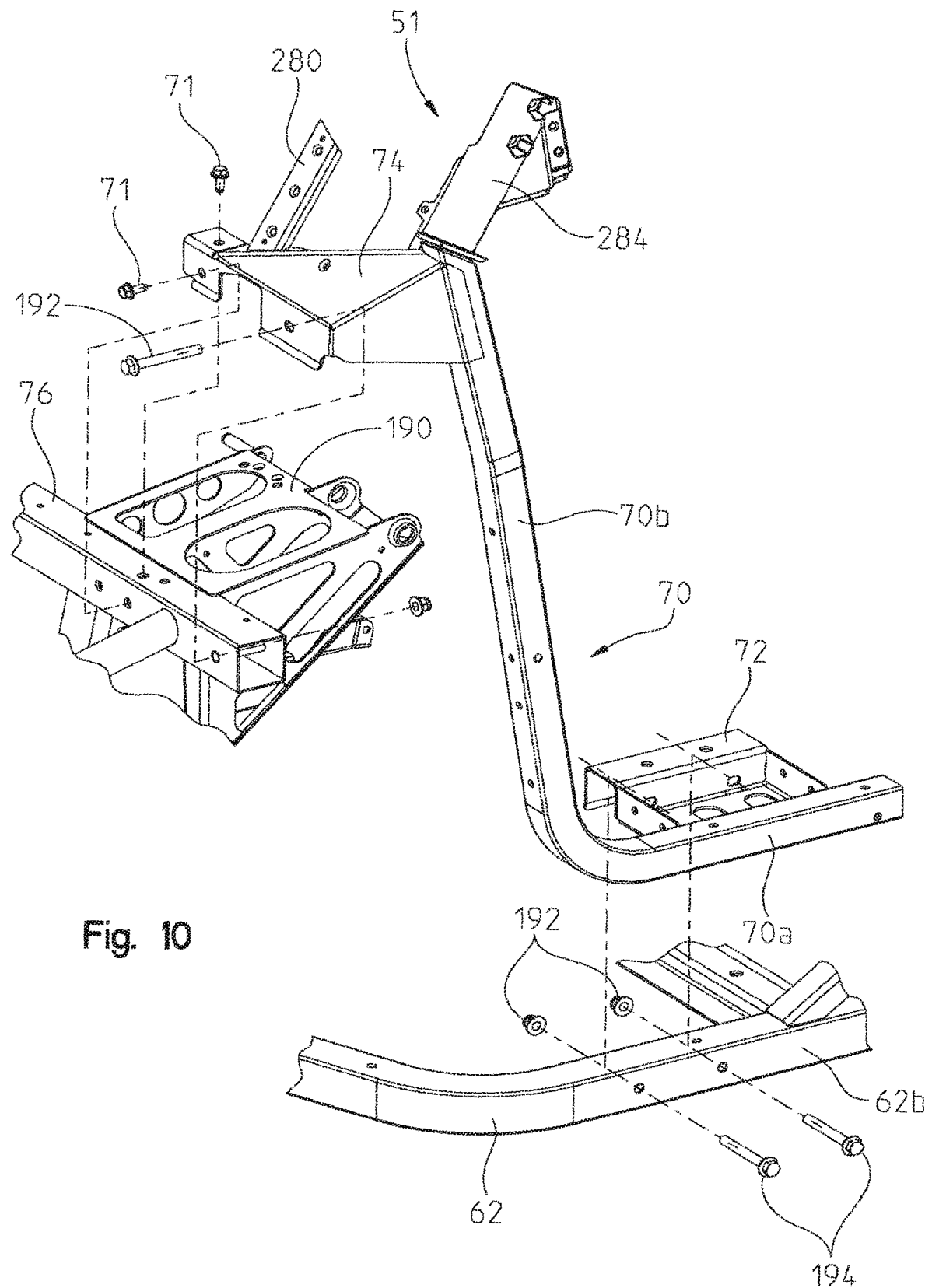
FIG. 10 is an exploded view of a portion of the frame assembly of FIG. 3.

With respect to FIG. 10, front frame portion 51 includes a support member 190 for steering assembly 430. Support member 190 is coupled to front transverse brace 76 and is further coupled to gusset 74 of removable frame portion 70 with fasteners 71 and 192.

Figure 11:
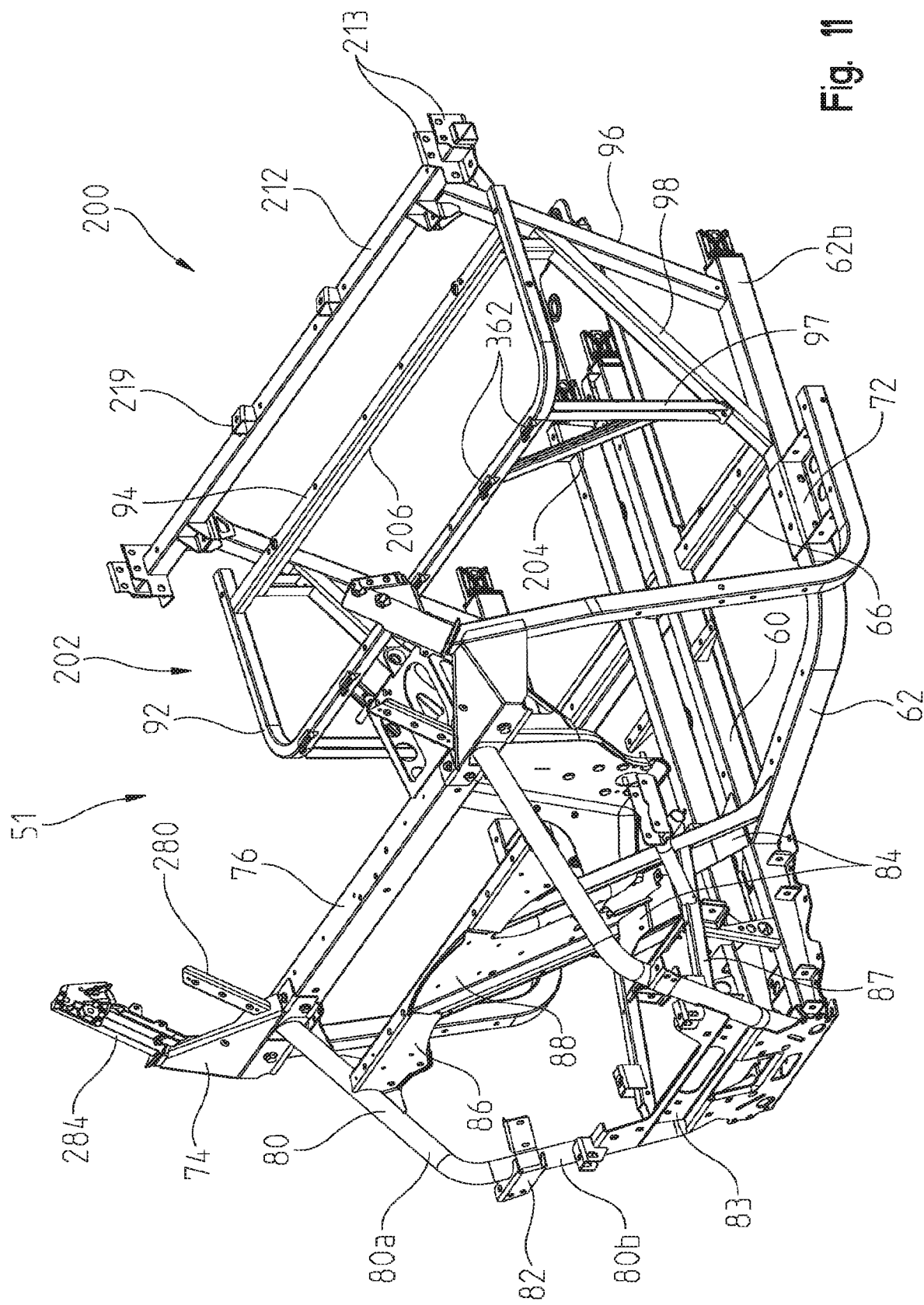
FIG. 11 is a front perspective view of a front section of the frame assembly of FIG. 3.
Figure 12:
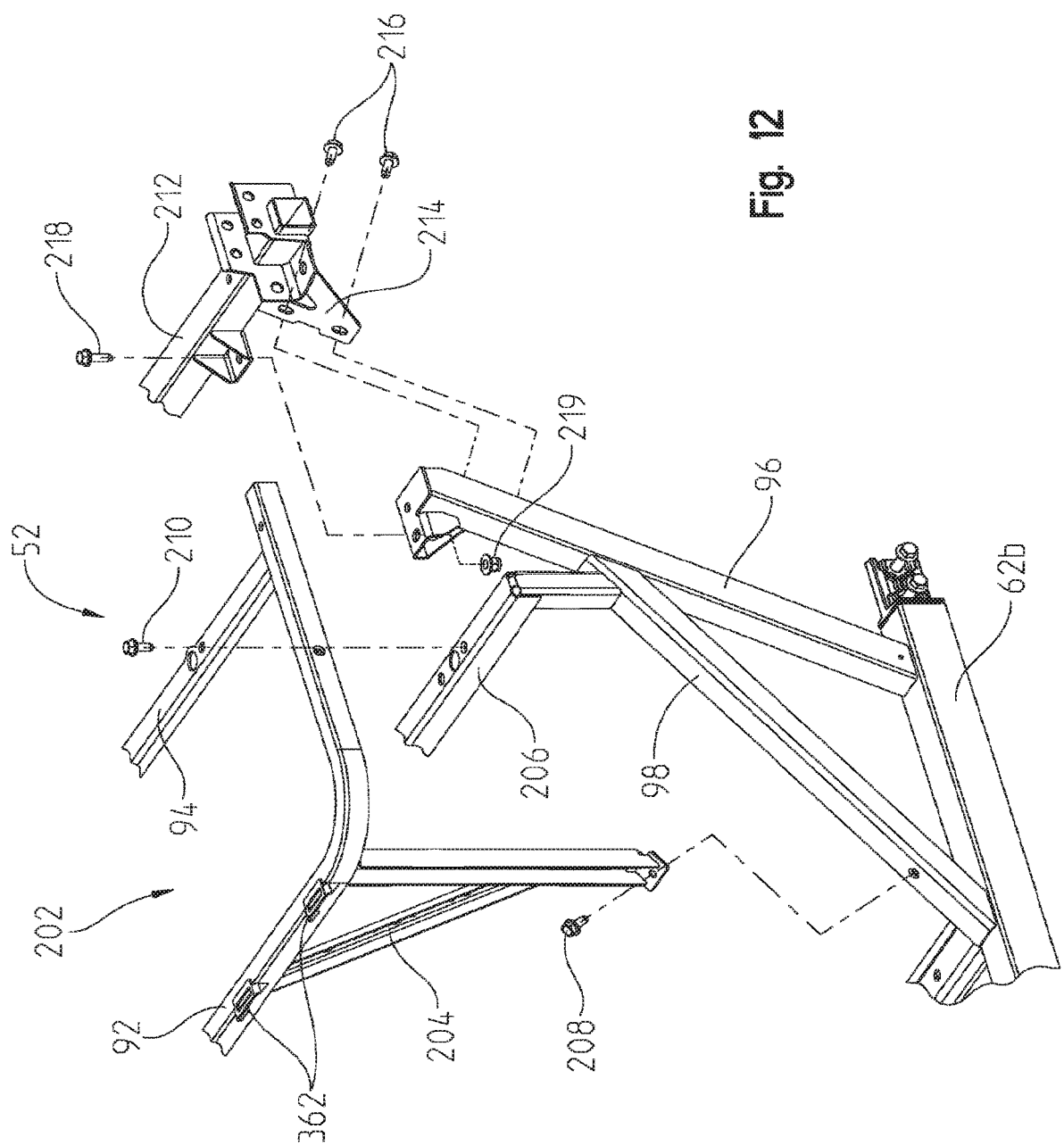
FIG. 12 is an exploded view of a portion of a front seating section of the frame assembly of FIG. 10.
Figure 25:
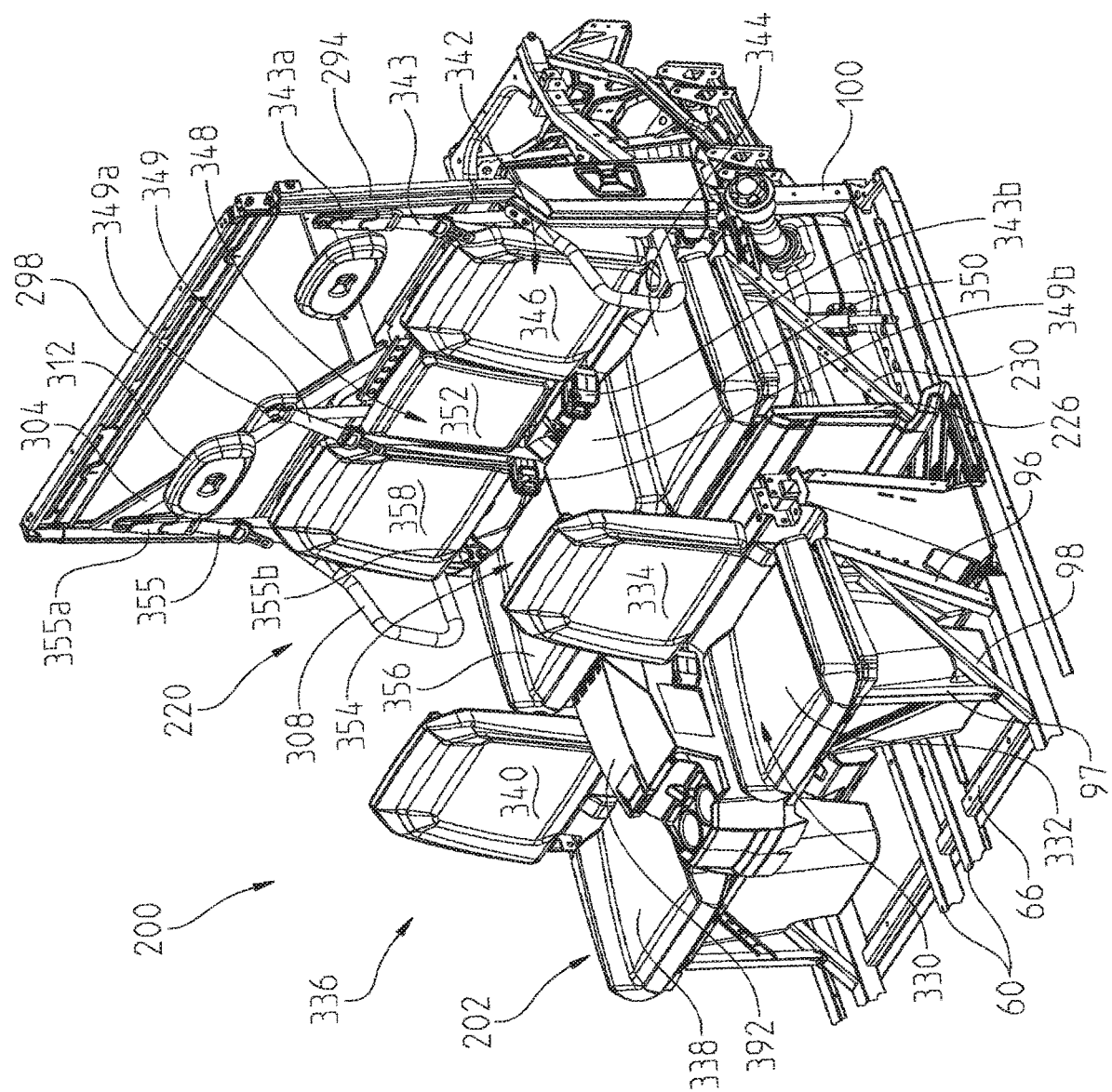
FIG. 25 is a left front perspective view of an operator area of the vehicle of the present disclosure.

Referring to FIGS. 11 and 12, mid-frame portion 52 of frame assembly 50 includes seating assembly 200 having front seating section 202 and rear seating section 220. Front seating section 202 supports an operator seat 330 and a front passenger seat 336 within operator area 22 (FIG. 25). Front seating section 202 includes transversely extending frame tubes 92 and 94 supported by upstanding braces 96, 97 and diagonal braces 98, 204. Diagonal braces 98 and upstanding braces 96 are coupled to rear portions 62b of outer frame members 62. Upstanding braces 96 also may be coupled to a transverse frame member 212 via a plate 214 and fasteners 216, 218, and 219, as shown best in FIG. 12. Transverse frame member 212 includes plates 213 for coupling with other components of vehicle 2, as detailed further herein.

Upstanding brace 97 is coupled to diagonal brace 98 with a fastener 208. Diagonal brace 204 extends between frame tube 92 and upstanding brace 97. Frame tube 94 may be coupled to a transverse frame tube 206 with a fastener 210.

Figure 13:
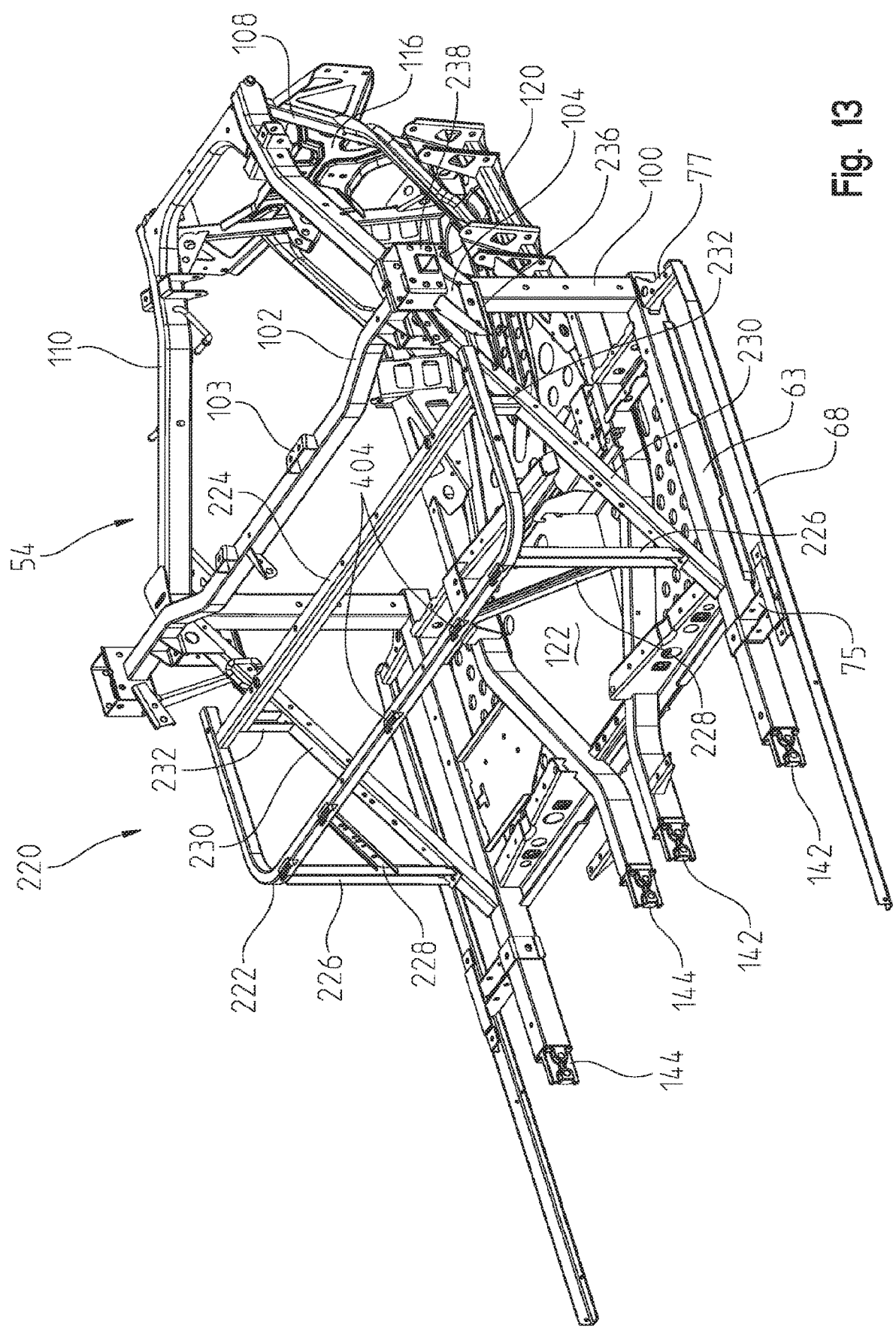
FIG. 13 is a left front perspective view of a rear section of the frame assembly of FIG. 3.
Figure 14:
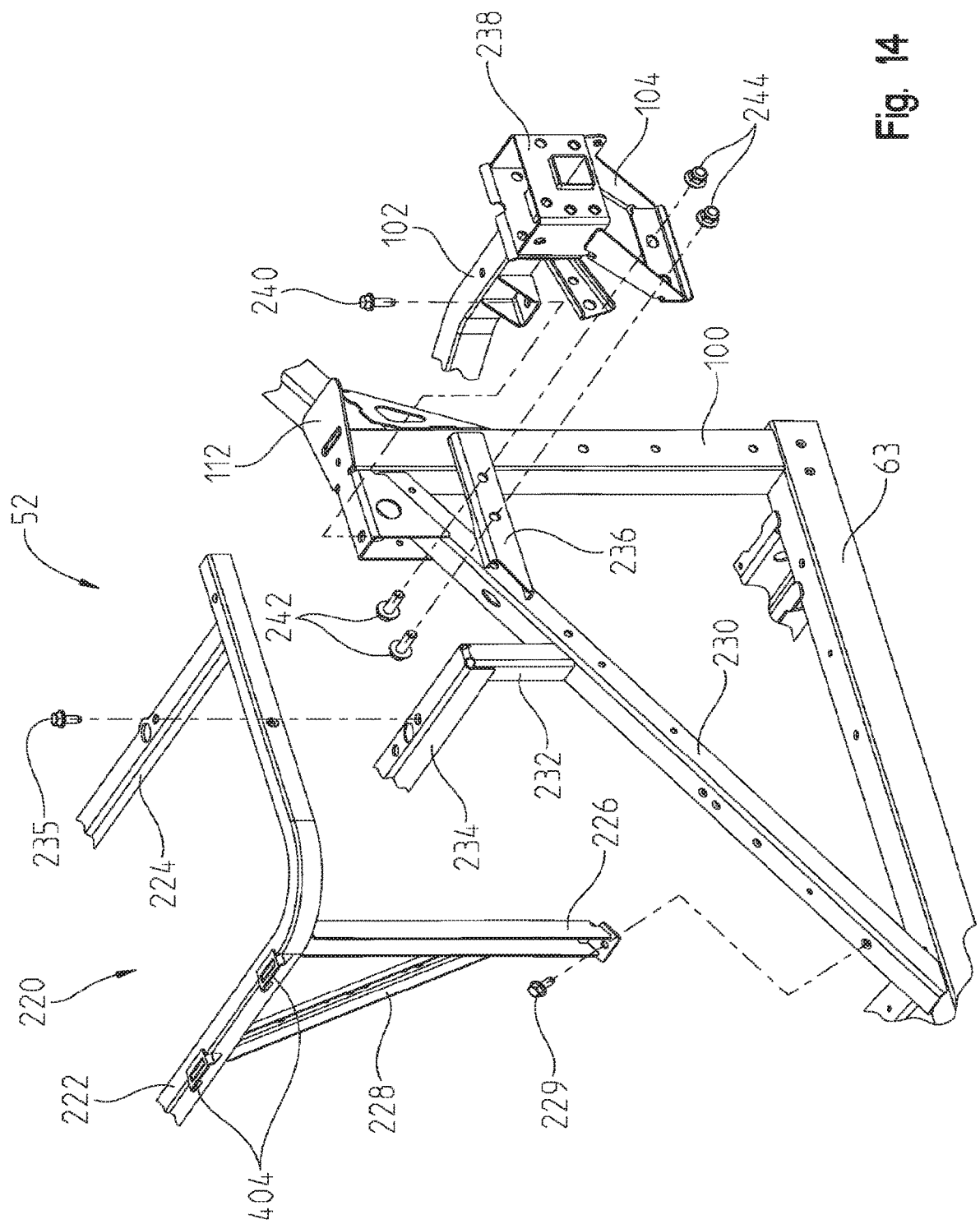
FIG. 14 is an exploded view of a rear seating section of the frame assembly of FIG. 13.
Figure 15:
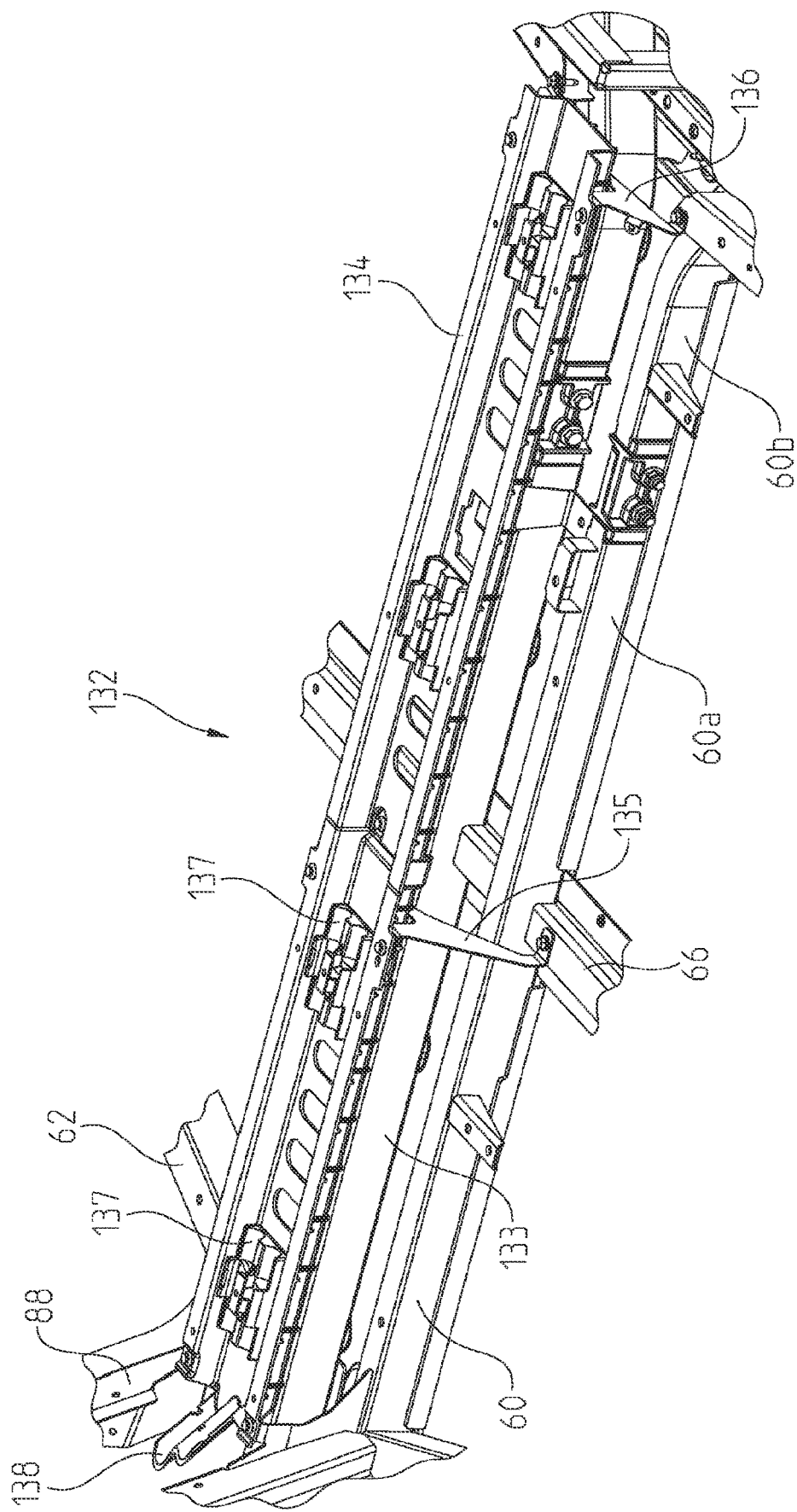
FIG. 15 is a left rear perspective view of a tunnel assembly of the frame assembly of FIG. 3.

As shown in FIGS. 13 and 14, mid-frame portion 52 of frame assembly 50 further supports rear seating section 220 for a first rear passenger seat 342, a second rear passenger seat 348, and a third rear passenger seat 354 (FIG. 25). Rear seating section 220 includes transversely extending frame tubes 222, 224 supported by upstanding portions 226. More particularly, frame tube 222 is coupled to an upstanding portion 226 via a diagonal brace 228. Rear seating section 220 is coupled to longitudinal member 63 by a diagonal brace 230. Upstanding portion 226 is coupled to diagonal brace 230 with a fastener 229. As shown in FIG. 14, diagonal brace 230 also supports a frame member 232 for coupling a frame member 234 to frame tube 224 with a fastener 235.

A brace 236 couples diagonal brace 230 to a support post 100, which extends upwardly from longitudinal members 63. Support posts 100 and braces 236 are coupled to a transverse beam 102 through mounting flanges 112 and 104, respectively. As shown best in FIG. 14, mounting flange 104 includes a bracket 238 coupled to transverse beam 102 and is coupled to brace 236 with fasteners 242, 244. Additionally, mounting flange 112 is coupled to transverse beam with a fastener 240. Support posts 100 are coupled to diagonal braces 230 through braces 236. In one embodiment, transverse beam 102 may be removable from support posts 100 in order to assemble components of powertrain assembly 470 with frame assembly 50.

As best shown in FIGS. 5-7 and 14, mid-frame portion 52 of frame assembly 50 further includes a skid plate 122 that extends between outer frame members 62. Skid plate 122 couples with longitudinal members 63 and cross tube 64. Skid plate 122 includes a plurality of apertures 128 (FIG. 5), which reduce the weight of frame assembly 50 and allow heat from powertrain assembly 470 to dissipate from vehicle 2.

With respect now to FIGS. 3-7 and 13, rear frame portion 54 includes an engine pan 106 positioned rearward of skid plate 122 and extending between lower longitudinal frame tubes 60. Pan 106 defines a support platform for powertrain assembly 470 of vehicle 2 and is supported by a plurality of lower frame members 120. Illustratively, pan 106 is integrally coupled with lower frame members 120 through a stamping process. Alternatively, pan 106 and lower frame members 120 may be separate components coupled together through conventional joining methods (bolts, welds, adhesive, rivets, etc.). Illustrative pan 106 includes a plurality of apertures 107 (FIG. 5), which reduce the weight of frame assembly 50 and allow heat from powertrain assembly 470 to dissipate from vehicle 2.

A plurality of vertically-extending tubes 108 are coupled to pan 106 and a plurality of upper frame arms 110. Upper frame arms 110 also are coupled to posts 100 through mounting flanges 112. Rear frame portion 54 further includes a rear support plate 116 coupled to vertically-extending tubes 108 and lower frame members 120.

With respect to FIGS. 15-18, a tunnel member 132 is defined by skid plate 130, a first harness 133, a second harness 134, a first bracket 135, and a second bracket 136. Tunnel member 132 is coupled to shear panel 88 and cross tubes 64. Tunnel member 132 is supported on frame assembly 50 above lower longitudinal frame tubes 60 and, more particularly, is positioned above front portion 60a of frame tubes 60. Illustratively, tunnel member 132 extends between front frame portion 51 and rear frame portion 54.

As shown in FIGS. 15-18, first and second harnesses 133 and 134 may be comprised of a polymeric material and, illustratively, include retaining clips 137 for supporting cooling tubes 479, hydraulic hoses, electrical wires, and/or other conduits. Additionally, first harness 133 supports a guide member 138 for locating and aligning cooling tubes 479, hydraulic hoses, electrical wires, and/or other conduits at front frame portion 51 with retaining clips 137.

Figure 16:
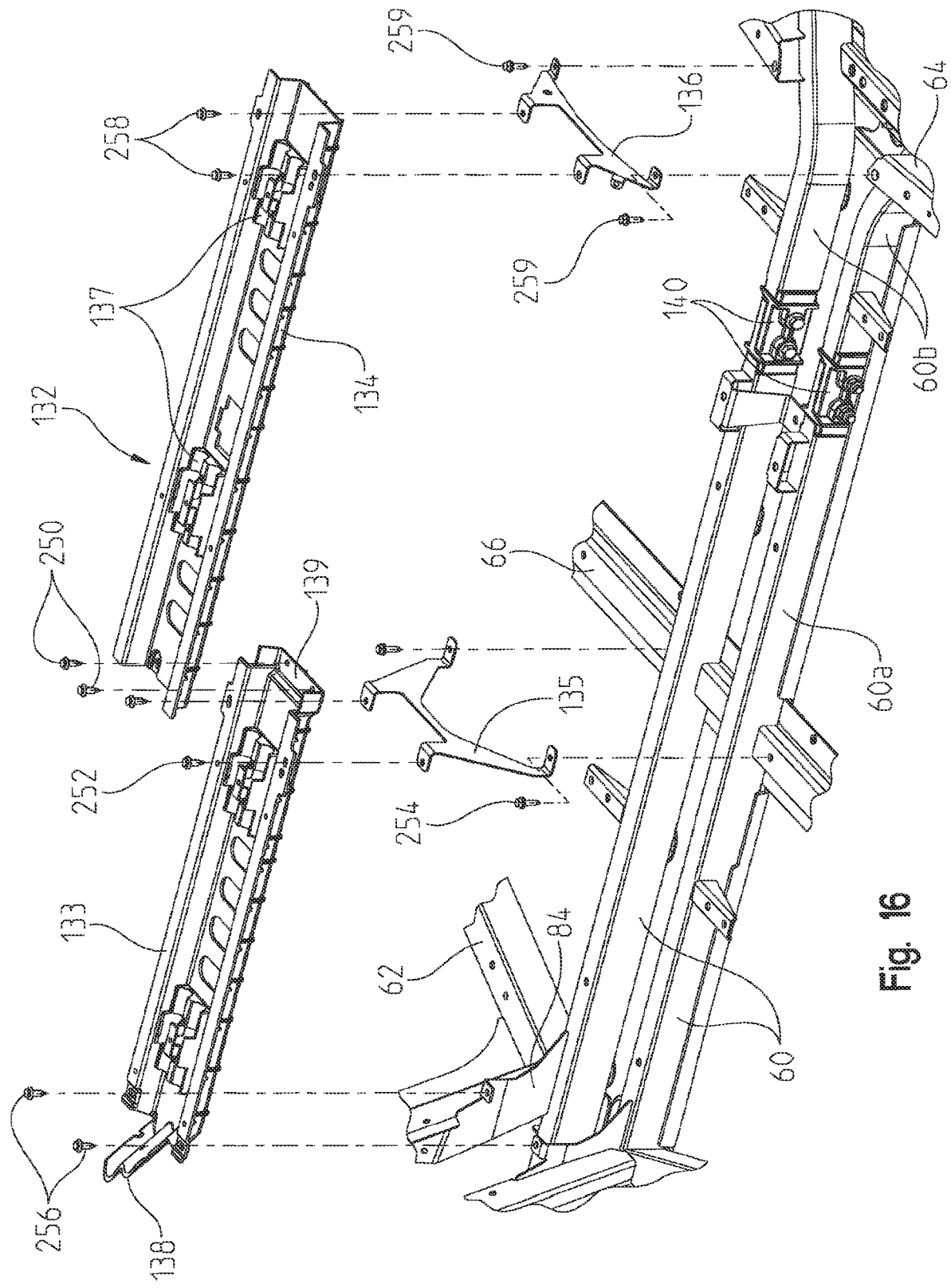
FIG. 16 is an exploded view of the tunnel assembly of FIG. 15.
Figure 17:
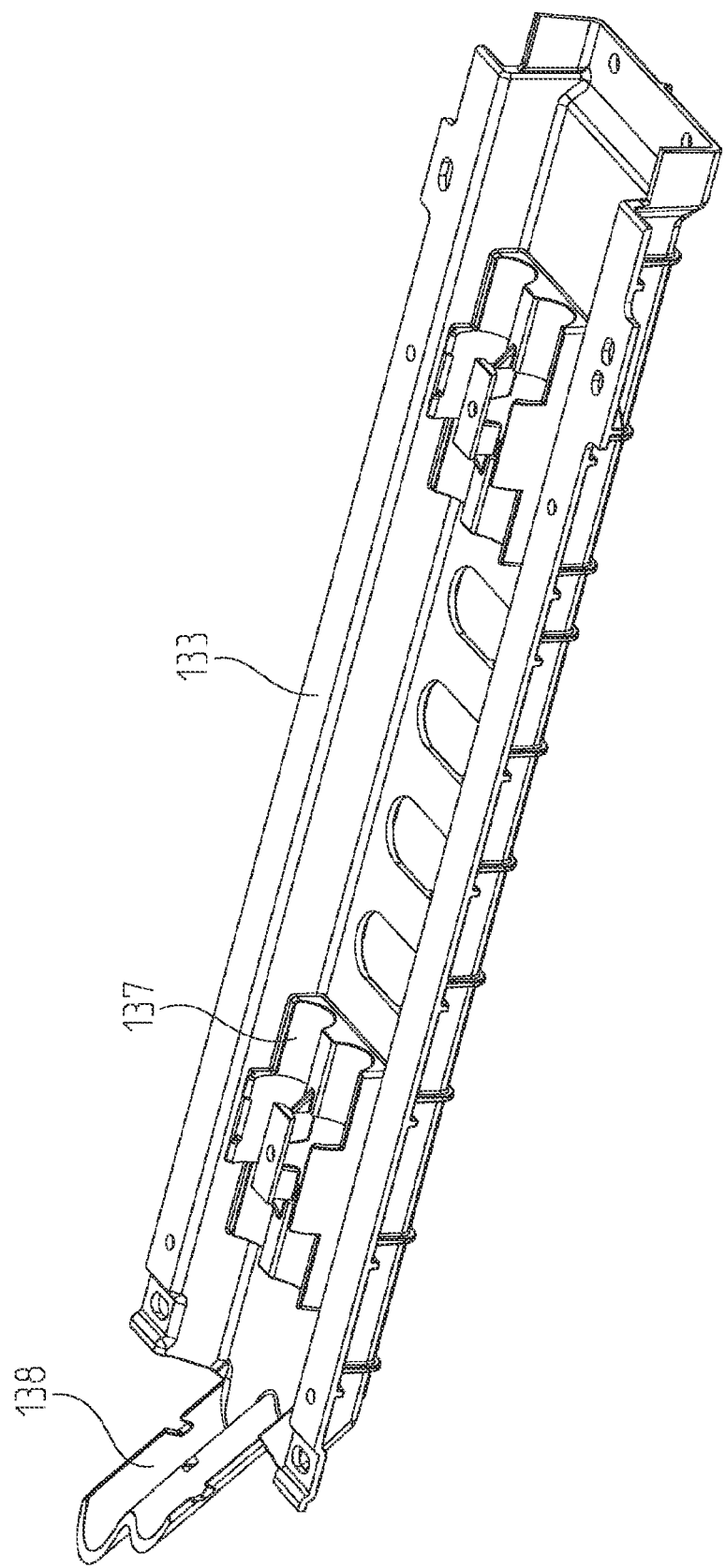
FIG. 17 is a left rear perspective view of a portion of the tunnel assembly of FIG. 15.

As shown in FIG. 16, first harness 133 is coupled to gussets 84 with fasteners 256. First harness 133 also may be supported on cross tube 66 with first bracket 135. First bracket 135 is coupled to first harness 133 with fasteners 252 and cross tube 66 with fasteners 254.

First harness 133 is coupled to second harness 134 with fasteners 250. Illustratively, first harness includes a flange 139 which receives second harness 134 and fasteners 250. Second harness 134 is coupled to cross tube 64 with second bracket 136. Second bracket 136 is coupled to cross tube 64 with fasteners 259 and is coupled to second harness 134 with fasteners 258.

Figure 18:
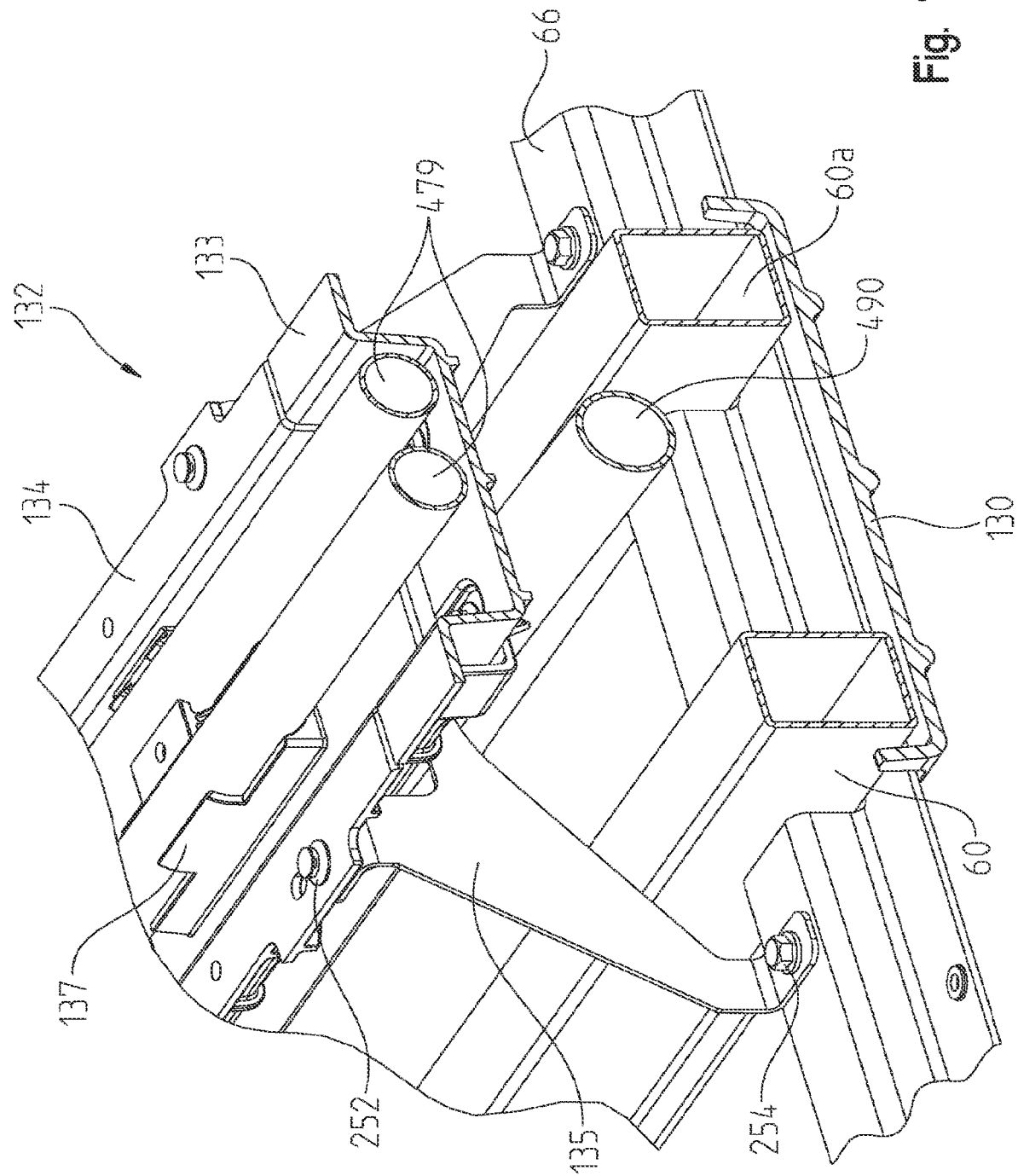
FIG. 18 is a cross-sectional view of the tunnel assembly of FIG. 15 supporting a plurality of cooling lines and a driveshaft.
Figure 19:
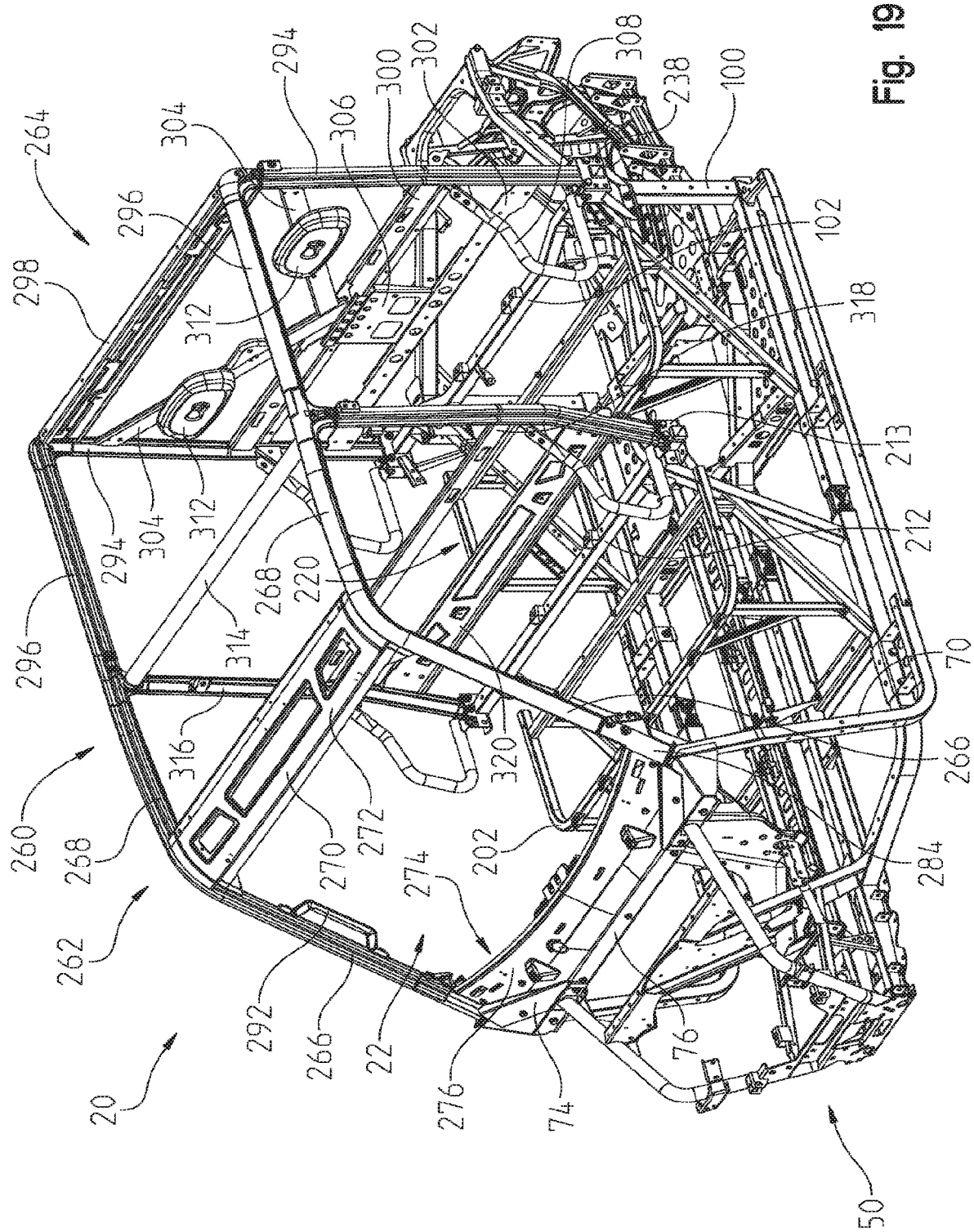
FIG. 19 is a left front perspective view of the frame assembly of FIG. 3 coupled to a roll cage assembly.

As shown in FIG. 18, cooling tubes 479 are fluidly coupled to powertrain assembly 470 and, for example, may be supported by tunnel member 132 in order to extend from a radiator at front frame portion 51 toward an engine 472 of powertrain assembly 470 in rear frame portion 54. Cooling tubes 479 may be supported and aligned by guide member 138 and retaining clips 137 when extending toward rear frame portion 54. Illustrative guide member 138 is angled downwardly such that cooling tubes 479 angle downwardly in order to couple with retaining clips 137. Retaining clips 137 frictionally retain cooling tubes 479 such that cooling tubes 479 do not move along tunnel member 132. Illustratively, retraining clips 137 generally surround approximately half of the outer diameter of cooling tubes 479. Additionally ties or couplers (e.g., zip ties) may also retain cooling tubes 479 and other electrical wires and hydraulic hoses on tunnel member 132.

Additionally, tunnel member 132 may support driveshaft 490 of powertrain assembly 470. Illustratively, driveshaft 490 may be positioned between first and second harnesses 133, 134 and skid plate 130, and generally intermediate longitudinal frame tube 60. Additional details of tunnel member 132 may be disclosed in U.S. Provisional Patent Application Ser. No. 61/442,071, filed on Feb. 11, 2011; U.S. Provisional Patent Application Ser. No. 61/696,519, filed on Sep. 4, 2012; U.S. patent application Ser. No. 13/1370,139, filed on Feb. 9, 2012; U.S. patent application Ser. No. 13/464,603, filed on May 4, 2012; and U.S. patent application Ser. No. 13/492,589, filed on Jun. 8, 2012, the complete disclosures of which are expressly incorporated by reference herein.

Figure 20:
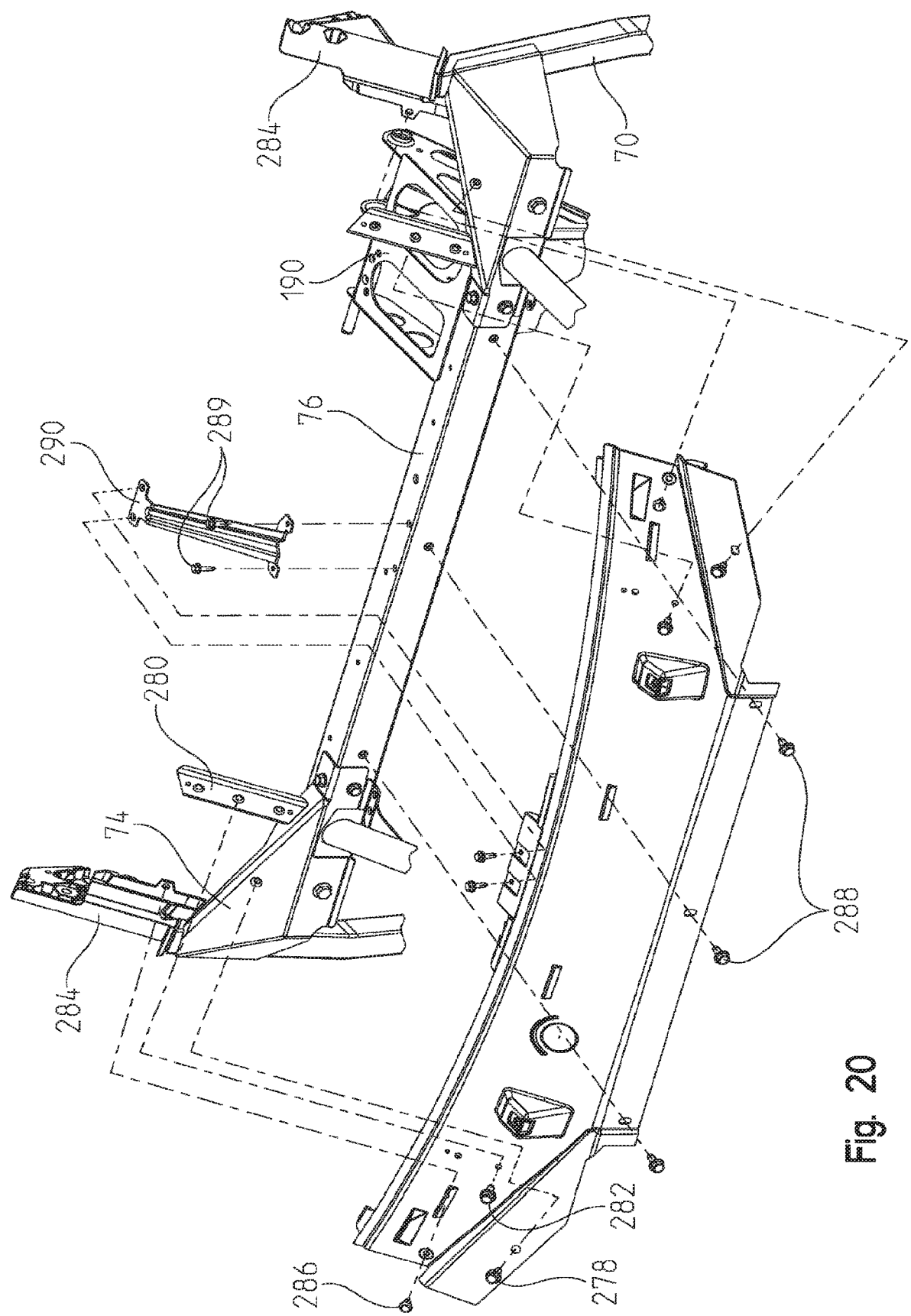
FIG. 20 is an exploded view of a portion of the roll cage assembly of FIG. 19, including a windshield support member.

Referring now to FIGS. 19-24, roll cage assembly 260 generally surrounds operator cab 20 and operator area 22. Roll cage assembly 260 may be removable from frame assembly 50. Roll cage assembly 260 includes a front section 262 and a rear section 264. Front section 262 includes upright portions 266, horizontal portions 268, an upper crossbeam 270 defining a surface 272, and a lower crossbeam 274 defining a surface 276. As shown in FIG. 20, lower crossbeam 274 may support front windshield 24 (FIG. 44) and is coupled to frame assembly 50 through gussets 74 and fasteners 278. Lower crossbeam 274 may be comprised of a metallic or polymeric material and may be formed in metal stamping, injection molding, or other similar manufacturing methods. Additionally, lower crossbeam 274 is further coupled to a brace 280 with fasteners 282. Brace 280 is supported on gusset 74 and also may support front windshield 24. Lower crossbeam 274 also may be coupled to a bracket 284 with fasteners 286. Illustratively, brackets 284 are coupled to removable frame portions 70 of frame assembly 50. Brackets 284 may be formed by casting methods. As shown in FIG. 20, lower crossbeam 274 is further coupled to front transverse brace 76 of frame assembly 50 with fasteners 288. Front transverse brace 76 may support a support member 290 with fasteners 289. Support member 290 may be operably coupled to front windshield 24.

Upright portions 266 of roll cage assembly 260 are coupled to brackets 284 and extend between brackets 284 and upper crossbeam 270. Illustratively, lower ends 265 of upright portions 266 are profiled to compliment brackets 284 such that upright portions 266 are flush with brackets 284 and appear to form a continuous a frame member of roll cage assembly 260. In one embodiment, lower ends 265 are formed by casting methods and may be integrally or otherwise coupled to upright portions 266. Upright portions 266 may include hand grips 292 for the operator and/or the front passenger. Upright portions 266 and horizontal portions 268 of front section 262 may be profiled in a generally hourglass or figure eight configuration, as detailed in U.S. Provisional Patent Application Ser. No. 61/442,071, filed on Feb. 11, 2011; U.S. patent application Ser. No. 13/1370,139, filed on Feb. 9, 2012; U.S. patent application Ser. No. 13/464,603, filed on May 4, 2012; and U.S. patent application Ser. No. 13/492,589, filed on Jun. 8, 2012, the complete disclosures of which are expressly incorporated by reference herein.

Figure 23:
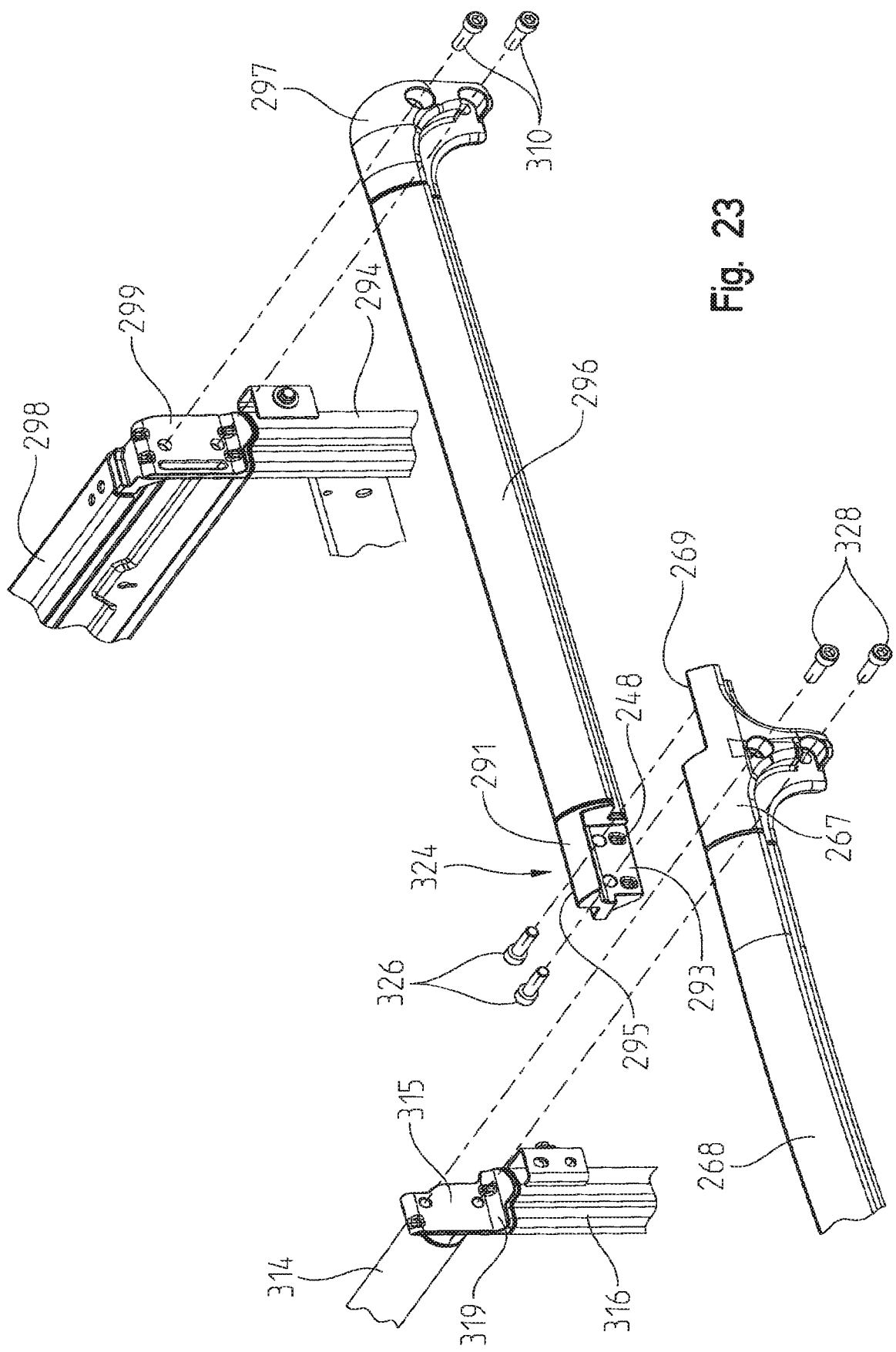
FIG. 23 is an outer exploded view of a portion of the roll cage assembly of FIG. 21.
Figure 24:
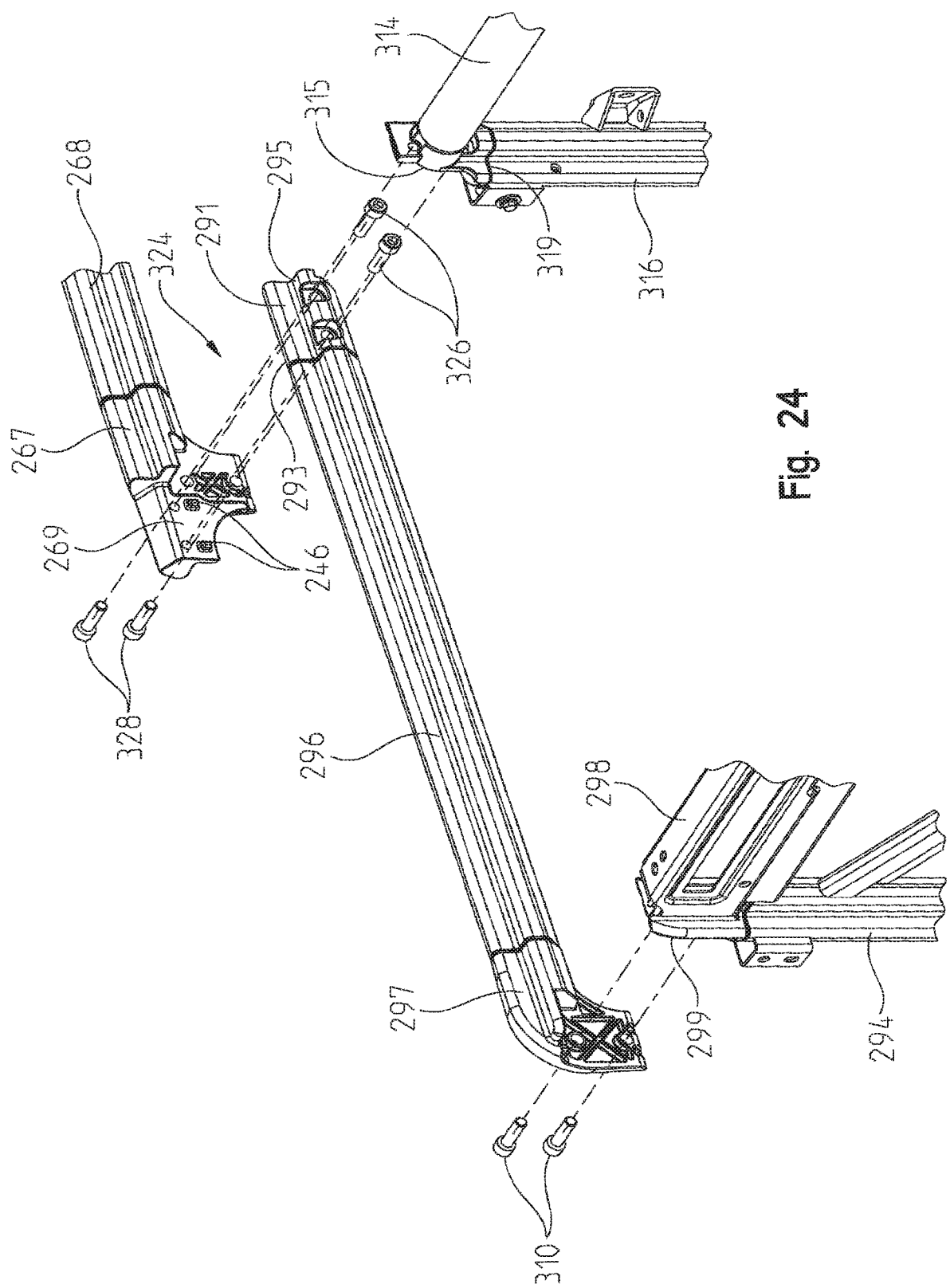
FIG. 24 is an inner exploded view of the portion of the roll cage assembly of FIG. 23.

Rear section 264 of roll cage assembly 260 includes upright portions 294, horizontal portions 296, an upper crossbeam 298, an intermediate crossbeam 300, and a lower crossbeam 302. Upright portions 294 are coupled to brackets 238 of frame assembly 50 and upper crossbeam 298. In one embodiment, upright portions 294 support bolster bars 308, which may secure rear passengers in vehicle 2. Horizontal portions 296 also are coupled to upper crossbeam 298 with fasteners 310 (FIG. 23). As shown in FIGS. 23 and 24, an outer end 299 of upright portions 294 may be a cast component and may be profiled to compliment a cast inner end 297 of horizontal portions 296, such that horizontal portions 296 and upright portions 294 are generally flush when coupled together. Cast inner end 297 may be integrally formed with horizontal portions 296 through casting methods. Upright portions 294 and horizontal portions 296 of rear section 264 may be profiled in a generally hourglass or figure eight configuration, as detailed in U.S. Provisional Patent Application Ser. No. 61/442,071, filed on Feb. 11, 2011; U.S. patent application Ser. No. 13/1370,139, filed on Feb. 9, 2012; U.S. patent application Ser. No. 13/464,603, filed on May 4, 2012; and U.S. patent application Ser. No. 13/492,589, filed on Jun. 8, 2012, the complete disclosures of which are expressly incorporated by reference herein.

Figure 21:
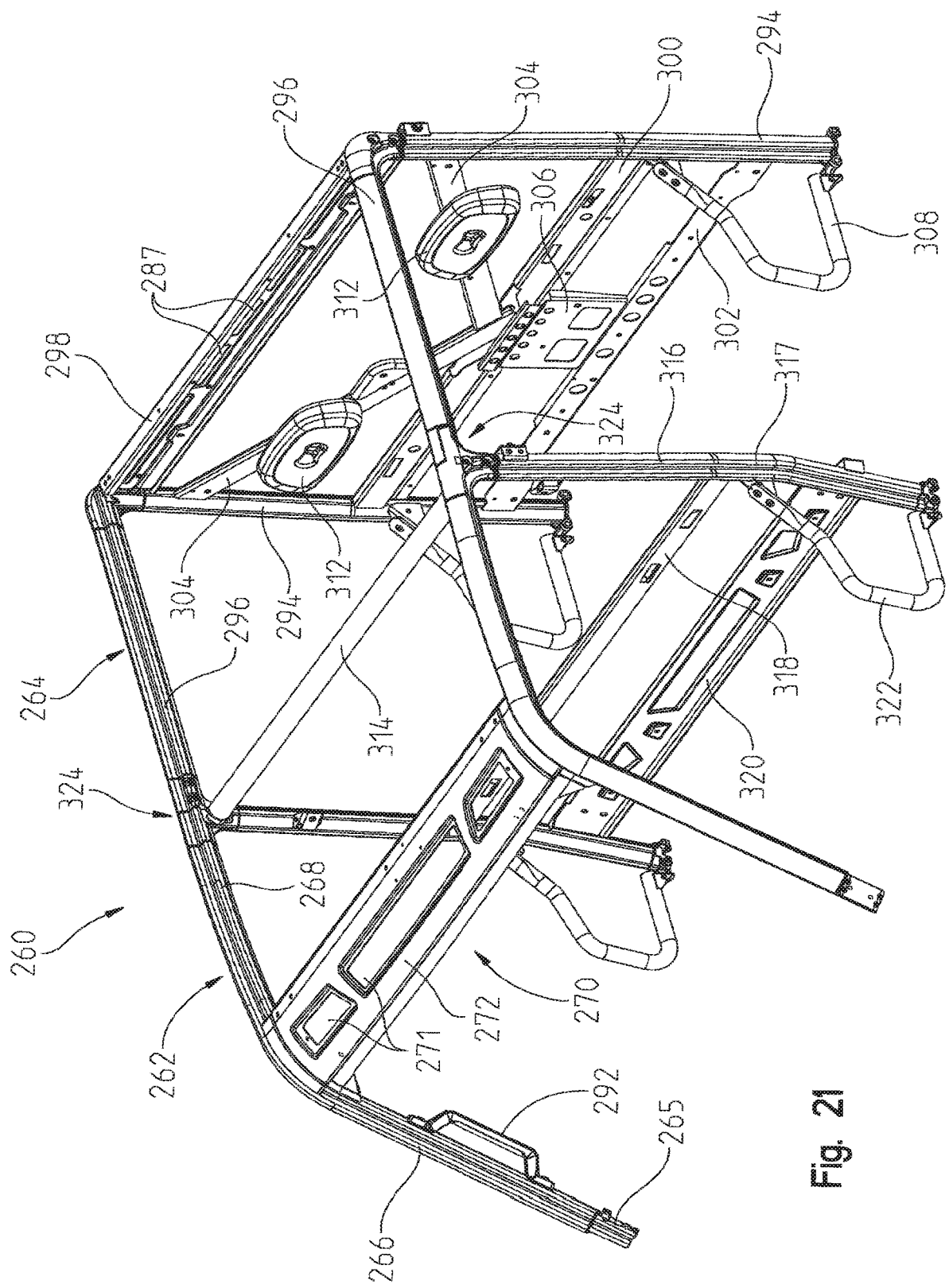
FIG. 21 is a front perspective view of the roll cage assembly of FIG. 19.
Figure 22:
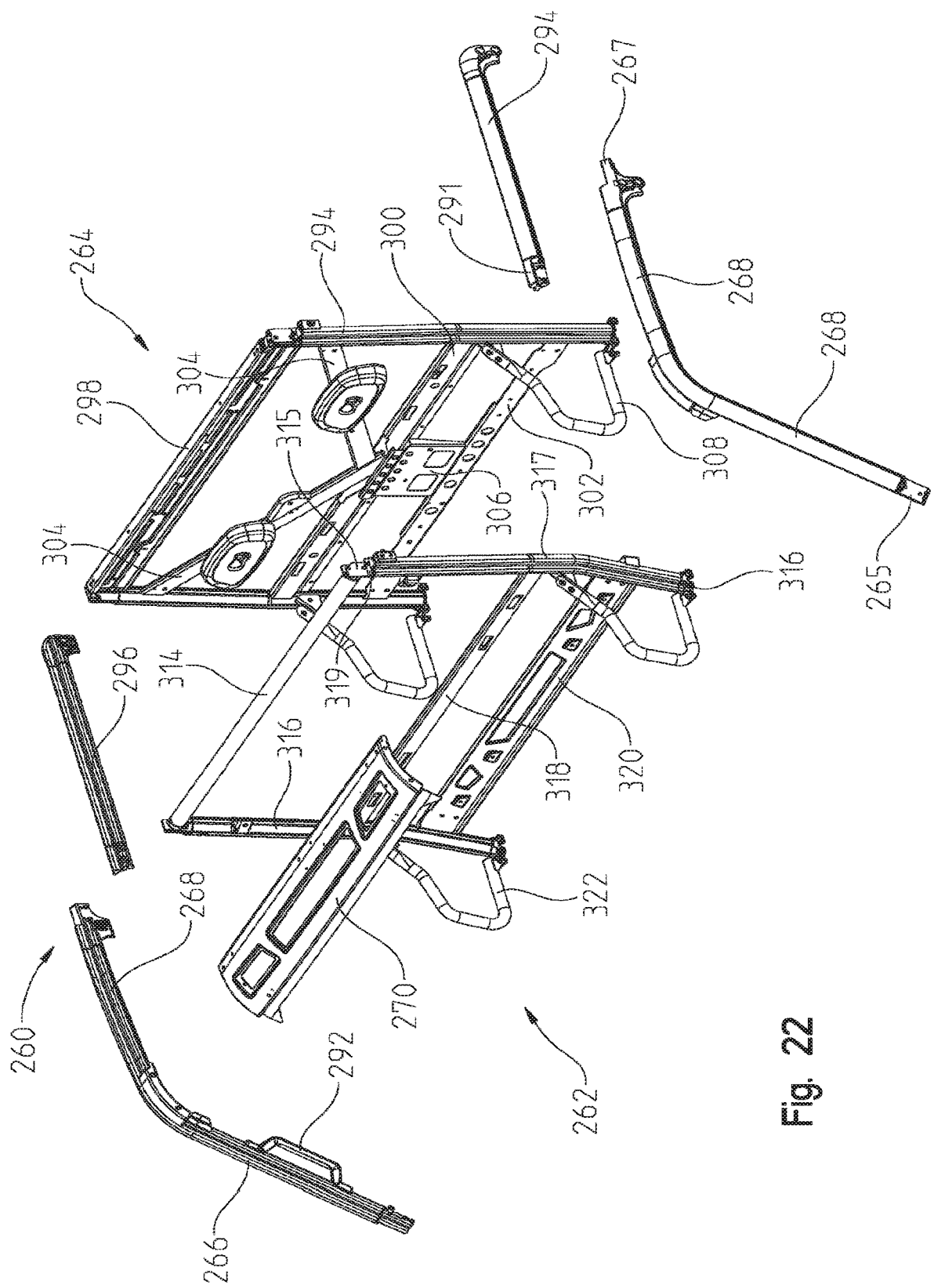
FIG. 22 is an exploded view of the roll cage assembly of FIG. 21.

Referring to FIG. 21, upper crossbeam 298, intermediate crossbeam 300, and lower crossbeam 302 are coupled to upright portions 294. Additionally, diagonal members 304 are coupled to intermediate crossbeam 300 and extend outward to couple with upright portions 294. Diagonal members 304 may include rear passenger headrests 312. A panel 306 may be coupled to both intermediate crossbeam 300 and lower crossbeam 302. Illustrative panel 306 may support portions of the electrical system of the vehicle, for example rear lights.

Front section 262 and rear section 264 of roll cage assembly 260 may be coupled together with a transverse frame tube 314. Transverse frame tube 314 extends between upright portions 316. Additionally, a first brace 318 and a second brace 320 extend between upright portions 316. In one embodiment, upright portions 316 also may support bolster bars 322 for securing a driver and a front passenger within vehicle 2. Unlike upright portions 294, which are substantially vertical, upright portions 316 may include a bend 317 which angles the lower end of upright portions 316 rearwardly. As such, bend 317 may increase the ingress and egress space for the operator and a front passenger.

As shown in FIGS. 23 and 24, transverse frame tube 314 and upright portions 316 are coupled to horizontal portions 268, 296 at coupling locations 324. Coupling locations 324 illustratively define a "T" member between horizontal portions 268, 296 and upright portions 316. To locate and align horizontal portions 268 and 296 and upright portions 316, locating pins 246 (FIG. 24) may be received within locating recesses 248.

Additionally, horizontal portions 268 include cast ends 267 having an inner surface 269. Cast ends 267 may be integrally formed with horizontal portions 268 through casting methods. Horizontal portions 296 also include cast ends 291 having an outer surface 293 and an inner surface 295. Cast ends 291 may be integrally formed with horizontal portions 296 through casting methods. Outer surface 293 of cast ends 291 of horizontal portions 296 may be profiled to compliment inner surface 269 of cast ends 267 of horizontal portions 268, such that when horizontal portions 296 are coupled to horizontal portions 268 with fasteners 326, horizontal portions 296 are generally flush with horizontal portions 268. In this way, horizontal portions 268 of front section 262 form a continuous frame member with horizontal portions 296 of rear section 264 of roll cage assembly 260. Similarly, inner surface 295 of cast ends 291 of horizontal portions 296 may be profiled to compliment an outer surface 315 of a cast end 319 of upright portions 316, such that when horizontal portions 296 are coupled to upright portions 316 with fasteners 328, horizontal portions 296 are generally flush with upright portions 316. Cast end 319 may be integrally formed with upright portions 316 through casting methods. In this way, the adjoining components of roll cage assembly 260 appear to form continuous sections.

Referring now to FIG. 25, roll cage assembly 260 generally encloses seating assembly 200, which includes front seating section 202 and rear seating section 220 of frame assembly 50. Front seating section 202 is forward of rear seating section 220 and supports operator seat 330 and front passenger seat 336 in a side-by-side arrangement. Operator seat 330 and front passenger seat 336 may be coupled to frame tube 94 with a latch comprising a pin and a polymeric bumper. Illustratively, operator seat 330 and front passenger seat 336 may be separated by a center console 392, as detailed further herein. Operator seat 330 and front passenger seat 336 are positioned above a front floorboard 420 (FIG. 1). Operator seat 330 is defined by a seat bottom 332 and a seat back 334, and front passenger seat 336 is defined by a seat bottom 338 and a seat back 340. Seat bottoms 332, 338 may be pivotably coupled to front seating section 202 of frame assembly 50, as detailed further herein. Operator seat 330 and front passenger seat 336 may include seat restraints, such as a three-point seat belt or a multi-point seat harness. A portion of the seat belts for front seating section 202 may be coupled to brackets 219 on transverse frame member 212 (FIG. 11).

Figure 29:
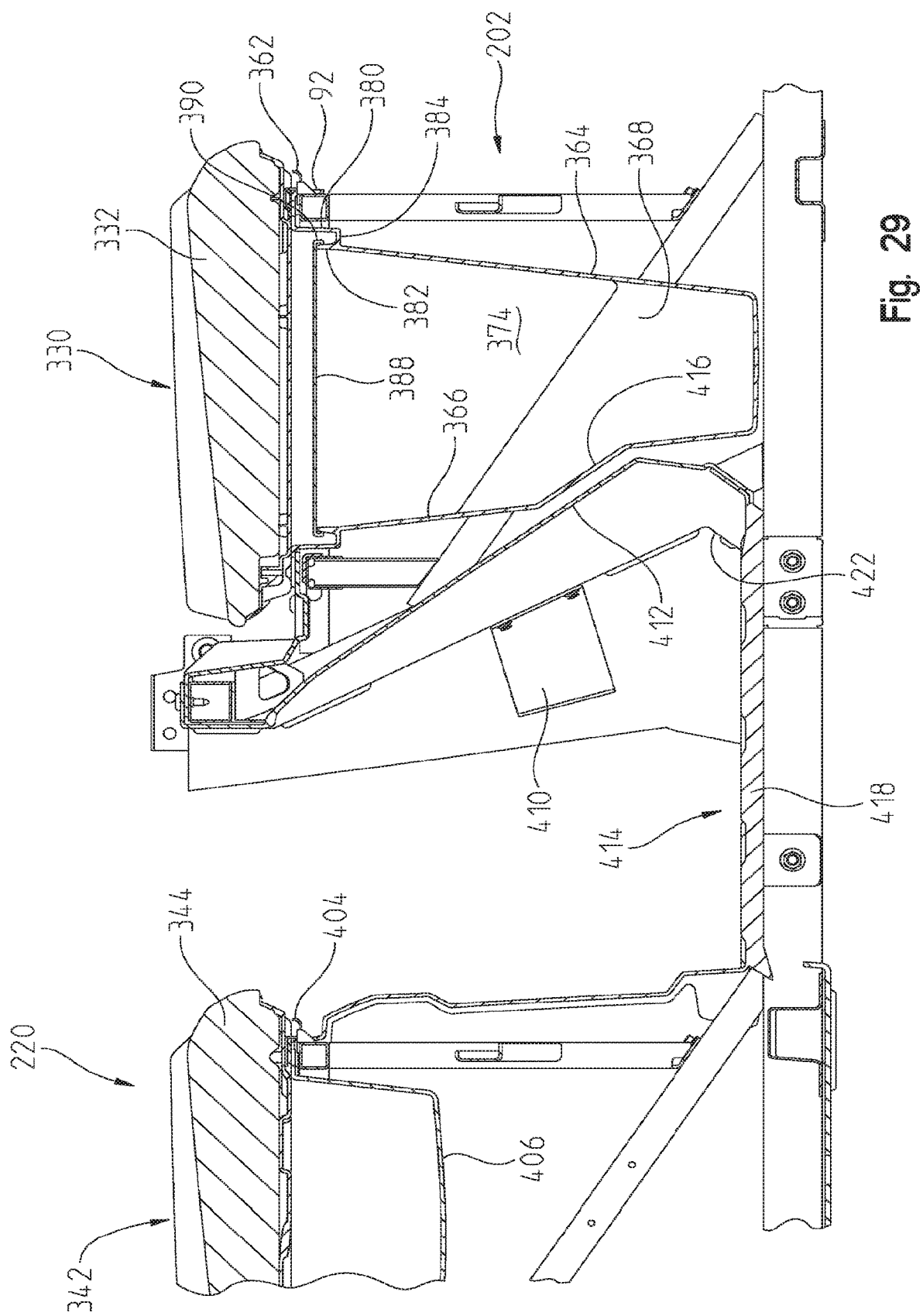
FIG. 29 is a cross-sectional view of a lower portion of the operator area of FIG. 25.

Rear seating section 220 supports first rear passenger seat 342 defined by a seat bottom 344 and a seat back 346, second rear passenger seat 348 defined by a seat bottom 350 and a seat back 352, and third rear passenger seat 354 defined by a seat bottom 356 and a seat back 358. Rear passenger seats 342, 348, and 354 are positioned above a rear floorboard 418 (FIG. 29). Illustratively, first rear passenger seat 342 is positioned generally rearward of operator seat 330, second rear passenger seat 348 is positioned generally rearward of center console 392, and third rear passenger seat 354 is positioned generally rearward of front passenger seat 336. As such, second rear passenger seat 348 is intermediate first and third rear passenger seats 342 and 354, respectively. First, second, and third rear passenger seats 342, 348, and 354 may be coupled to frame tube 224 with a latch assembly comprising at least one pin and at least one polymeric bumper. Headrests 312 may be coupled to diagonal members 304 of rear section 264 of roll cage assembly 260 to provide support for passengers in first and/or third rear passenger seats 342, 354.

In one embodiment, seat bottoms 344, 350, and 356 of first, second, and third rear passenger seats 342, 348, and 354, respectively, may be coupled together to form a bench seat. Seat bottoms 344, 350, and 356 also may be configured in a 60/40 arrangement such that seat bottoms 344 and 350 may comprise a majority of a bench seat, for example. Alternatively, seat bottoms 344, 350, and 356 may be separate seat bottoms. Similarly, seat backs 346, 352, and 358 may be coupled together to form a single back rest for rear passengers. Alternatively, seat backs 346, 352, and 358 may be separate seat backs.

First, second, and third rear passenger seats 342, 348, and 354 each may include a seat restraint 343, 349, and 355, respectively. As shown in FIG. 25, seat restraints 343, 349, and 355 for first, second, and third rear passenger seats 342, 348, and 354, respectively, may be coupled to diagonal members 304. More particularly, a shoulder member 343a, 349a, and 355a may be coupled to diagonal members 304 adjacent headrests 312 to prevent seat restraints 343, 349, and 355 from rubbing against a passenger's neck. Shoulder members 343a, 349a, and 355a are configured to couple with locking members 343b, 349b, and 355b, respectively. Locking members 343b, 349b, and 355b are adjacent seat bottoms 344, 350, and 356, respectively, and may be coupled to brackets 103 on transverse beam 102 (FIG. 13). Illustratively, each seat restraint 343, 349, and 355 is a three-point harness seat belt.

Referring to FIGS. 26-31, operator area 22 of operator cab 20 may include a plurality of accessories. For example, a plurality of storage containers 360, 406, and 408 may be positioned below seats 330, 336, 342, 348, and 354, as detailed further herein. More particularly, front storage containers 360 may be positioned below operator seat 330 and front passenger seat 336. Similarly, rear storage containers 406 may be positioned below first and third rear passenger seats 342 and 354, respectively. Additionally, rear storage container 408 may be positioned below second rear passenger seat 348. In one embodiment, illustrative storage containers 360, 406, and 408 are "dry" storage containers for sealing the cargo and other components therein from water, dirt, and debris.

Figure 26:
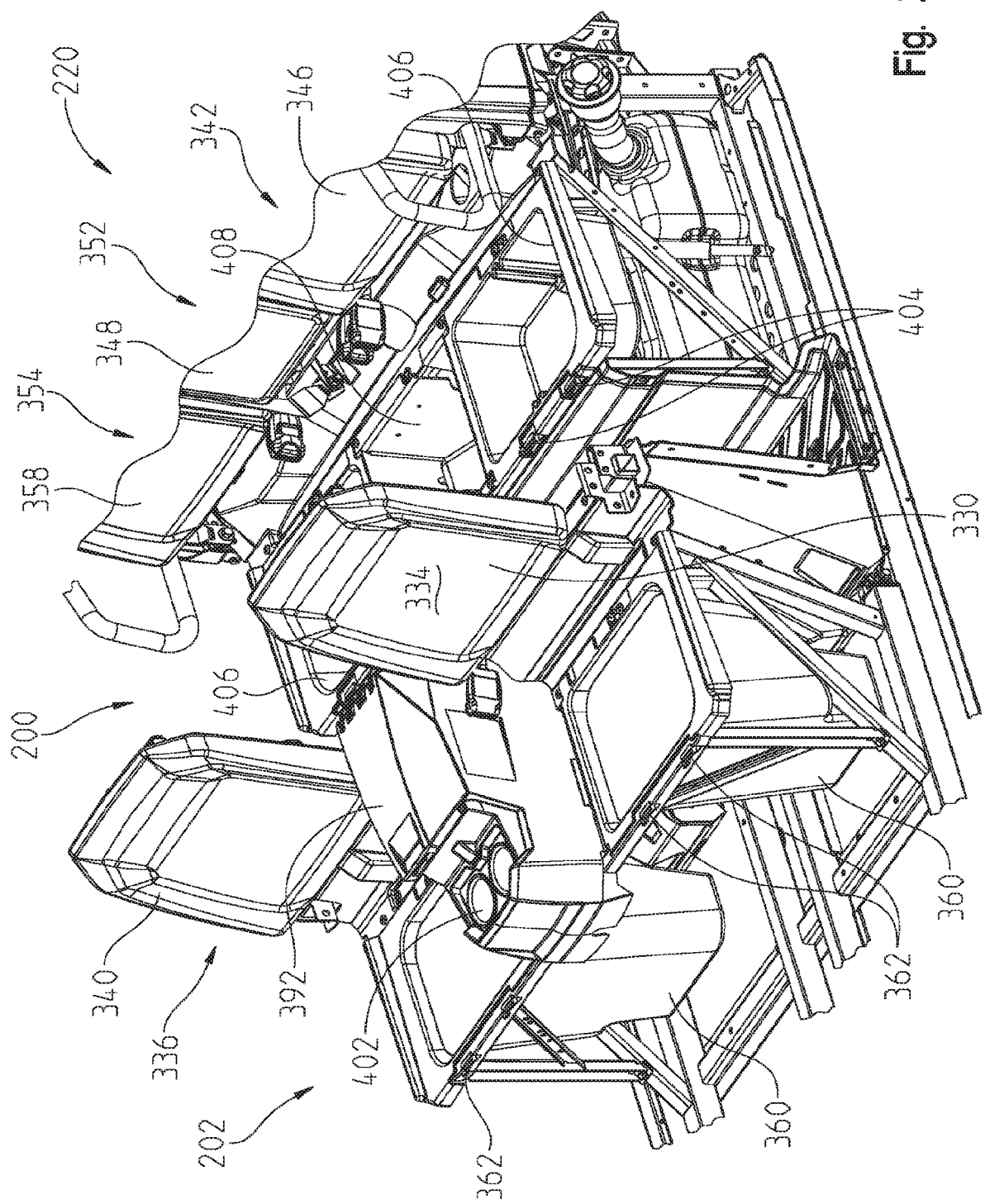
FIG. 26 is a left front perspective view of the operator area of FIG. 25.

As shown in FIG. 26, first seating section 202 includes hinges 362 on frame tube 92. Hinges 362 are operably coupled to seat bottoms 332 and 338 of operator seat 330 and front passenger seat 336, respectively. As such, seat bottoms 332, 338 are configured to pivot in a forward direction about hinges 362 in order to expose storage containers 360.

Figure 27:
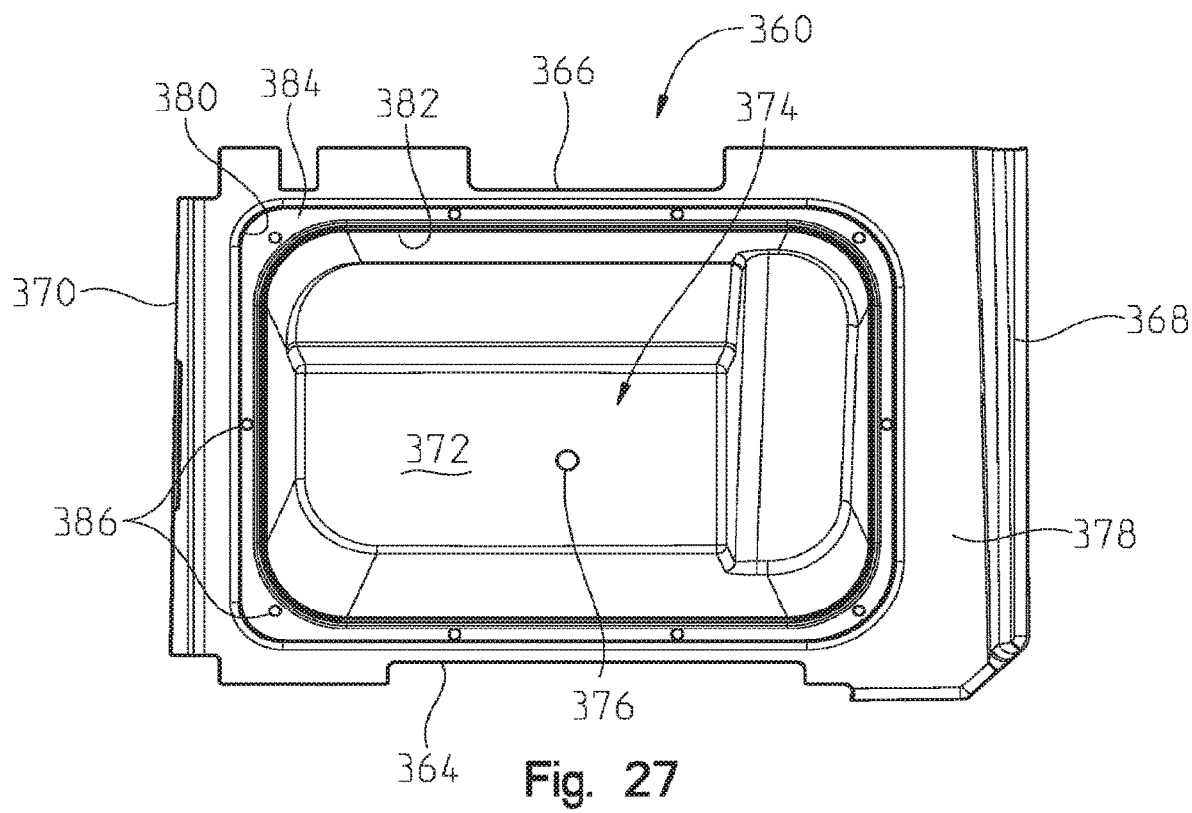
FIG. 27 is a top view of a storage container positioned within the operator area of FIG. 25.
Figure 28:
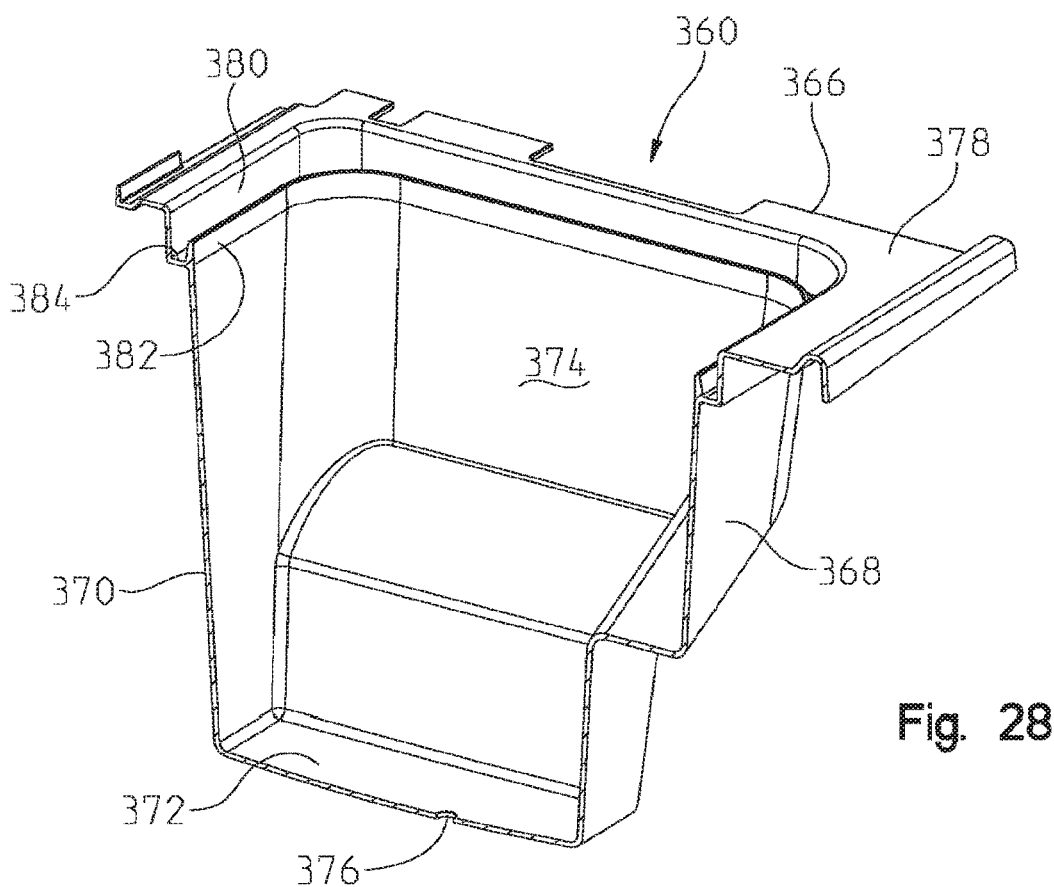
FIG. 28 is a cross-sectional view of the storage container of FIG. 27.

Referring to FIGS. 27-29, storage containers 360 include a front wall 364, a rear wall 366, an outer side wall 368, an inner side wall 370, and a bottom surface 372 which generally enclose an interior space 374 of storage container 360. Cargo and other items may be retained within interior space 374 of storage containers 360 and may be easily accessed by pivoting operator seat 330 and/or front passenger seat 336 to the open position about hinges 362. In one embodiment, storage containers 360 may include an electrical outlet operably coupled to the electrical system of vehicle 2 for charging or powering user accessories, such as phones, GPS devices, and/or computers. Additionally, front floorboard 420 (FIG. 1) also may include at least one electrical outlet for auxiliary power.

Bottom surface 372 of storage container 360 may include a drain opening 376 which allows any fluids, dirt, or debris within interior space 374 to fall through. As such, drain opening 376 prevents dirt and fluids from accumulating in storage container 360. During operation of vehicle 2, a plug or other sealing member (not shown) may cover drain opening 376 in order to prevent dirt and debris below vehicle 2 from entering storage container 360 through drain opening 376.

Additionally, a top surface 378 of storage containers 360 includes an outer rim 380 and an inner lip 382 that define a channel 384 therebetween. As shown in FIG. 27, channel 384 may include a plurality of drain openings 386. As such, any fluid, dirt, or debris within channel 384 may fall through drain openings 386 and out of vehicle 2. Plugs or other sealing members (not shown) may cover drain openings 386 during operation of vehicle 2.

In one embodiment, seat bottoms 332, 338 may be used to close interior space 374 of storage container 360. Alternatively, illustrative storage containers 360 may include lids 388, as shown in FIG. 29. Lid 388 is positioned over interior space 374 and may be retained on lip 382 of top surface 378 with an outer latch 390. Illustratively, lid 388 is configured to "snap" onto storage container 360 because outer latch 390 "hooks" or couples around lip 382. As such, lid 388 is easy to assemble with storage containers 360 to seal interior space 374, and is easily removed from storage container 360 without the use of tools.

Figure 31:
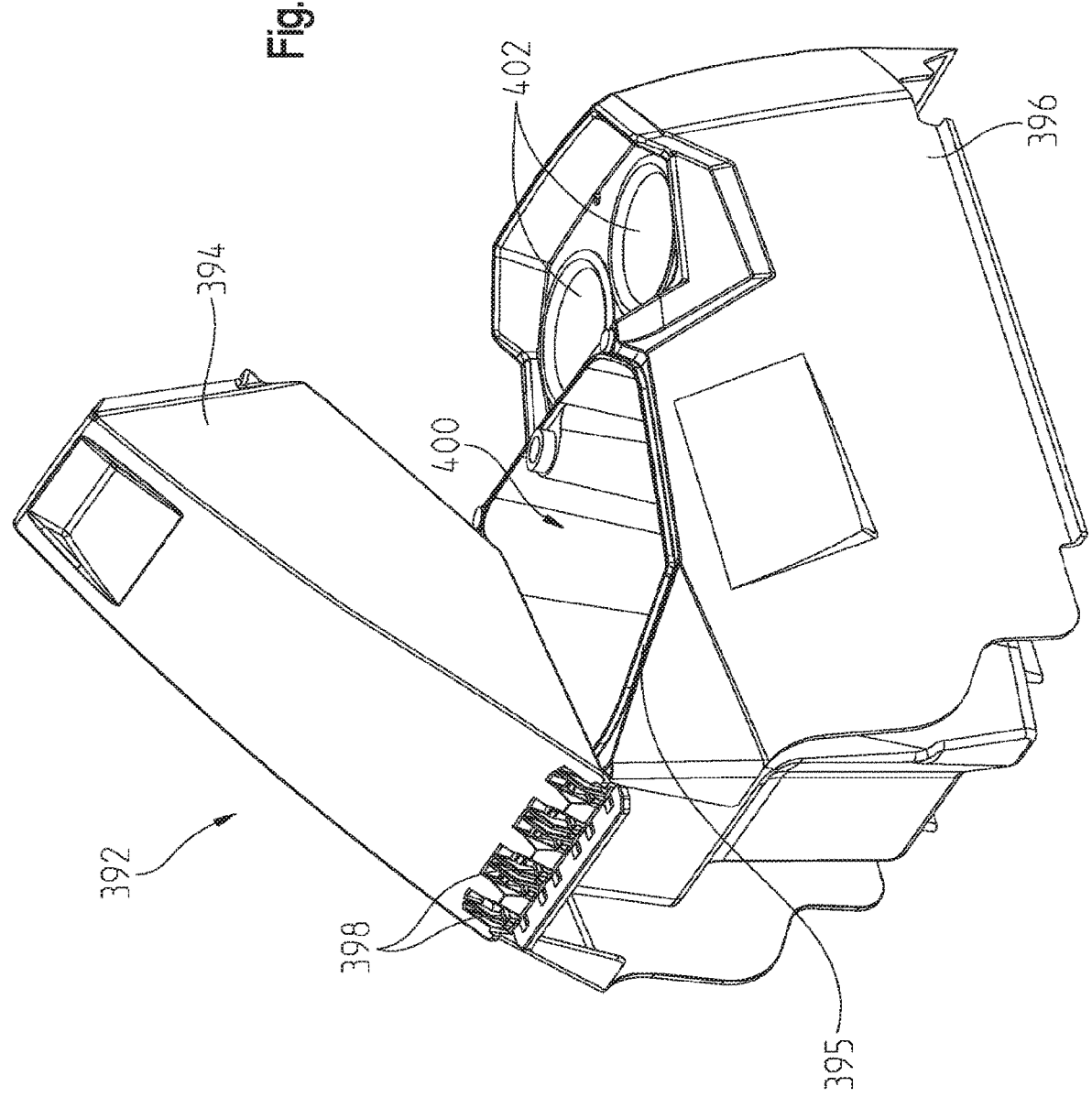
FIG. 31 is a right rear perspective view of a console of the operator area of FIG. 25.

Referring to FIG. 31, operator area 22 of cab 20 also includes a storage container 400 within center console 392. Center console 392 may be supported by a frame bracket welded or riveted to frame tubes 92, 94 of front seating section 202 in order to prevent center console 392 from being removed from vehicle 2. Alternatively, in one embodiment, center console 392 is removable from vehicle 2. Center console 392 is intermediate operator seat 330 and front passenger seat 336 and may include a lid 394, a base 396, hinges 398, and accessories, for example front cup holders 402. Lid 394 is coupled to base 396 through hinges 398 and pivots about hinges 398 in a generally rearward direction. Illustratively, hinges 398 may be molded into lid 394 and base 396 such that hinges 398 are integral with lid 394 and base 396. As such, hinges 398 on lid 394 snap or clip into hinges 398 on base 396 such that no additional hardware or coupling components are required. Alternatively, hinges 398 may be coupled to lid 394 and base 396 with conventional fasteners. Storage container 400 may be a "dry" container because a seal 395 is supported on lid 394 and/or base 396.

When lid 394 opens, storage container 400 is exposed. Storage container 400 may be configured to support cargo for the operator and/or passengers, or may be configured to support components of vehicle 2. In one embodiment, storage container 400 may include an electrical outlet operably coupled to the electrical system of vehicle 2 for charging or powering accessories, such as phones, GPS devices, and/or computers. Storage container 400 may include a drain opening (not shown) similar to drain opening 376 of storage containers 360.

As shown in FIGS. 26 and 29, rear seating section 220 includes hinges 404 on frame tube 222. Hinges 404 are operably coupled to seat bottoms 344, 350, and 356 of first, second, and third rear passenger seats 342, 348, and 354, respectively. As such, seat bottoms 344, 350, and 356 are configured to pivot in a forward direction about hinges 404 in order to expose storage containers 406 and 408. Cargo and other items may be retained within storage containers 406, 408 and may be easily accessed by pivoting seat bottoms 344, 350, and 356 to the open position about hinges 404. Alternatively, components of vehicle 2, such as components of the electrical system may be supported within storage containers 406 and 408. For example, controls and fuses for the electrical system may be supported in storage container 408 under seat bottom 350 so as to be closer to powertrain assembly 470. In this way, the electrical connections from the controls and the fuses may be shorter due to the proximity to powertrain assembly 470. Additionally, a user may easily access any controls and/or fuses in storage container 408 for replacement or repair.

Illustratively, seat bottoms 344, 350, and 356 are coupled together to form a single bench seat such that seat bottoms 344, 350, and 356 pivot simultaneously about hinges 404 to expose storage containers 406 and storage container 408. In one embodiment, storage containers 406 and 408 include an electrical outlet operably coupled to the electrical system of vehicle 2 for charging or powering user accessories, such as phones, GPS devices, and/or computers. Additional auxiliary power outlets may be coupled to rear floorboards 418. Rear storage containers 406 and 408 may have less cargo space than front storage containers 360 because other components of vehicle 2, for example a fuel tank 500 and a battery may be supported by frame assembly 50 under rear passenger seats 342, 348, and 354.

In one embodiment, storage containers 406 and 408 may be closed when seat bottoms 344, 350, and 356 are latched against frame tube 224. Alternatively, storage containers 406 and 408 also may include lids (not shown). The lids may be easily assembles with and removed from storage containers 406 and 408 without the use of tools.

Figure 30:
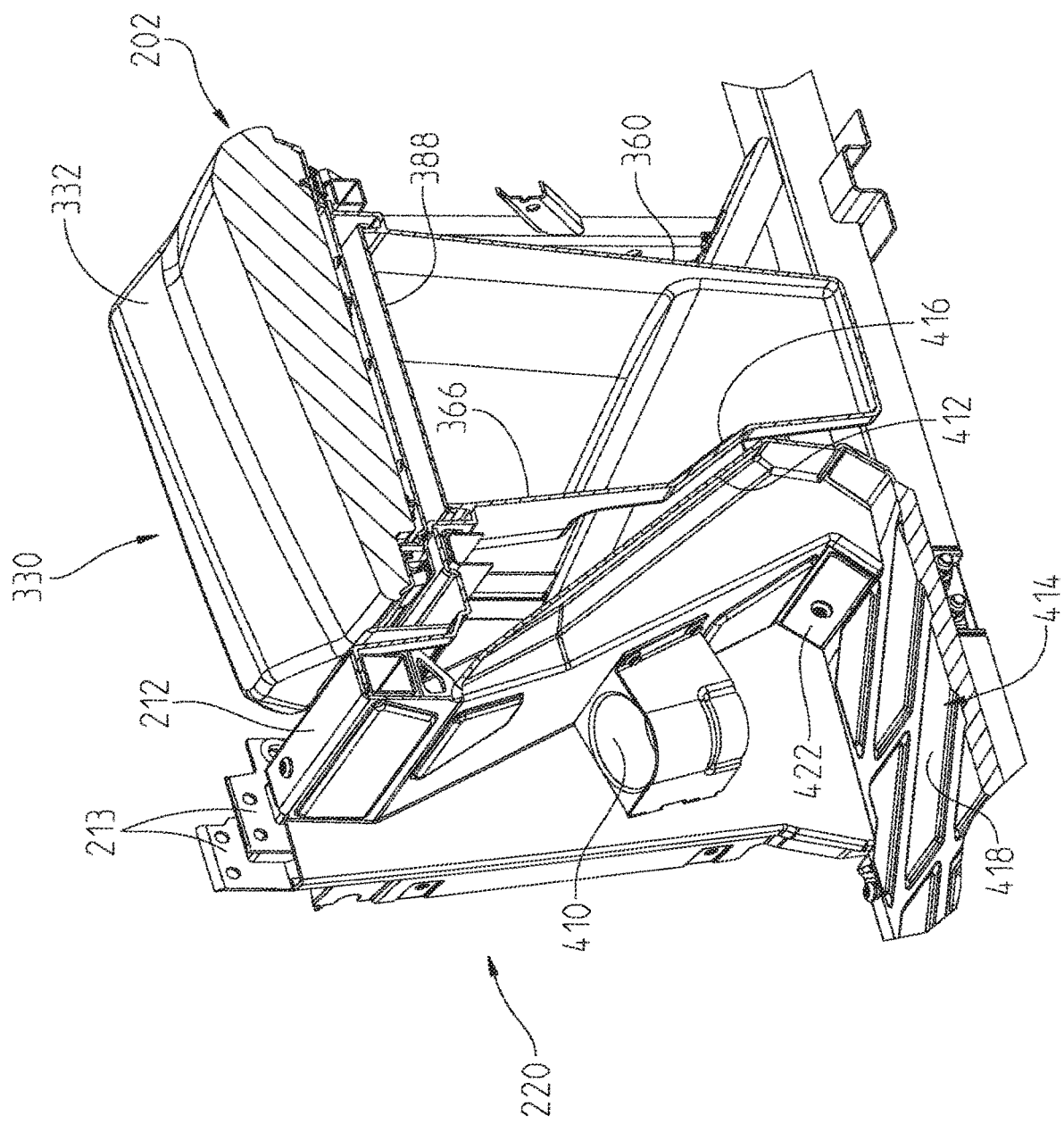
FIG. 30 is a further cross-sectional view of a lower portion of the operator area of FIG. 25.

As shown in FIGS. 29 and 30, rear seating section 202 of frame assembly 50 also may support additional accessories, for example rear cup holders 410. Rear cup holders 410 and/or other accessories may be coupled to a body panel wall 412 separating front seating section 202 from rear seating section 220. Body panel wall 412 is coupled to rear floorboard 418 and illustratively is angled downwardly in a forward direction. With this angled configuration, body panel wall 412 extends partially under operator seat 330 and front passenger seat 336 to increase a foot space 414 for rear passengers. In order to accommodate the increased foot space 414 in rear seating section 220, a lower portion 416 of rear wall 366 of front storage containers 360 is recessed. More particularly, the profile and angle of lower portion 416 generally corresponds to the profile and angle of body panel wall 412 to maximize foot space 414 for the rear passengers. Additionally, body panel wall 412 may includes a toe panel 422. Rear passengers may position their toes against toe panel 422 and, as such, the foot space 414 and leg room for the rear passengers is increased. Illustratively, the feet of the rear passengers may partially extend to a position forward of transverse frame member 212 and seat backs 334 and 340 of front seating section 202 such that the feet of the rear passengers are partially under a portion of front storage containers 360.

Figure 34:
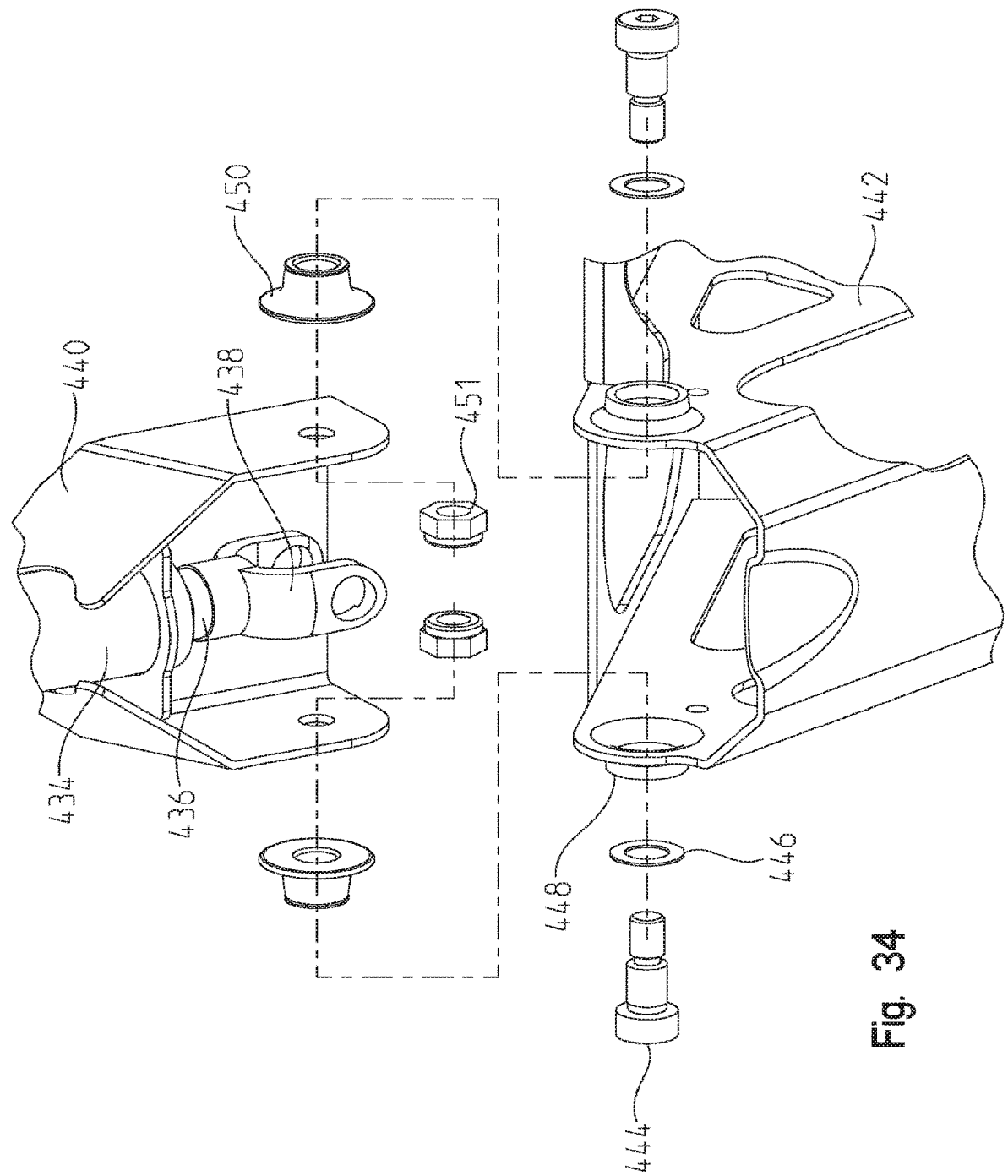
FIG. 34 is an exploded view of a portion of the steering assembly of FIG. 33 and a portion of the frame assembly of FIG. 4.
Figure 35:
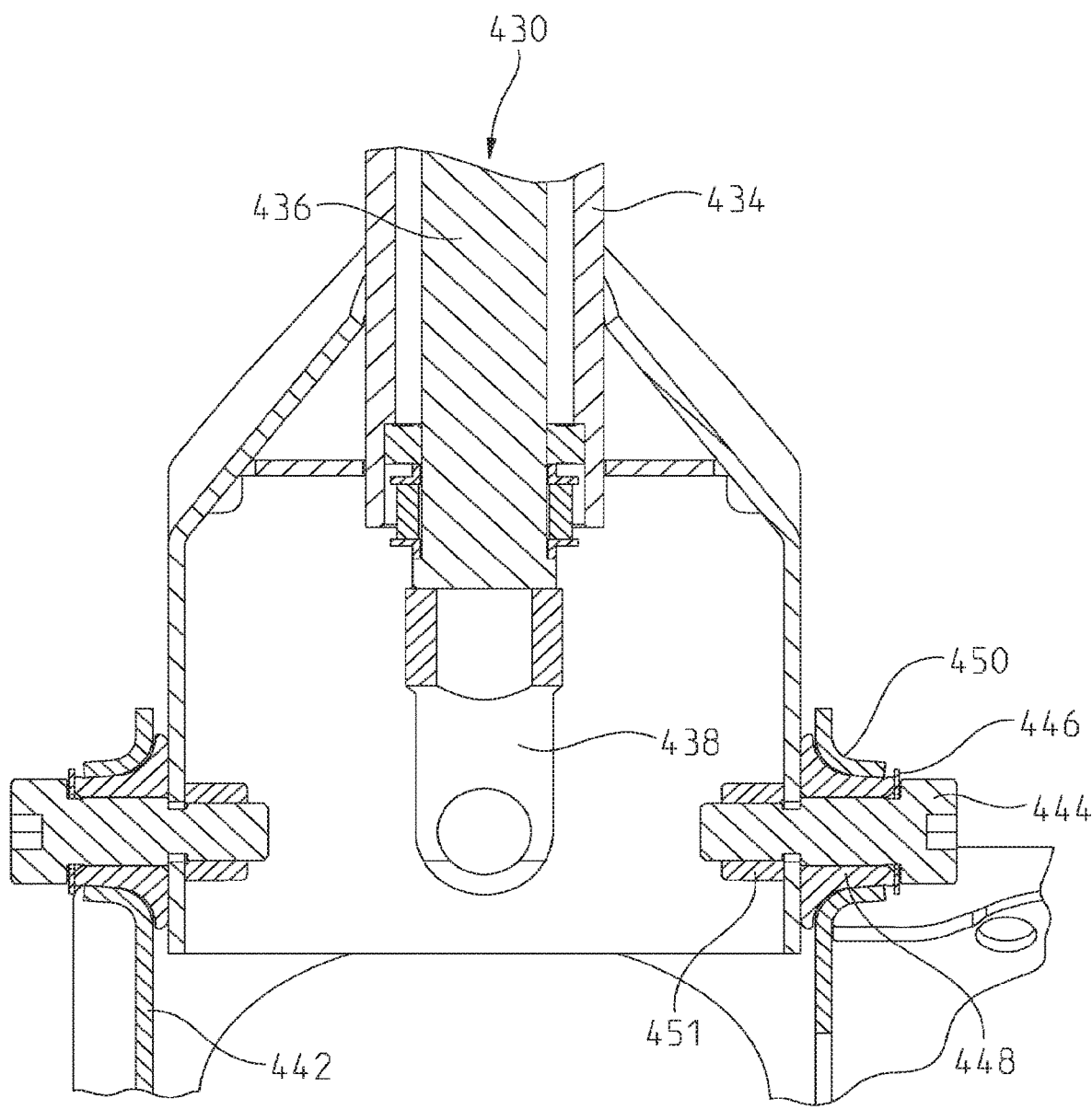
FIG. 35 is a cross-sectional view of the portion of the steering assembly and the portion of the frame assembly of FIG. 34.

Referring to FIGS. 32-35, operator area 22 of operator cab 20 also includes steering assembly 430 and throttle controls 460. Steering assembly 430 includes a steering wheel 432, a steering post 434, a steering shaft 436, a joint member 438, a housing 440, a bracket 442, and an adjustment member 452. Steering wheel 432 is coupled to steering post 434 and steering shaft 436 in order to transmit the motion of steering wheel 432 to front wheels 4. Steering shaft 436 is coupled to joint member 438 for coupling with additional components of steering assembly 430. Housing 440 extends generally around joint member 438 and a portion of steering post 434 and steering shaft 436. Housing 440 may be coupled to brackets 442 with a mounting assembly which includes a fastener 444, a washer 446, a bearing 448, a bushing 450, and a coupler 451. In one embodiment, bushing 450 may be a plastic "snap-in" component. Alternatively, bushing 450 may be a rivet-style component. As shown in FIGS. 34 and 35, fasteners 444 are received through apertures in bracket 442 and housing 440 and are coupled thereto with couplers 451. Illustratively, couplers 451 are adjacent an inner surface of housing 440. Washer 446 and bearing 448 may be positioned intermediate fastener 444 and coupler 451. Bushing 450 may be positioned over fastener 444, washer 446, and bearing 448.

Steering assembly 430 also may include adjustment member 452 which adjusts the height and tilt position of steering wheel 432. Illustratively, adjustment member 452 is a hydraulic shock that raises and lowers steering wheel 432 when the operator depresses a lever 458. Alternatively, adjustment member 452 may be other devices configured to adjust the position of steering wheel 432. Lever 458 is operably coupled to adjustment member 452. When adjustment member 452 adjusts the position of steering wheel 432, housing 440 is configured to move with steering wheel 432. Adjustment member 452 is coupled to a lever arm 454 with fasteners 456. Additionally, adjustment member is coupled to steering post 434 with a bracket 455 and fasteners 456.

Figure 32:
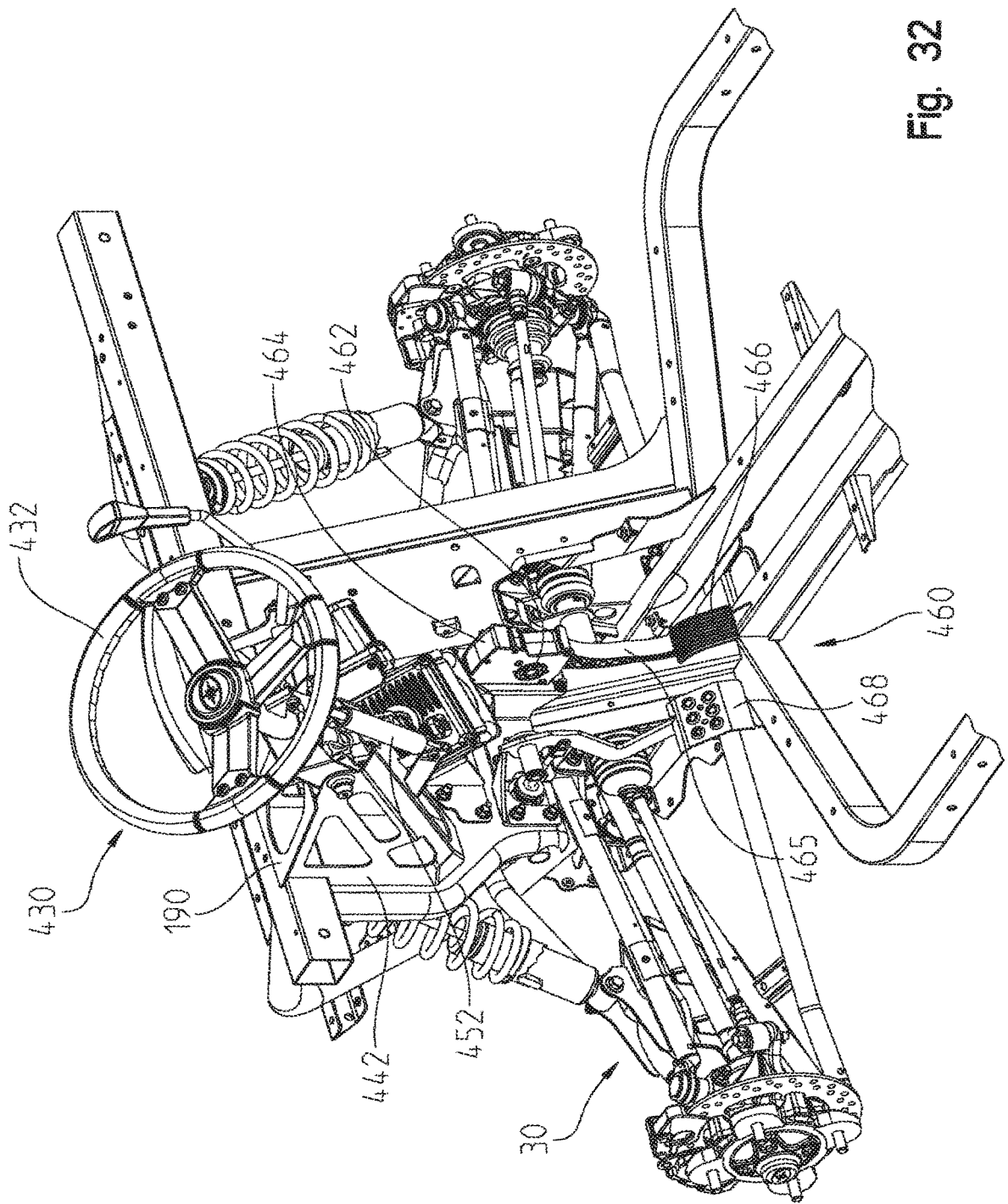
FIG. 32 is a rear perspective view of a plurality of operator controls of the vehicle of the present disclosure, including a steering assembly and throttle controls.
Figure 33:
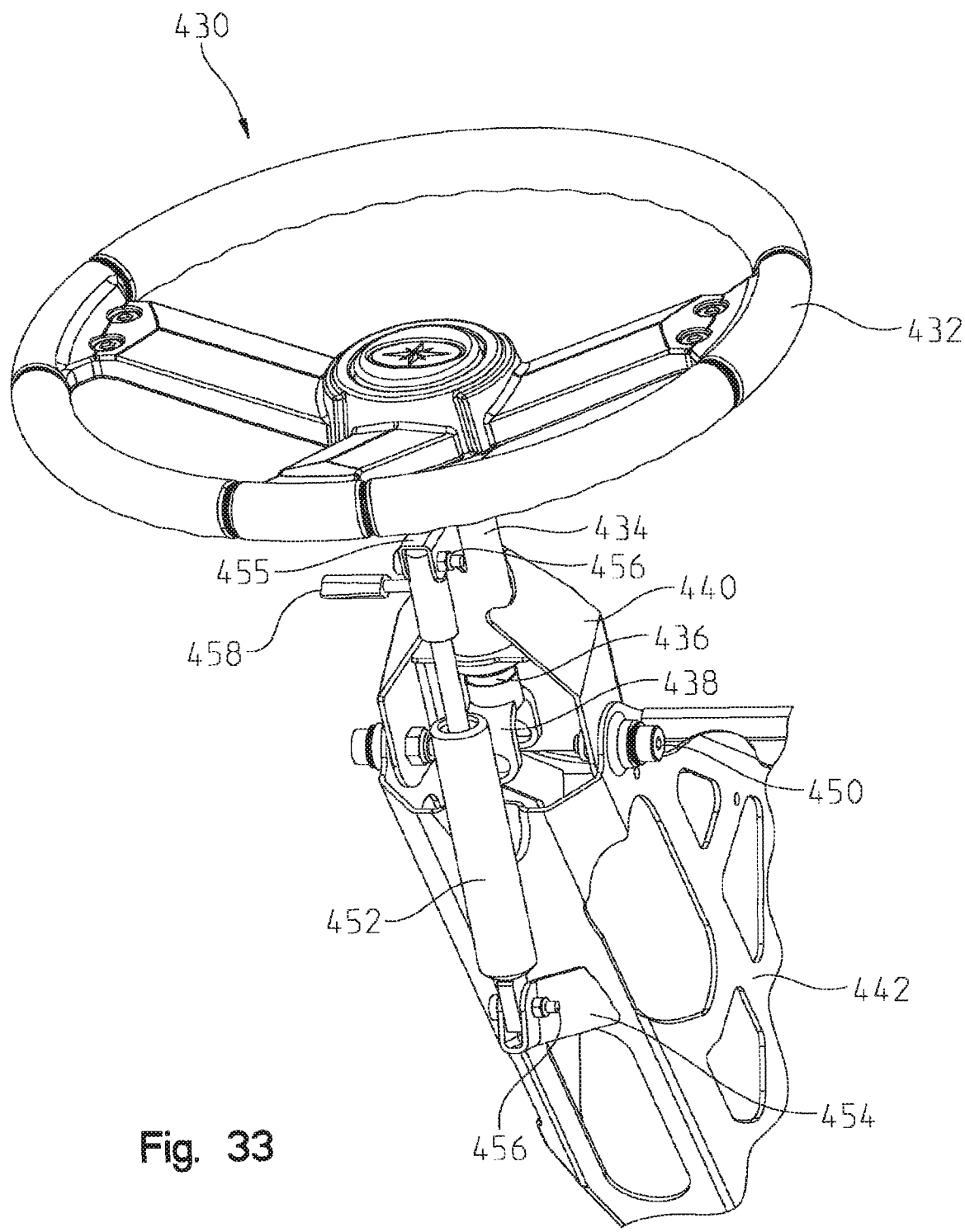
FIG. 33 is a rear perspective view of the steering assembly of FIG. 32.

As shown in FIG. 32, throttle controls 460 include an electronic throttle control ("ETC") assembly 462 surrounded by a housing 464 and operably coupled to an accelerator pedal 466, as is described in U.S. patent application Ser. No. 13/464,603, filed on May 4, 2012, and U.S. patent application Ser. No. 13/492,589, filed on Jun. 8, 2012, the complete disclosures of which are expressly incorporated by reference herein. A lever arm 465 is operably coupled to accelerator pedal 466. Accelerator pedal 466 is adjacent a brake pedal 468.

Referring to FIGS. 36-43, powertrain assembly 470 is shown. Powertrain assembly 470 includes an engine 472, a transmission 474, an air intake assembly 476, and an exhaust assembly 478. Powertrain assembly 470 also is coupled to fuel tank 500 (FIG. 39) for supplying fuel to engine 472. Additionally, powertrain assembly 470 is coupled to a cooling assembly having cooling tubes 479 (FIG. 18) extending from a radiator at front end 8 of vehicle 2. Powertrain assembly 470 may be configured to output approximately 60 hp and vehicle 2 may reach speeds of up to approximately 50 mph. Illustrative engine 472 may be configured to operate with diesel fuel or gasoline from fuel tank 500 and is operably coupled to transmission 474. Illustrative transmission 474 may be a continuously variable transmission ("CVT"). Additional details of engine 472 and transmission 474 are disclosed in U.S. Provisional Patent Application Ser. No. 61/385,802, filed on Sep. 23, 2010; U.S. patent application Ser. No. 13/242,229, filed on Sep. 23, 2011; and U.S. patent application Ser. No. 13/242,239, filed on Sep. 23, 2011, the complete disclosures of which are expressly incorporated by reference herein.

Figure 37:
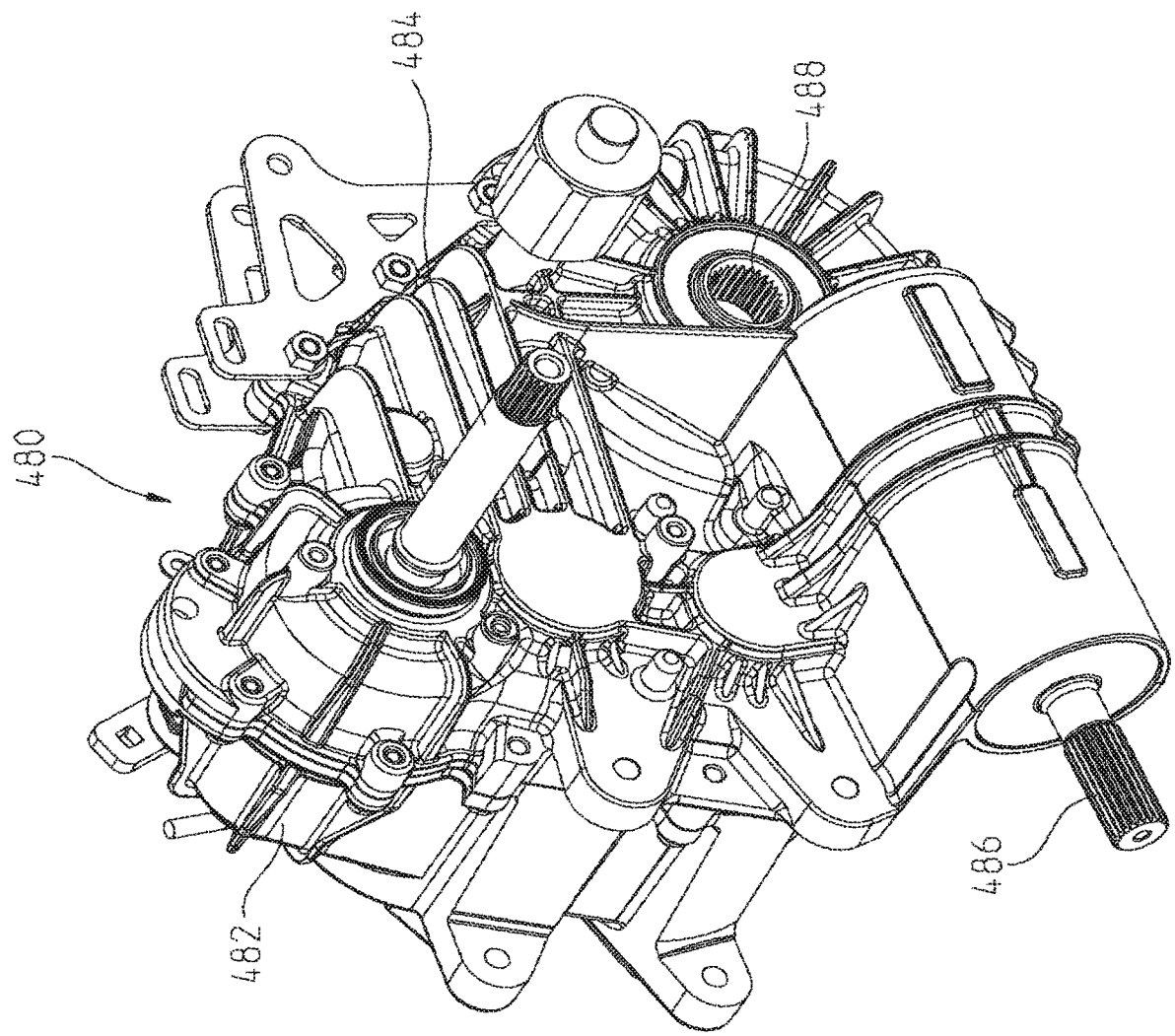
FIG. 37 is a front perspective view of a portion of the powertrain assembly of FIG. 36.
Figure 38:
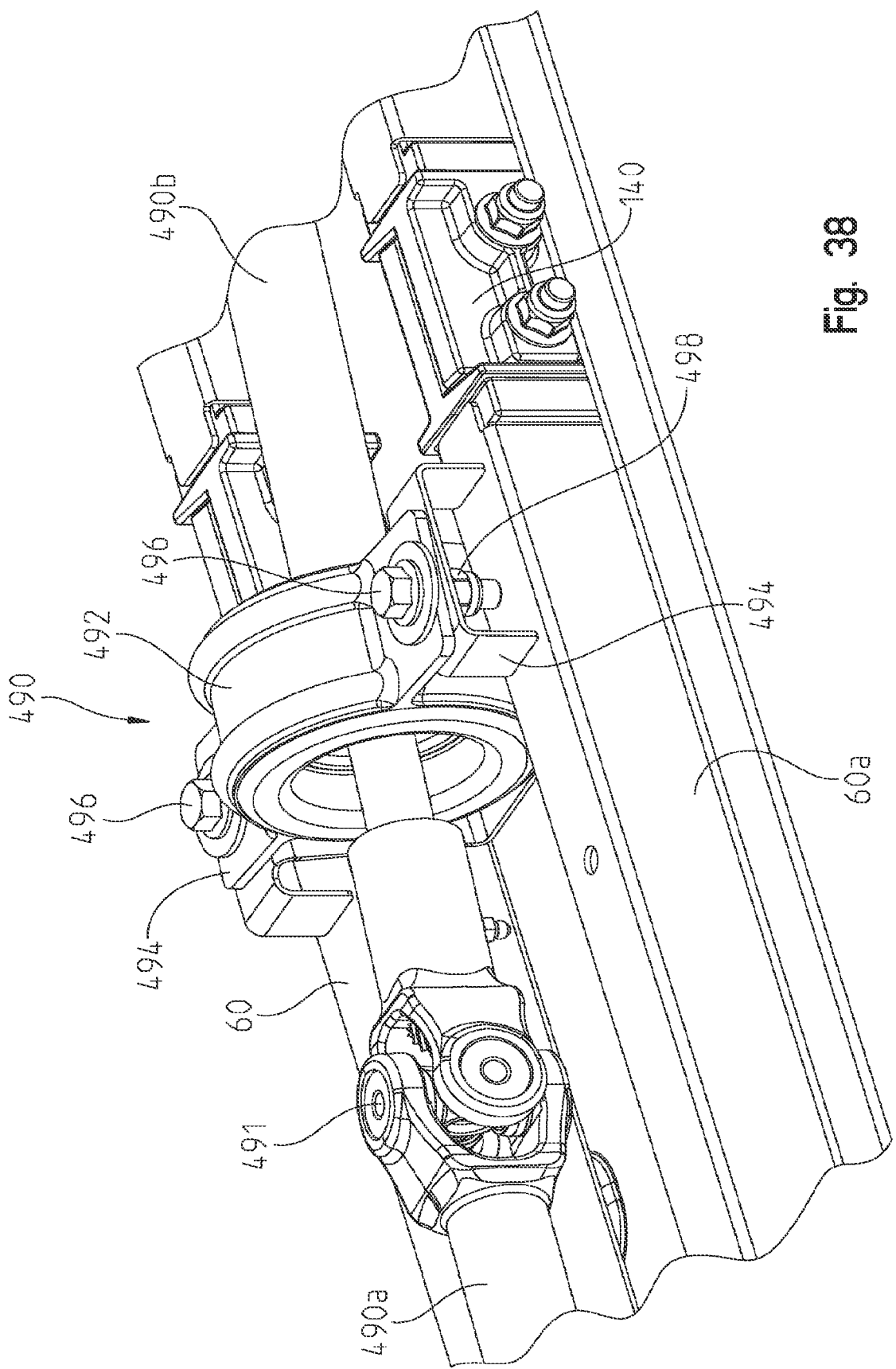
FIG. 38 is a side perspective view of a driveshaft of the powertrain assembly of FIG. 36.

As shown in FIGS. 37 and 38, powertrain assembly 470 further includes a rear differential assembly 480. Rear differential assembly 480 is enclosed within a casing 482 supported on rear frame portion 54 and includes an input shaft 484 and an output shaft 486. Input shaft 484 is operably coupled to transmission 474 and output shaft 486 is operably coupled to driveshaft 490 in order to drive front wheels 4 of vehicle 2. Rear differential assembly 480 also includes a splined bearing 488 for coupling with the half shafts of rear wheels 6 in order to drive rear wheels 6.

As shown in FIG. 38, driveshaft 490 includes a front portion 490a and a rear portion 490b. Front portion 490a is operably coupled to rear portion 490b with a joint 491, illustratively, a U-joint. By separating driveshaft 490 into front portion 490a and rear portion 490b, less vibration and whip from the rotational rpm may be transmitted through driveshaft and between front end 8 and rear end 14 of vehicle 2. Rear portion 490b is supported on longitudinal frame tubes 60 with a bearing 492. In one embodiment, bearing 492 is a hanger bearing. Bearing 492 is coupled to brackets 494 (also shown in FIG. 9) with fasteners 496 and 498. Rear portion 490b is rotatably coupled to output shaft 486 of rear differential assembly 480. Similarly, front portion 490a is rotatably coupled to a front differential assembly.

Figure 39:
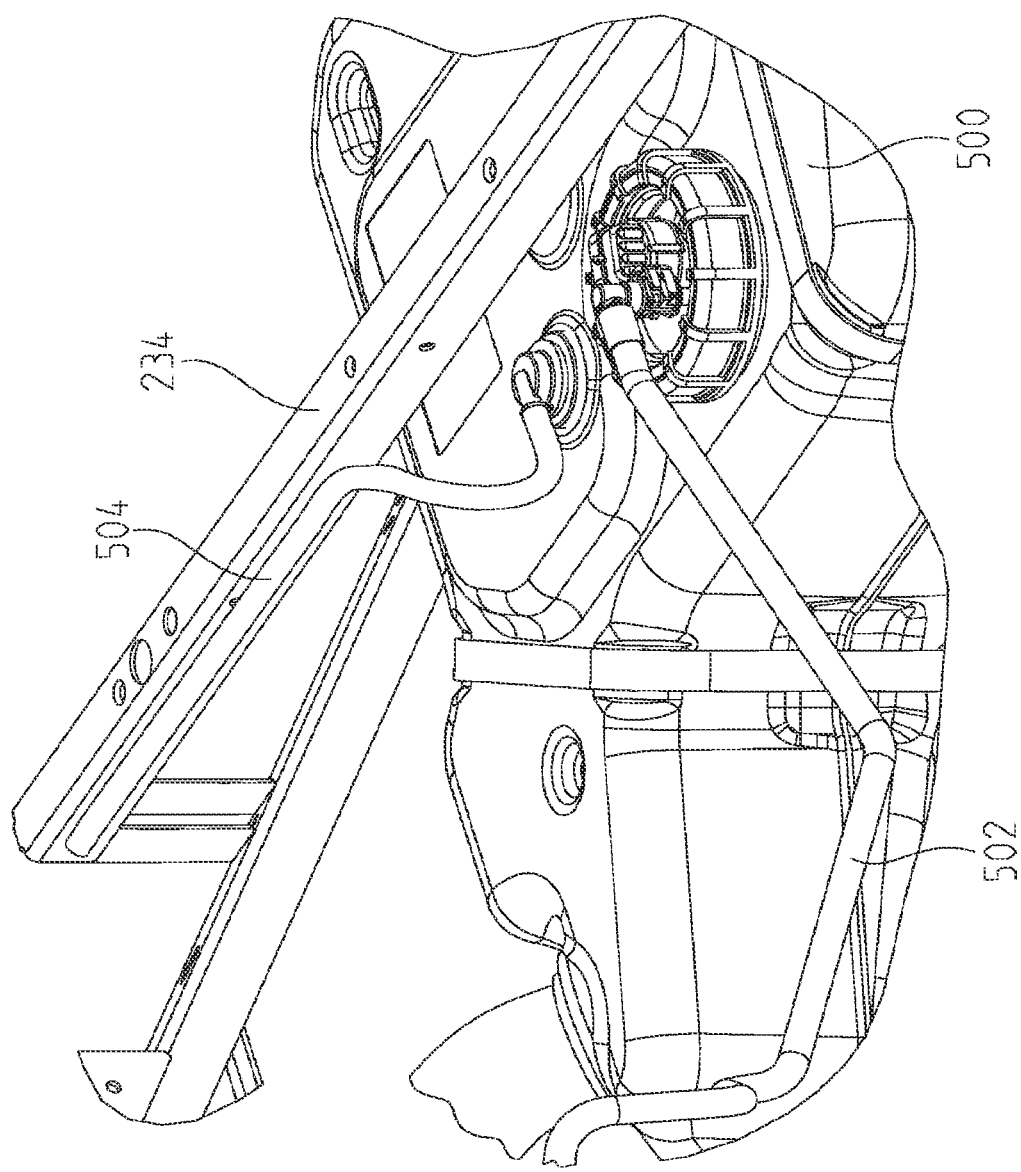
FIG. 39 is a detailed front perspective view of a portion of a fuel tank of the powertrain assembly of FIG. 36.

Referring to FIG. 39, powertrain assembly 470 is operably coupled to fuel tank 500. In particular, fuel flows from fuel tank 500 to engine 472 through a fuel line 502. A vent tube 504 of fuel tank 500 extends towards an outer side of vehicle 2 and exhausts gases therein from the side operator side of vehicle 2. Vent tube 504 may be coupled to frame member 234 with ties or other fasteners. Fuel may be added to fuel tank 500 through a fuel inlet when a cap 506 is removed (FIG. 1). Cap 506 is supported on a side body panel 508. Additional details of fuel tank 500 may be disclosed in U.S. Provisional Patent Application Ser. No. 61/442,071, filed on Feb. 11, 2011; U.S. patent application Ser. No. 13/1370,139, filed on Feb. 9, 2012; U.S. patent application Ser. No. 13/464,603, filed on May 4, 2012; and U.S. patent application Ser. No. 13/492,589, filed on Jun. 8, 2012, the complete disclosures of which are expressly incorporated by reference herein.

Figure 36:
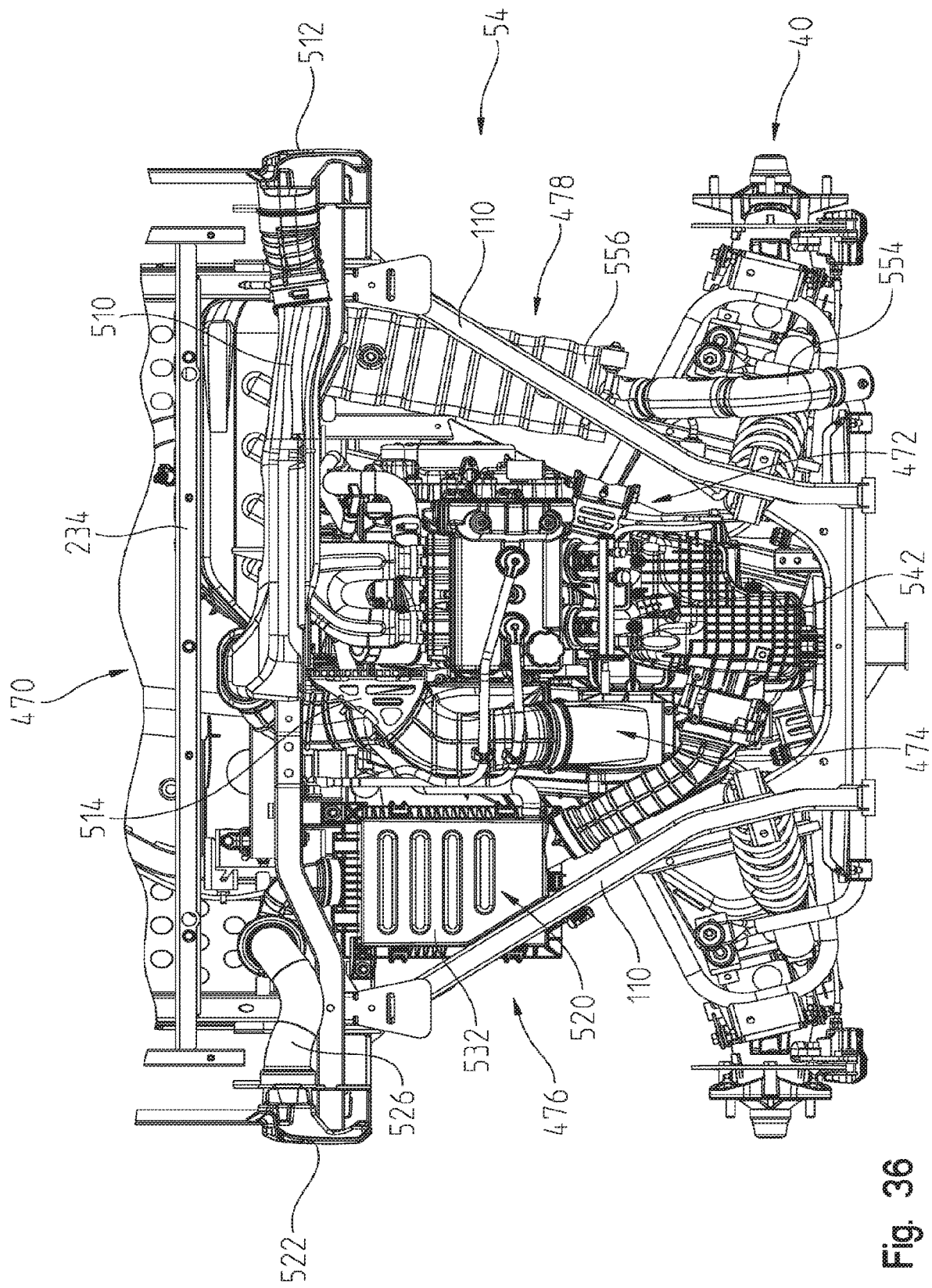
FIG. 36 is a top view of the rear section of the frame assembly of FIG. 11 supporting a powertrain assembly.

Air intake assembly 476 includes an air intake assembly 510 for transmission 474 and an air intake assembly 520 for engine 472. Transmission air intake assembly 510 includes an inlet 512 supported on a side body panel 514 (FIG. 2). As shown in FIG. 36, air from inlet 512 on the passenger side of vehicle 2 flows inwardly and into transmission 474. Air is exhausted from an exhaust port 516 and flows outwardly toward the passenger side of vehicle 2, for example across exhaust assembly 478. Additional details of transmission air intake assembly 510 are disclosed in U.S. Provisional Patent Application Ser. No. 61/442,071, filed on Feb. 11, 2011; U.S. patent application Ser. No. 13/1370,139, filed on Feb. 9, 2012; U.S. patent application Ser. No. 13/464,603, filed on May 4, 2012; and U.S. patent application Ser. No. 13/492,589, filed on Jun. 8, 2012, the complete disclosures of which are expressly incorporated by reference herein.

Figure 40:
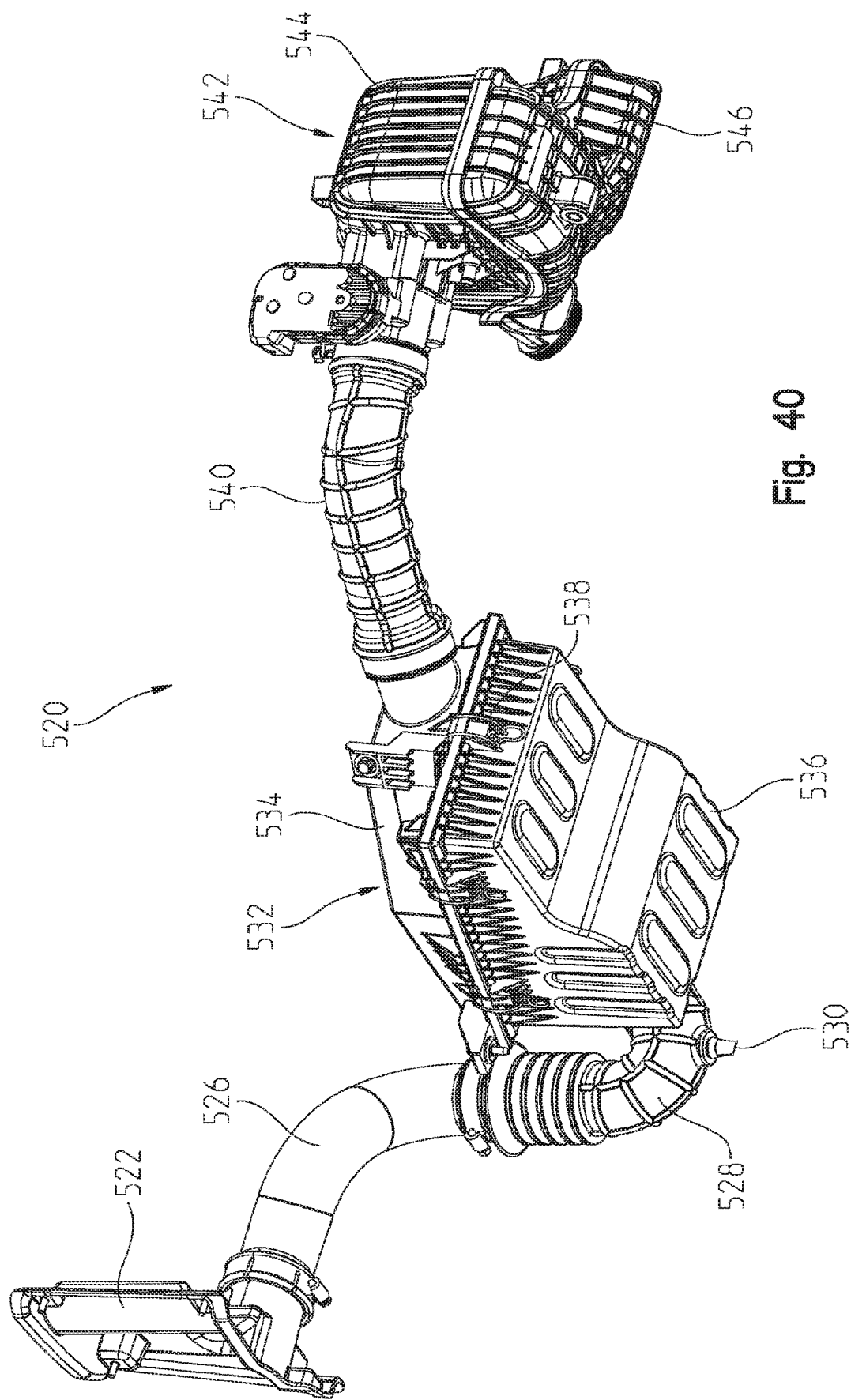
FIG. 40 is a bottom perspective view of an air intake assembly of the powertrain assembly of FIG. 36.
Figure 41:
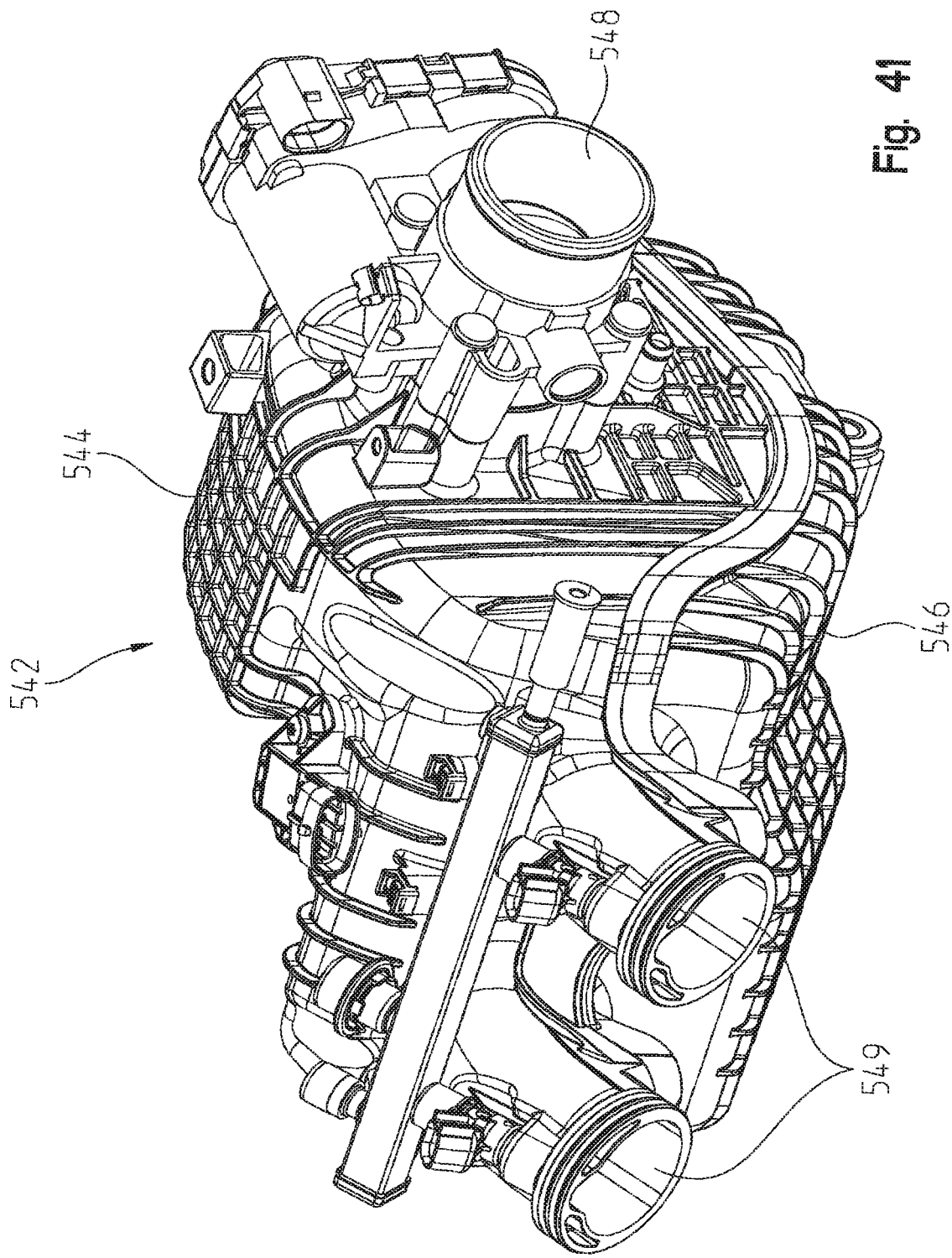
FIG. 41 is a front perspective view of an air plenum of the air intake assembly of FIG. 40.
Figure 42:
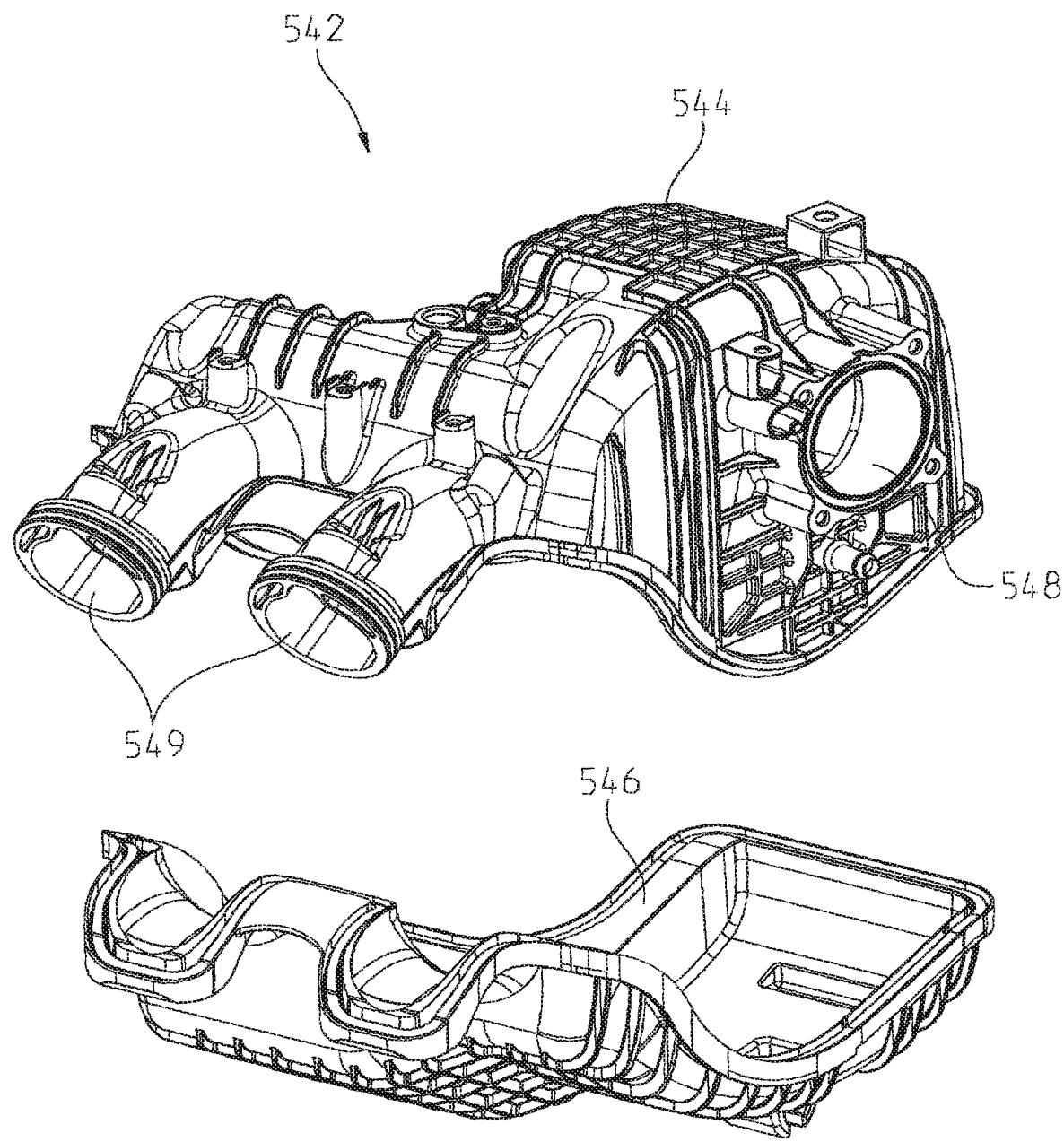
FIG. 42 is an exploded view of the air plenum of FIG. 41.

Referring to FIGS. 40-42, engine air intake assembly 520 includes an inlet 522 supported on a side body panel 524 (FIG. 1) on the operator side of vehicle 2. Illustratively, inlet 522 is positioned above cap 506 of fuel tank 500. Inlet 522 is coupled to a hose 526 with conventional fasteners, illustratively a clamp. Similarly, hose 526 is coupled to a hose 528 with a clamp. Hose 528 includes a one-way port or valve, illustratively a duckbill port 530, which allows water within hose 528 to flow outwardly therefrom but does not allow air or particulate matter (e.g., dirt, debris) flow into hose 528. Hose 528 is coupled to an air box assembly 532, which includes a lid 534 and a base 536. Lid 534 is coupled to base 536 with latches 538. Base 536 may include a drain opening. Air box assembly 532 further includes a filter supported between lid 534 and base 536. Air flows from air box assembly 532, through a hose 540, and into an air plenum assembly 542.

As shown best in FIGS. 41 and 42, air plenum assembly 542 includes a top portion 544 and a bottom portion 546. Top portion 544 and bottom portion 546 may be comprised of a metallic or polymeric material and may be formed through casting or injection molding methods. Top portion 544 may be coupled to bottom portion 546 through heat or sonic welding. Alternatively, top portion 544 may be coupled to bottom portion 546 with conventional fasteners. A filter may be included within air plenum assembly 542. Air plenum assembly 542 includes an inlet port 548 for receiving air from air box assembly 532 through hose 540. Additionally, air plenum assembly 542 includes at least one output port 549. Illustratively, air plenum assembly 542 includes two output ports 549. Output ports 549 are coupled to engine 472 in order to provide air thereto for combustion. As shown in FIG. 42, inlet port 548 and output ports 549 are supported on top portion 544 of air plenum assembly 542. Additional details of engine air intake assembly 520 are disclosed in U.S. Provisional Patent Application Ser. No. 61/442,071, filed on Feb. 11, 2011; U.S. patent application Ser. No. 13/1370,139, filed on Feb. 9, 2012; U.S. patent application Ser. No. 13/464,603, filed on May 4, 2012; and U.S. patent application Ser. No. 13/492,589, filed on Jun. 8, 2012, the complete disclosures of which are expressly incorporated by reference herein.

Figure 43:
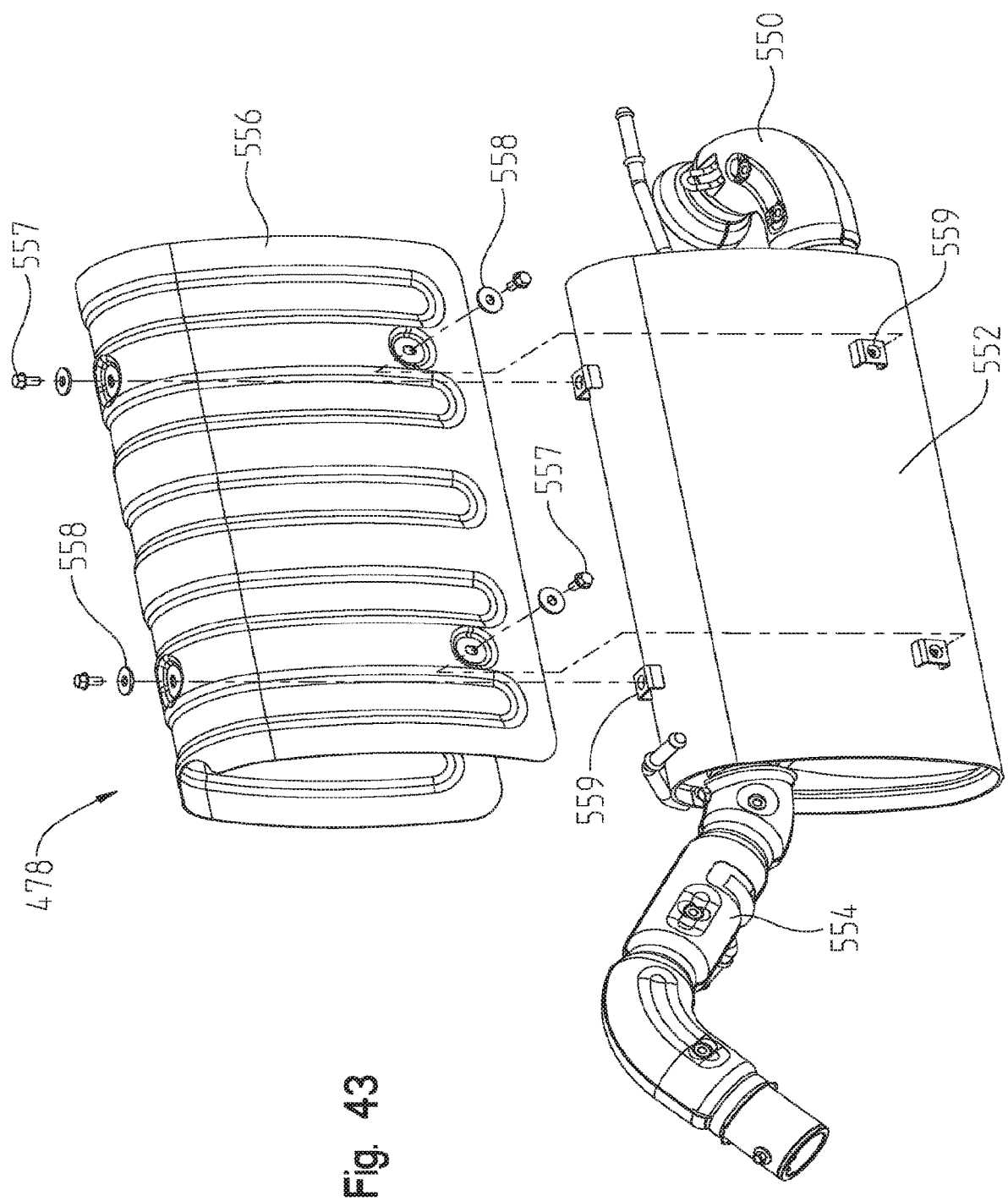
FIG. 43 is an exploded view of an exhaust assembly of the powertrain assembly of FIG. 36.

Exhaust assembly 478 also is fluidly coupled to engine 472 in order to exhaust gases therefrom. Referring to FIG. 43, exhaust assembly 478 includes an inlet hose 550, a muffler 552, an exhaust pipe 554, and a heat shield 556. Inlet hose 550 is coupled to a portion of engine 472 in order to exhaust gases therefrom. Gases from engine 472 flow through inlet hose 550 and into muffler 552. Gases from muffler 552 flow out of vehicle 2 through exhaust pipe 554. Heat shield 556 is coupled to muffler 552 with fasteners 557 and 558. More particularly, as shown in FIG. 43, fasteners 557 and 558 couple with brackets 559 on muffler 552 in order to secure heat shield 556 to muffler 552. Heat shield 556 substantially surrounds or encapsulates muffler 552. Additional details of exhaust assembly 478 may be disclosed in U.S. Provisional Patent Application Ser. No. 61/442,071, filed on Feb. 11, 2011; U.S. patent application Ser. No. 13/1370,139, filed on Feb. 9, 2012; U.S. patent application Ser. No. 13/464,603, filed on May 4, 2012; and U.S. patent application Ser. No. 13/492,589, filed on Jun. 8, 2012, the complete disclosures of which are expressly incorporated by reference herein.

Referring now to FIGS. 44-58, in one embodiment, operator cab 20 may be enclosed with roof assembly 610, door assembly 560, front windshield 24, and rear windshield 26. Additional details of front windshield 24 and rear windshield 26, including the details of mounting windshields 24, 26 to frame assembly 50, are disclosed in U.S. Provisional Patent Application Ser. No. 61/442,071, filed on Feb. 11, 2011; U.S. patent application Ser. No. 13/1370,139, filed on Feb. 9, 2012; U.S. patent application Ser. No. 13/464,603, filed on May 4, 2012; and U.S. patent application Ser. No. 13/492,589, filed on Jun. 8, 2012, the complete disclosures of which are expressly incorporated by reference herein.

As shown in FIGS. 44-54, door assembly 560 includes front doors 562 and rear doors 564. Doors 562, 564 are removably hinged at upright portions 316, 294, respectively, such that doors 562, 564 swing rearwardly when opening. Doors 562, 564 include windows 569 and latches 568. Latches 568 are released when opening doors 562, 564 and are engaged when doors 562, 564 are closed against roll cage assembly 260. Additional details of windows 569 and latches 568 are disclosed in U.S. patent application Ser. No. 13/1370,139, filed on Feb. 9, 2012; U.S. patent application Ser. No. 13/464,603, filed on May 4, 2012; and U.S. patent application Ser. No. 13/492,589, filed on Jun. 8, 2012, the complete disclosures of which are expressly incorporated by reference herein. Because roll cage assembly 260 includes profiled components, doors 562, 564 may be generally flush with roll cage assembly 260 when closed. Doors 562, 564 also include sealing members 566 which are compressed against doors 562, 564 and roll cage assembly 260 to seal and isolate operator cab 20 and operator area 22.

Figure 49:
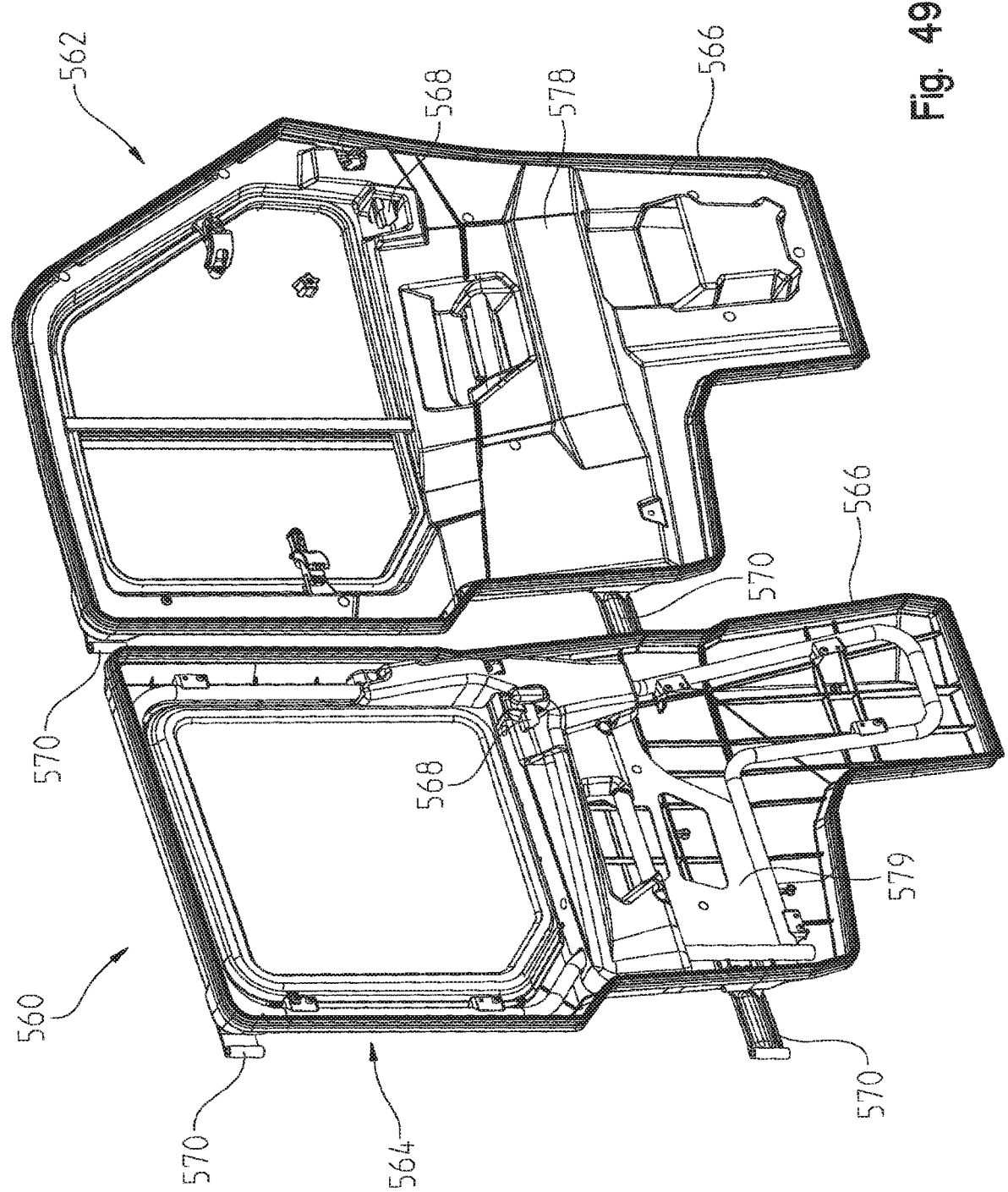
FIG. 49 is a side view of the door assembly of the operator cab of FIG. 44.
Figure 50:
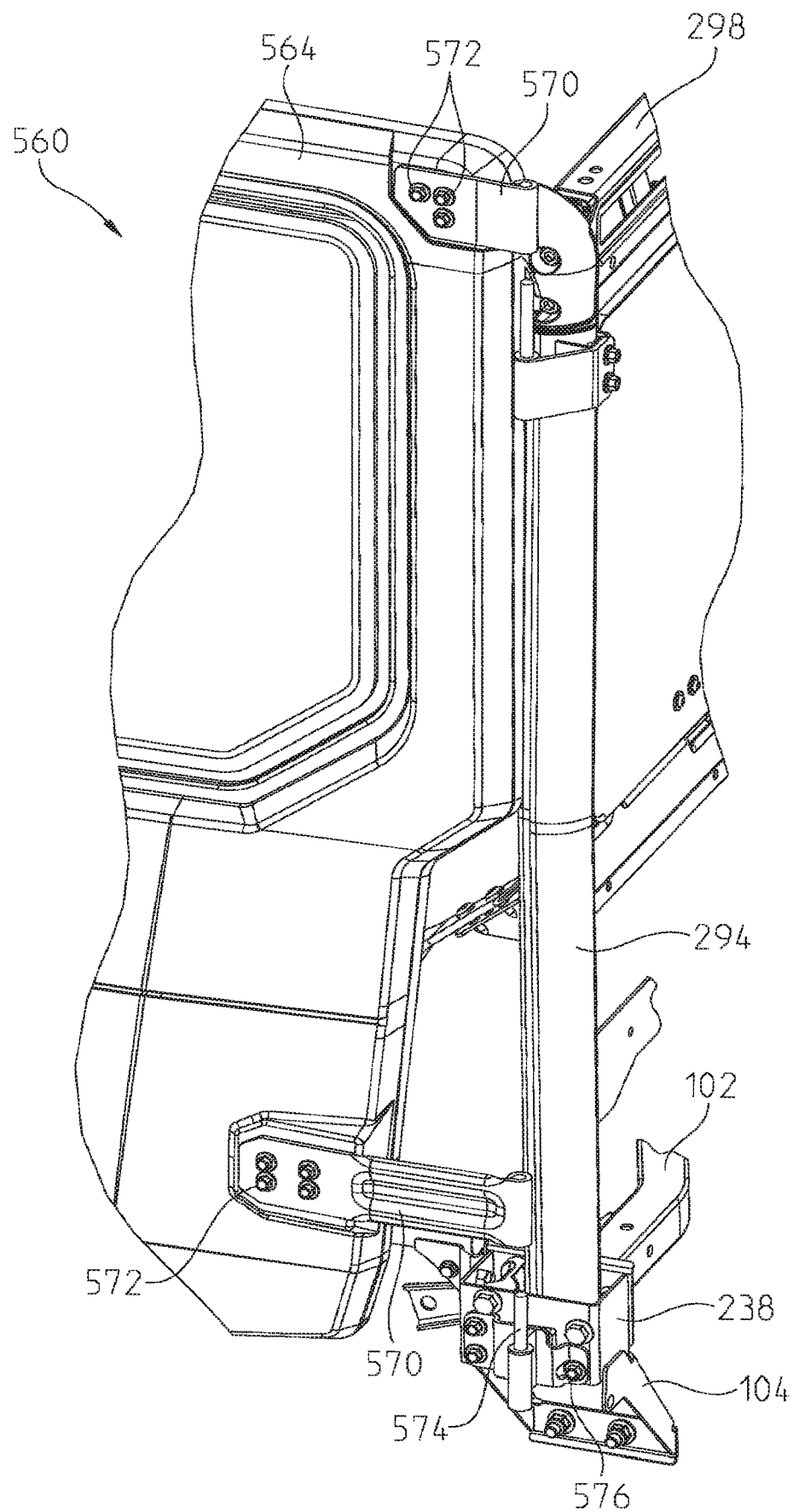
FIG. 50 is a detailed perspective view of the door assembly of FIG. 49.
Figure 51:
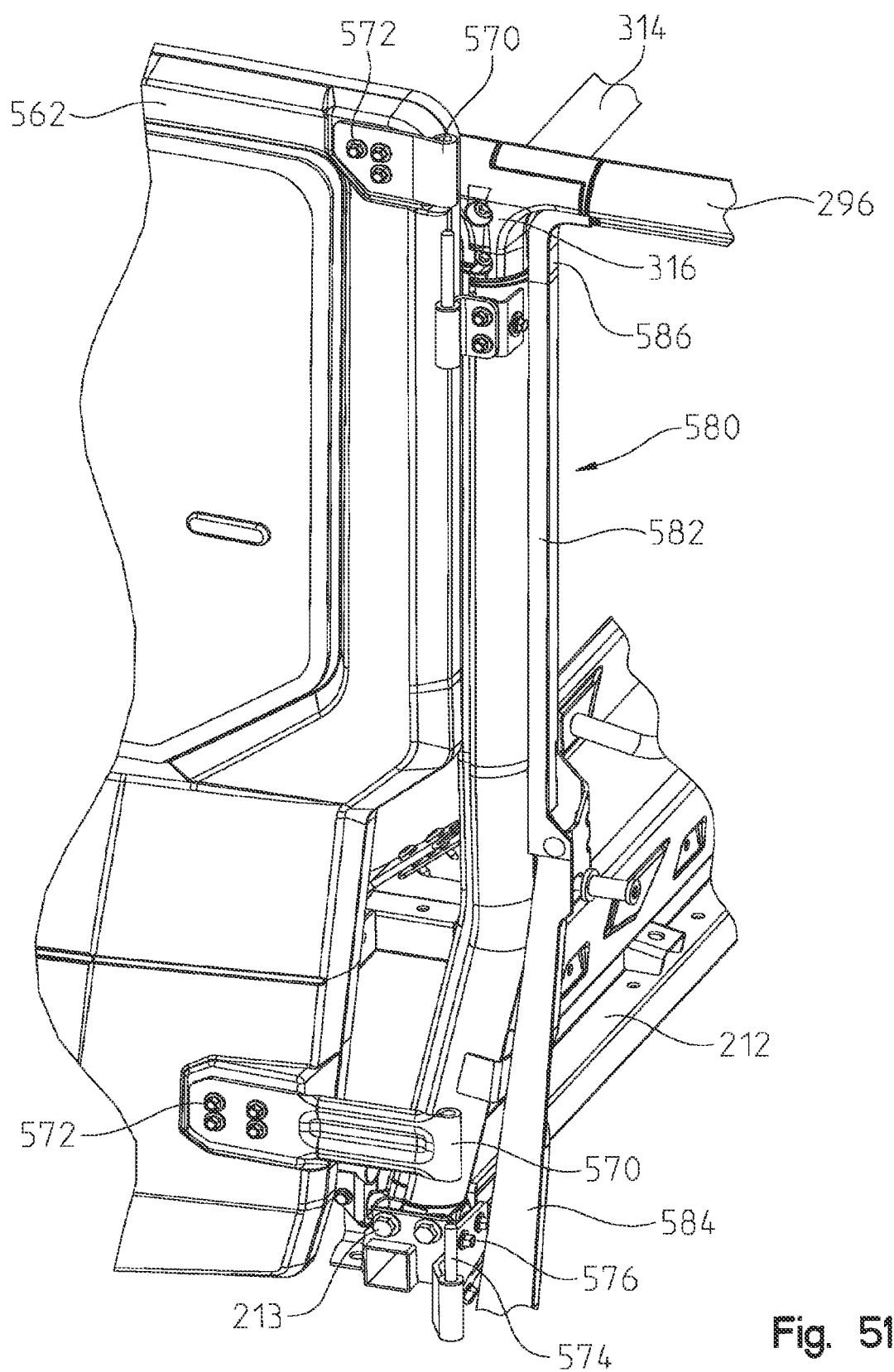
FIG. 51 is a detailed perspective view of the door assembly of FIG. 49, including a sealing member.
Figure 52:
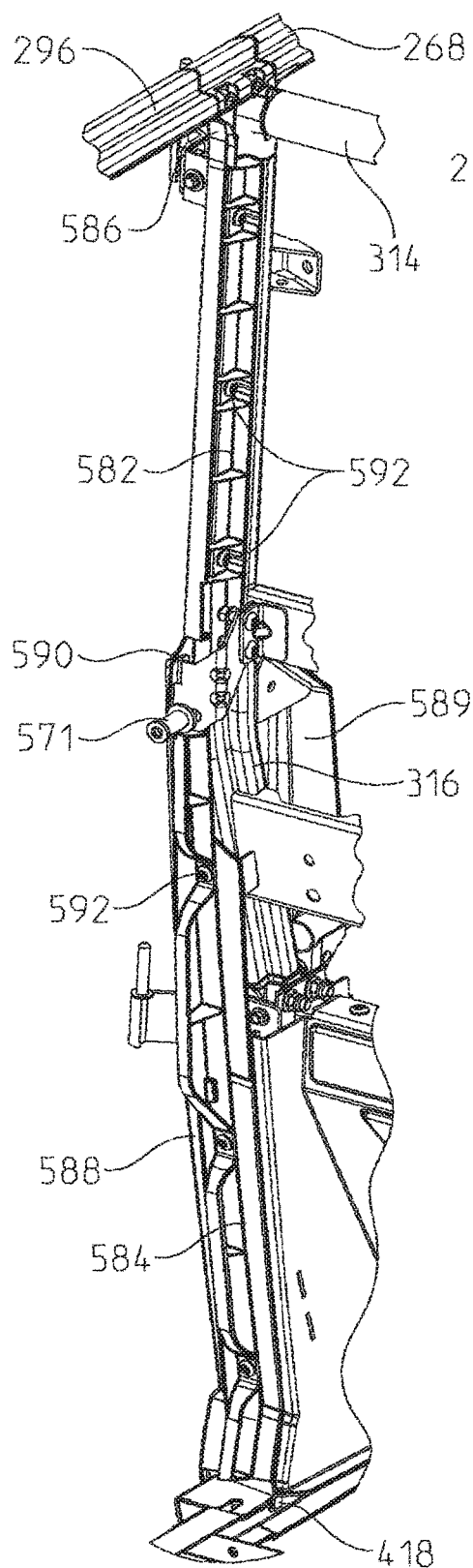
FIG. 52 is an inner rear perspective view of the sealing member of FIG. 51.
Figure 53:
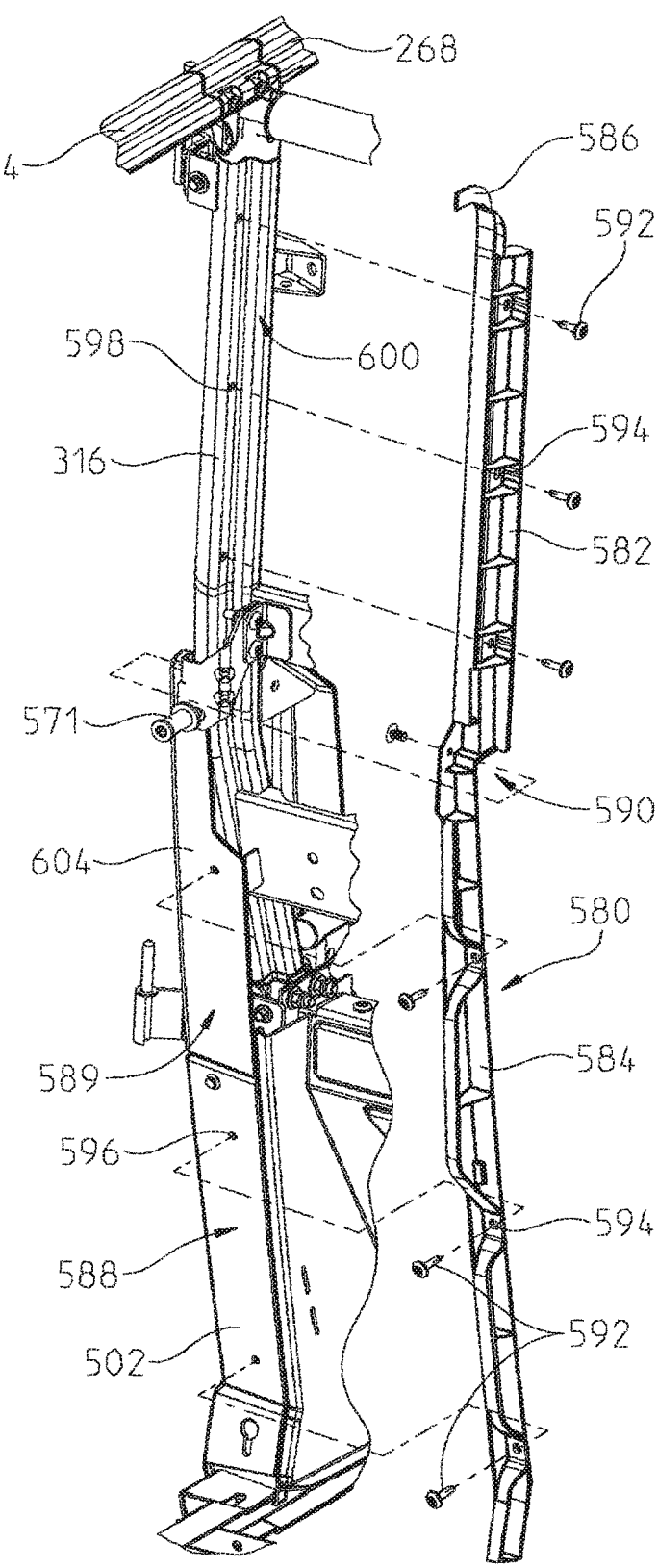
FIG. 53 is an exploded view of the sealing member of FIG. 52.

As shown in FIGS. 49-51, upright portions 294, 316 of roll cage assembly 260 may support a hinge member 570. Hinge member 570 is configured to receive a hinge pin 574. Hinge pin 574 for front doors 562 is supported on plates 213 of transverse frame member 212 with fasteners 576. Similarly, hinge pin 574 for rear doors 564 is supported on bracket 238 with fasteners 576. Hinge pin 574 is received within hinge member 570 and rotates therein when doors 562, 564 are opened and closed. When assembling doors 562, 564 to roll cage assembly 260, tools are not required because doors 562, 564 are secured thereto when hinge pin 574 is received within hinge member 570. Additionally, doors 562, 564 may be easily removed from roll cage assembly 260 by lifting up on doors 562, 564. Each door 562, 564 also may include an auxiliary latching assembly for limiting the movement of doors 562, 564 when open. For example, the auxiliary latching assembly may be a strap with a buckle. Additional details of doors 562, 564, hinge members 570, hinge pins 574, and the auxiliary latching assembly are disclosed in U.S. patent application Ser. No. 13/1370, 139, filed on Feb. 9, 2012; U.S. patent application Ser. No. 13/464,603, filed on May 4, 2012; and U.S. patent application Ser. No. 13/492,589, filed on Jun. 8, 2012, the complete disclosures of which are expressly incorporated by reference herein.

As shown in FIG. 49, front doors 562 may include an inner cover member or skin 578 which substantially covers the inner side of front doors 562. Conversely, illustrative rear doors 564 may include an inner cover member or skin 579 which partially covers the inner side of rear doors 564. In particular, inner cover member 579 of rear doors 564 covers the portions of doors 564 that the rear passengers are likely to contact. Illustratively, inner cover member 579 is positioned in a middle section of rear doors 564 to protect the rear passengers' hands and arms.

Referring to FIGS. 51-54, seals 566 (FIG. 49) may be compressed between doors 562, 564 and roll cage assembly 260 to seal operator cab 20. Additionally, rear doors 564 may be further sealed against roll cage assembly 260, and in particular, upright portions 316, with a sealing assembly 580. Exemplary sealing assembly 580 is comprised of an injection molded polymeric material. Sealing assembly 580 is coupled to upright portions 316 and also is coupled to body panels 588, 589 coupled to upright portions 316 (FIGS. 44 and 45). Sealing assembly 580 includes an upper portion 582 and a lower portion 584. Upper portion 582 and lower portion 584 are coupled together at a protrusion 590. Protrusion 590 is positioned adjacent a post 571 of door latches 568.

Upper portion 582 includes a top end member 586 which may be integrally formed with upper portion 582 or may be coupled thereto with conventional fasteners (e.g., welds, rivets, adhesive, bolts, screws, or staples). Illustratively, top end member 586 is rounded and contacts both upright portions 316 and horizontal portions 294.

Figure 54:
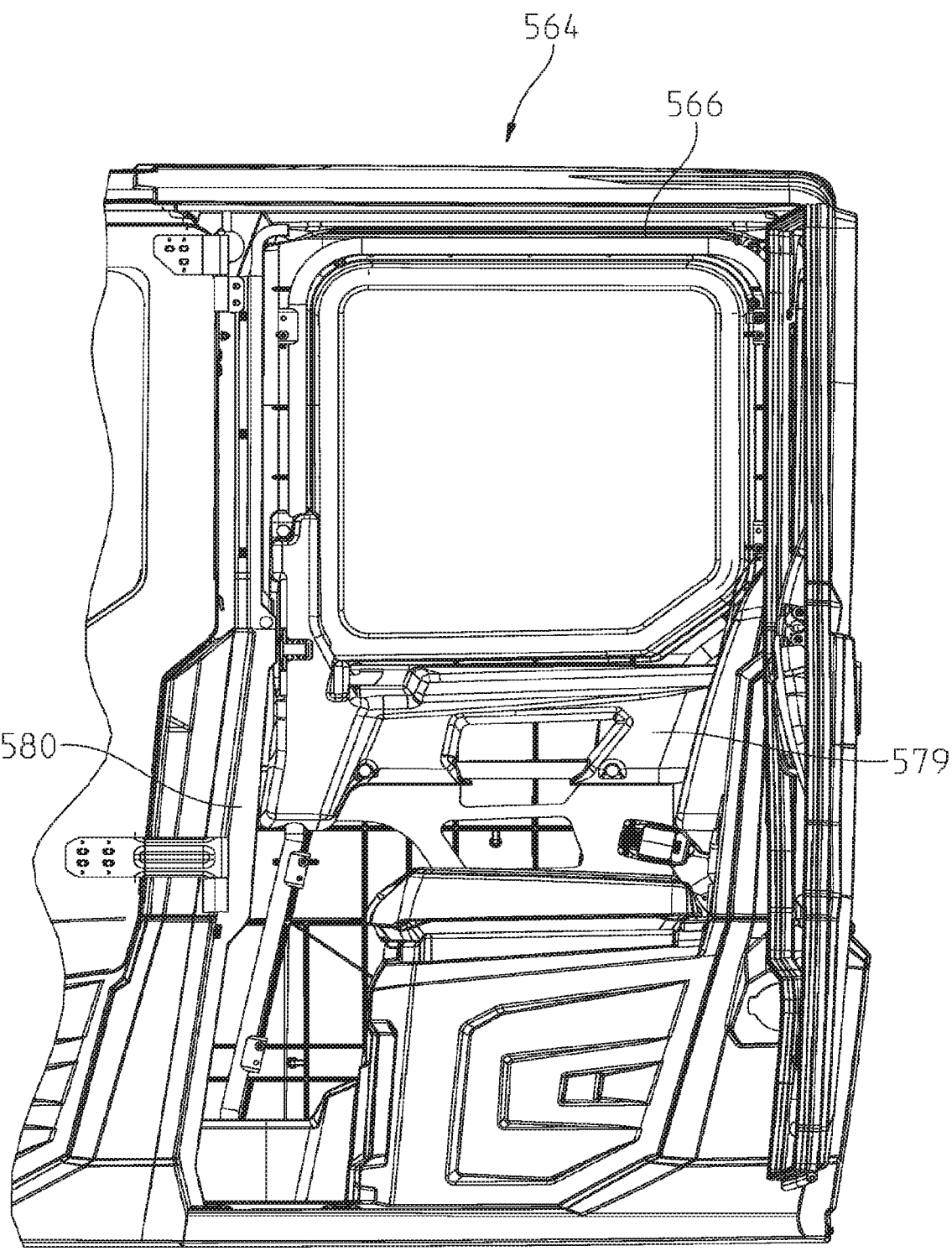
FIG. 54 is a side view of a portion of the operator cab of FIG. 44.
Figure 55:
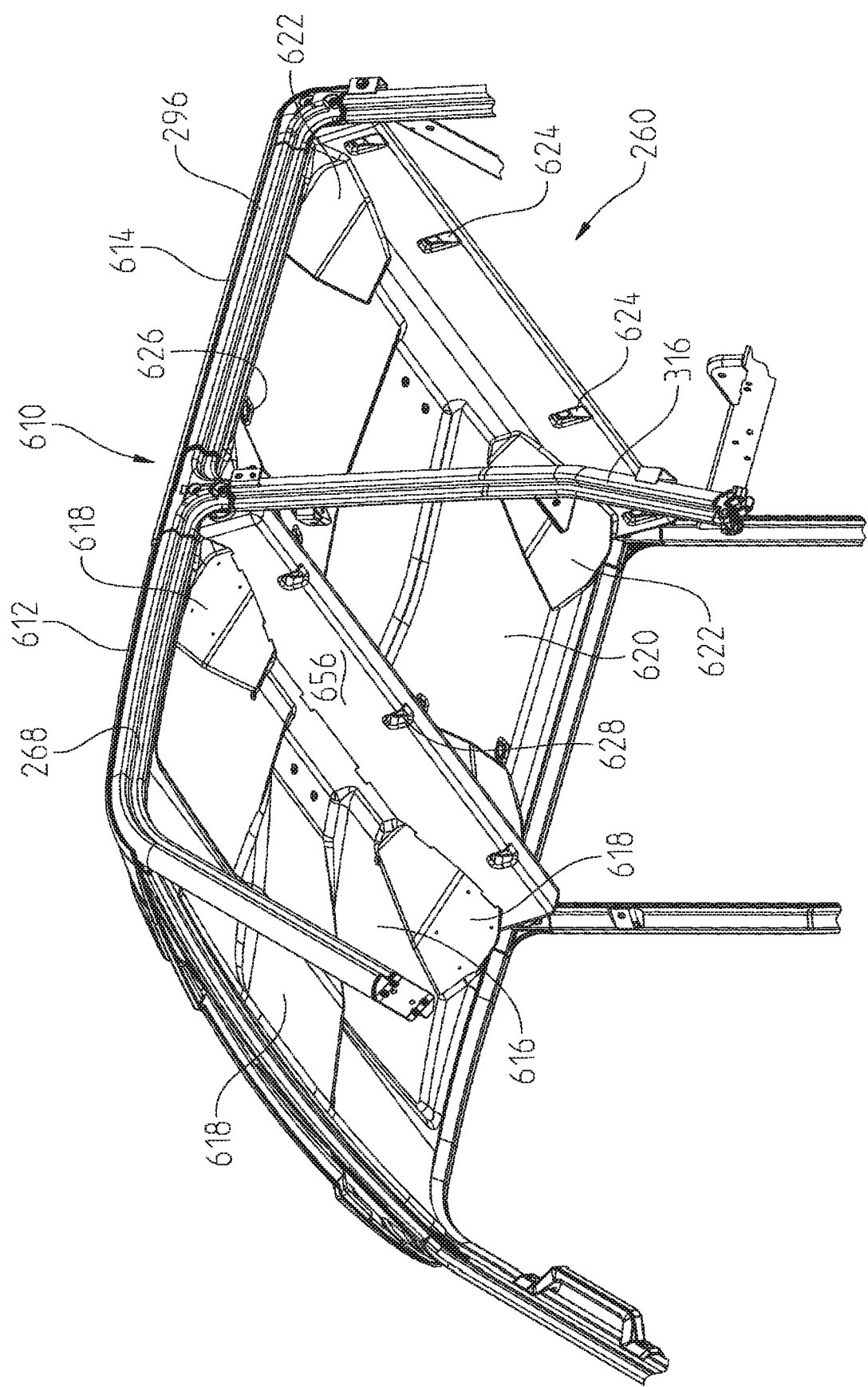
FIG. 55 is a bottom front perspective view of the roof assembly of FIG. 44.

Upper portion 582 is coupled to an inner profiled surface 600 of upright portions 316 with fasteners 592. Fasteners 592 extend through apertures 594 of sealing assembly 580 and through apertures 598 of profiled inner surface 600 of upright portions 316. Lower portion 584 is coupled to a side surface 602 of body panel 588 and a side surface 604 of body panel 589. In particular, fasteners 592 extend through apertures 594 of lower portion 584 and apertures 596 of body panels 588, 589. Fasteners 592 also may couple body panels 588, 589 to portions of frame assembly 50, such that fasteners 592 perform the function of both coupling sealing assembly 580 to vehicle 2 and coupling body panels 588, 589 to frame assembly 50. When sealing assembly 580 is assembled with body panels 588, 589 and upright portions 316, lower portion 584 may extend rearwardly from side surfaces 602, 604, of body panels 588, 589, respectively. As shown in FIG. 54, when closed, rear doors 564 are flush with sealing assembly 580 such that rear doors 564 are sealed against body panels 588, 589 and upright portions 316. Additionally, sealing member 566 may further seal rear doors 564 against horizontal portions 296 and upright portions 294 of roll cage assembly 260.

Referring to FIGS. 55-58, roof assembly 610 is shown. Roof assembly 610 includes a first outer member 612, a second outer member 614, a first inner member 616, and a second inner member 620. First outer member 612 includes coupling members, illustratively hooks 632, for coupling with upper crossbeam 270 of roll cage assembly 260. Hooks 632 extend into openings 271 (FIG. 21) of upper crossbeam 270 in order to retain first outer member 612 to upper crossbeam 270. A seal 636 may be positioned intermediate first outer member 612 and upper crossbeam 270. Seal 636 is compressed therebetween in order to isolate operator cab 20. Outer member 612 also includes a plurality of bosses 634. Bosses 634 may be internally threaded to receive fasteners, as detailed further herein. As shown, first outer member 612 is generally positioned above front section 262 of roll cage assembly 260 and first seating section 202 of frame assembly 50.

Second outer member 614 includes a plurality of coupling members, illustratively front hooks 640 and rear hooks 642. Front hooks 640 extend around a forward side of transverse frame tube 314 of roll cage assembly 260 and include a tab 641 which receives a fastener, as detailed further herein. Rear hooks 642 extend into openings 287 of upper rear crossbeam 298 of roll cage assembly 260. In this way, second outer member 614 is retained on roll cage assembly 260. A seal 664 may be positioned intermediate second outer member 614 and rear upper crossbeam 298 to isolate operator cab 20. Second outer member 614 may also include a plurality of bosses 644, which may be internally threaded to receive fasteners, as detailed further herein. As shown, second outer member 614 is generally positioned above rear section 264 of roll cage assembly 260 and second seating section 220 of frame assembly 50.

First and second outer members 612, 614 are coupled together and illustratively overlap each other at a middle portion 646. Middle portion 646 defines the apex of roof assembly 610 such that first outer member 612 and second outer member 614 taper downwardly from middle portion 646. As such, middle portion 646 prevents water or debris from puddling on roof assembly 610. A seal 648 may be positioned intermediate first and second outer members 612, 614 in order to seal roof assembly 610 at middle portion 646.

Figure 56:
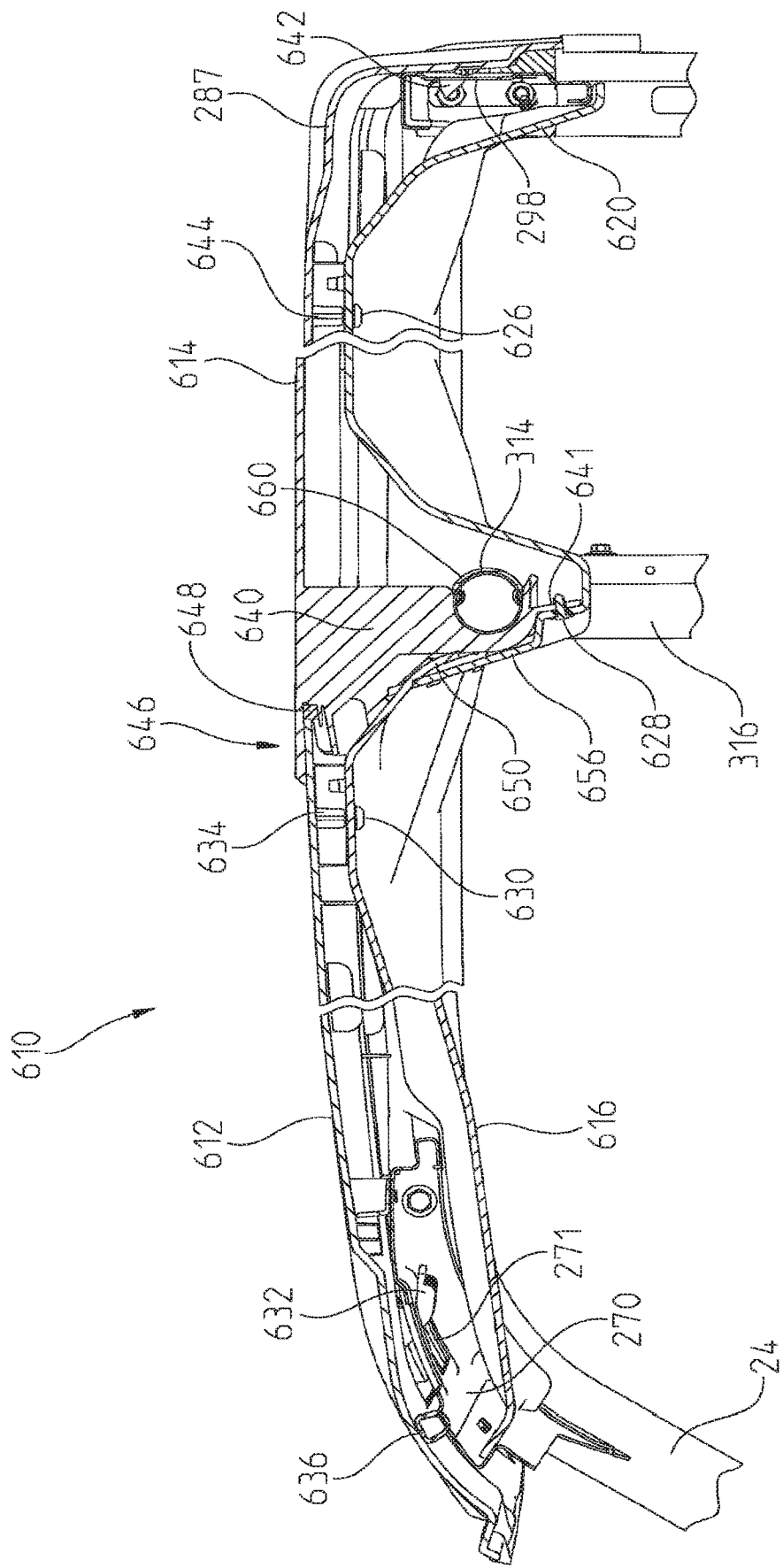
FIG. 56 is a side cross-sectional view of the roof assembly of FIG. 55.
Figure 57:
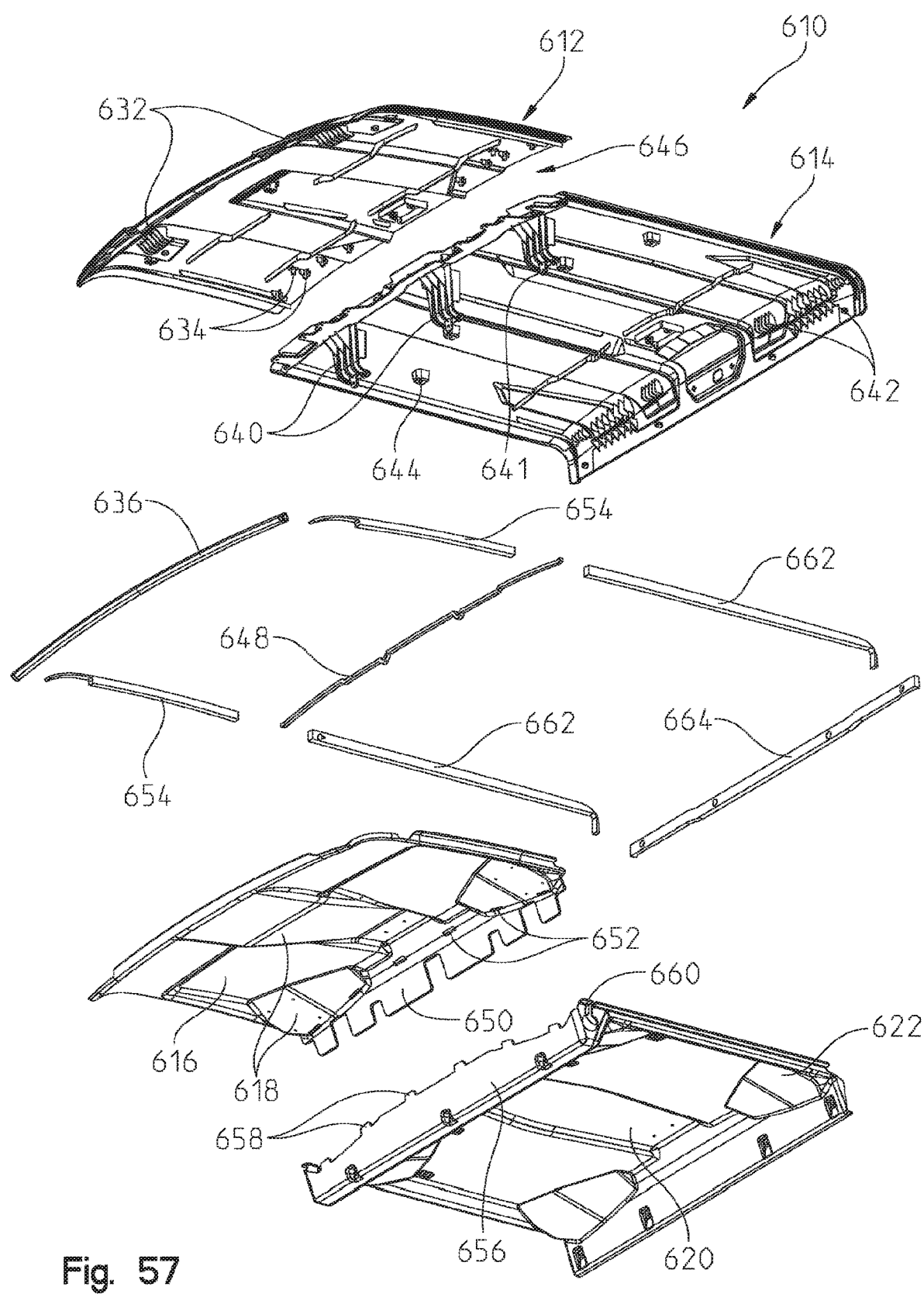
FIG. 57 is a bottom exploded view of the roof assembly of FIG. 55.
Figure 58:
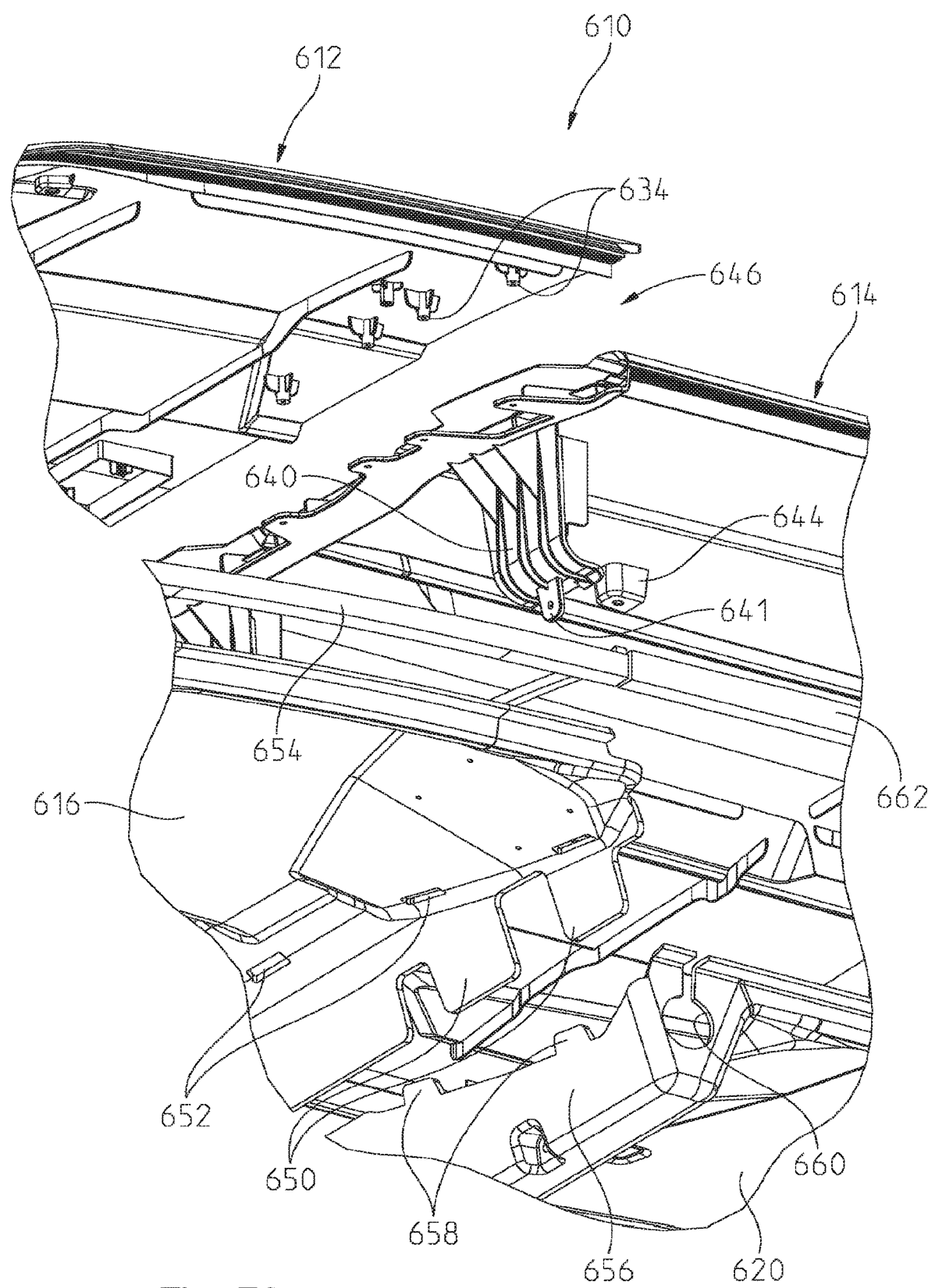
FIG. 58 is an exploded view of a portion of the roof assembly of FIG. 55.

First inner member 616 is positioned below first outer member 612 and includes accessory portions 618 for supporting speakers, lights, or other components of vehicle 2. Additionally, first inner member 616 includes a plate 650 and a plurality of slots 652 for coupling with second inner member 620, as further detailed herein. First inner member 616 is configured to receive fasteners 630 for coupling first inner member 616 to first outer member 612. More particularly, as shown in FIG. 56, fasteners 630 are received within bosses 634 of first outer member 612 and are tightened to minimize the vertical gap and prevent sagging between first inner member 616 and first outer member 612. Seals 654 (FIG. 57) may be positioned intermediate first outer member 612 and first inner member 616 in order to seal roof assembly 610.

Second inner member 620 is positioned rearward of first inner member 616 and below second outer member 614. Second inner member 620 includes accessory portions 622 for supporting speakers, lights, or other components of vehicle 2. Additionally, second inner member 620 includes a protrusion 656 having a plurality of fingers 658 and an opening 660. Protrusion 656 is "V" shaped and is configured to receive transverse frame tube 314. Second inner member 620 is configured to receive fasteners 626 for coupling second inner member 620 to second outer member 614. More particularly, as shown in FIG. 56, fasteners 626 are received within bosses 644 of second outer member 614 and are tightened to minimize the vertical gap and prevent sagging between second inner member 620 and second outer member 614. Seals 662 (FIG. 57) may be positioned intermediate second outer member 614 and second inner member 620 in order to seal roof assembly 610.

Second inner member 620 may be coupled to first inner member 616 through protrusion 656. More particularly, plate 650 of first inner member 616 is received within protrusion 656 of second inner member 620, as shown best in FIG. 56. Fingers 658 of protrusion 656 extend upwardly along plate 650 and are received within slots 652 of first inner member 616. As such, first inner member 616 is retained on second inner member 620 without requiring tools. Additionally, a fastener 628 may be received through protrusion 656 of second inner member 620 and tab 641 of front hooks 640 of second outer member 614. As such, fastener 628 and tab 641 couple together second outer member 614 and second inner member 620.

When assembling roof assembly 610 to vehicle 2, first and second outer members 612, 614 may be positioned on roll cage assembly 260 and moved into proper position and alignment by pulling rearwardly on roof assembly 610. In this way, hooks 632 of first outer member 612 couple with openings 271 of front upper crossbeam 270 and first outer member 612 slides rearwardly into second outer member 614 at middle portion 646. Front hooks 640 of second outer member 614 also slide rearwardly to extend around a portion of transverse frame tube 314. Additionally, when roof assembly 610 is pulled rearwardly, rear hooks 642 of second outer member 614 extend into openings 287 of rear upper crossbeam 298. In this way, first and second outer members 612, 614 are retained together on roll cage assembly 260 in a tool-less manner (i.e., without requiring tools).

First and second inner members 616, 620 are assembled after first and second outer members 612, 614 have been coupled to roll cage assembly 260. Seals 636, 648, 654, 662, and 664 may be positioned around the perimeter of roof assembly 610 and compressed between first outer member 612, first inner member 616, second outer member 614, and second inner member 620. First inner member 616 may be coupled to first outer member 612 through fasteners 630 and bosses 634. Second inner member 620 may then be coupled to first inner member 616 by positioning fingers 658 of protrusion 656 in slots 652 of first inner member 616. Additionally, protrusion 656 may receive fastener 628 through tab 641 of front hooks 640 in order to secure second inner member 620 to second outer member 616. Second inner member 620 also may be coupled to second outer member 614 with fasteners 626. Fasteners 626 may be received within bosses 644 of second outer member 614 and tightened to secure second inner member 620 to second outer member 614. Additionally, fasteners 624 may be received through second inner member 620 in order to further couple second inner member 620 to second outer member 614. It may be appreciated that assembling roof assembly 610 with roll cage assembly 260 may be a tool-less operation (i.e., no tools are required for assembling roof assembly 610 with roll cage assembly 260). Tools also are not required for coupling together first outer member 612, second outer member 614, first inner member 616, and second inner member 620.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

What is claimed is:

1. A utility vehicle, comprising:
a front frame assembly including a plurality of front frame tubes;
a rear frame assembly coupled to the front frame assembly and including a plurality of rear frame tubes; and
a plurality of coupling members coupled to the front frame assembly and the rear frame assembly, the coupling members being configured to couple with the front and rear frame tubes where the front and rear frame tubes have a plurality of cross-sectional profiles, wherein each coupling member includes an inner member and an outer member, one of the inner and outer members being coupled to the front frame tubes and the other of the inner and outer members being coupled to the rear frame tubes.

2. The utility vehicle of claim 1, wherein the cross-sectional profile of the front and rear frame tubes may be at least one of a square cross-sectional profile and a circular cross-sectional profile.

3. The utility vehicle of claim 1, wherein the coupling members are configured to couple with the front and rear frame tubes when the front and rear frame tubes have a plurality of cross-sectional profiles.

4. The utility vehicle of claim 1, wherein the plurality of front frame tubes includes at least one front longitudinally-extending frame member and the inner member of the coupling member is received within the front longitudinally-extending frame member, and the plurality of rear frame tubes includes at least one rear longitudinally-extending frame member and the outer member of the coupling member is received within the rear longitudinally-extending frame member.

5. The utility vehicle of claim 1, wherein the inner and outer members each includes a complementary surface, and the complementary surfaces of the inner and outer members are coupled to each other with fasteners.

6. A utility vehicle, comprising:
a lower frame assembly;
an upper frame assembly coupled to the lower frame assembly and including a plurality of front upstanding members, a plurality of rear upstanding members, a front longitudinal member, and a rear longitudinal member, and
at least one cast coupling member integral with one of the front and rear longitudinal members, and the at least one cast coupling member has a shape of at least one of a "T" or a cross-sectional profile of an hourglass configuration.

7. The utility vehicle of claim 6, wherein the cast coupling member is integral with the front longitudinal member.

8. The utility vehicle of claim 6, wherein the upper frame assembly further includes a front cross member, a rear cross member, and an intermediate cross member positioned longitudinally intermediate the front and rear cross members, and the cast coupling member is coupled to the intermediate cross member.

9. The utility vehicle of claim 8, wherein the upper frame assembly further includes an intermediate upstanding member coupling to the cast coupling member.

10. The utility vehicle of claim 6, wherein a forward end of the T-shaped cast coupling member is coupled to the front longitudinal member, a rearward end of the T-shaped cast coupling member is coupled to the rear longitudinal member, and a lower end of the T-shaped cast coupling member is coupled to the intermediate upstanding member.

11. A utility vehicle, comprising:
a plurality of ground engaging members;
a frame supported by the plurality of ground engaging members;
an operator area supported by the frame including a first seating section and a second seating section;
an upper frame assembly extending above the operator area; and
a roof for covering the operator area comprising a first portion and a second portion, the first portion being positioned generally above the first seating section and retained on the second portion and the upper frame assembly, and the second portion being positioned generally above the second seating section and retained on the upper frame assembly, wherein the first portion of the roof includes a plurality of first coupling members configured to be received within corresponding first openings of the upper frame assembly.

12. The utility vehicle of claim 11, wherein the second portion of the roof includes second coupling members configured to couple with a portion of the upper frame assembly.

13. The utility vehicle of claim 11, further comprising a sealing member positioned between the first and second portions of the roof.

14. The utility vehicle of claim 11, wherein the first portion extends between a left side of the utility vehicle and the right side of the utility vehicle.

15. The utility vehicle of claim 14, wherein the first portion extend between a first position at a front of the first seating section and a second position at a rear of the first seating section of the utility vehicle.

16. A cab assembly configured to be removably coupled to an upper frame assembly of a utility vehicle, comprising:
   at least one door; and
   a sealing member configured to be removably coupled to the upper frame assembly in a substantially upright direction and including a protrusion configured to be positioned adjacent a post extending from the upper frame assembly, the post being operable for receiving a latch for that at least one door.

17. The utility vehicle cab of claim 16, wherein the at least one sealing member comprises an elongated lower portion coupled to an elongated upper portion.

18. The utility vehicle cab of claim 16, wherein an uppermost extent of the upper portion of the sealing member is configured to engage a portion of the upper frame assembly.

19. The utility vehicle cab of claim 18, wherein the uppermost extent of the upper portion has a generally curved profile.

20. The utility vehicle cab of claim 16, wherein the at least one door comprises at least one door seal coupled to a perimeter of the at least one door, and the sealing member is configured to sealingly engage at least a portion of the at least one door seal when the at least one door is coupled to the upper frame with the latch.

21. The utility vehicle cab of claim 16, wherein the at least one door is flush with the upper frame assembly when the at least one door is closed.

22. A utility vehicle, comprising:
   a plurality of ground engaging members;
   a frame supported by the plurality of ground engaging members;
   an operator area supported by the frame including a first seating section and a second seating section;
   an upper frame assembly extending above the operator area;
   a roof for covering the operator area comprising a first portion and a second portion, the first portion being positioned generally above the first seating section and retained on the second portion and the upper frame assembly, and the second portion being positioned generally above the second seating section and retained on the upper frame assembly; and
   a sealing member positioned between the first and second portions of the roof.

23. The utility vehicle of claim 22, wherein the second portion of the roof includes second coupling members configured to couple with a portion of the upper frame assembly.

* * * * *